US011664744B2

(12) United States Patent
Wang et al.

(10) Patent No.: US 11,664,744 B2
(45) Date of Patent: May 30, 2023

(54) TRIBOELECTRIC NANOGENERATOR FOR HARVESTING ENERGY FROM WATER

(71) Applicant: Georgia Tech Research Corporation, Atlanta, GA (US)

(72) Inventors: Zhong Lin Wang, Atlanta, GA (US); Zong-Hong Lin, Atlanta, GA (US); Gang Cheng, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 706 days.

(21) Appl. No.: 16/554,496

(22) Filed: Aug. 28, 2019

(65) Prior Publication Data

US 2020/0067426 A1 Feb. 27, 2020

Related U.S. Application Data

(62) Division of application No. 15/006,865, filed on Jan. 26, 2016, now Pat. No. 10,439,517.
(Continued)

(51) Int. Cl.
 *H02N 1/04* (2006.01)
(52) U.S. Cl.
 CPC ..................... *H02N 1/04* (2013.01)
(58) Field of Classification Search
 CPC ............................................. H02N 1/00–1/12
 See application file for complete search history.

(56) References Cited

U.S. PATENT DOCUMENTS

2011/0148248 A1* 6/2011 Landa ..................... H01J 45/00
 310/306
2014/0225475 A1* 8/2014 Kim ..................... H02N 11/002
 310/309

(Continued)

FOREIGN PATENT DOCUMENTS

CN 103825489 A 5/2014
CN 104682767 A 6/2015
(Continued)

OTHER PUBLICATIONS

Pai, D. M. et al., Physics of Electrophotography, Rev. Mod. Phys. 1993, 65, 1, 163-211.
(Continued)

*Primary Examiner* — Ramon M Barrera
(74) *Attorney, Agent, or Firm* — Troutman Pepper Hamilton Sanders LLP; Ryan A. Schneider; Dustin B. Weeks

(57) ABSTRACT

An apparatus including a first member including a first electrode, a second member coupled to the first member about an axis, including a second electrode, and a surface layer between the first electrode and the second electrode, the second member is rotatable with respect to the axis by an energy flow to change triboelectric charges on the electrodes, and to affect a flow of electrons between the electrodes. A self-powered sensor for detecting a chemical including a generator having an electrode, and a superhydrophobic surface layer for receiving an energy flow carrying triboelectric charges, the surface layer includes a TiO$_2$ layer with nanostructures, and a power indicator indicative of whether the chemical is present based on power output of the triboelectric generator, the energy flow is a solution flow, the solution comprising the chemical and water, and the
(Continued)

chemical removes at least one triboelectric charge from the water.

20 Claims, 58 Drawing Sheets

Related U.S. Application Data

(60) Provisional application No. 62/128,757, filed on Mar. 5, 2015, provisional application No. 62/107,855, filed on Jan. 26, 2015.

(56) References Cited

U.S. PATENT DOCUMENTS

| | | | |
|---|---|---|---|
| 2014/0246950 A1 | 9/2014 | Wang et al. |
| 2014/0246951 A1 | 9/2014 | Wang et al. |
| 2014/0292138 A1 | 10/2014 | Wang et al. |
| 2014/0033845 A1 | 11/2014 | Wang et al. |
| 2015/0031880 A1 | 11/2015 | Zhang et al. |

FOREIGN PATENT DOCUMENTS

| | | | |
|---|---|---|---|
| WO | 2014154092 A1 | 10/2014 |
| WO | 2015154693 A1 | 10/2015 |

OTHER PUBLICATIONS

Park, K. L. et al., Flexible Nanocomposite Generator Made of BaTiO3 Nanoparticles and Graphitic Carbons, Adv. Mater., 2012, 24, 2999-3004.
Qin, Y. et al., Microfiber-Nanowire Hybrid Structure for Energy Scavenging, Nature, 2008, 451, 809-813.
Ravelo, B. et al., Demonstration of the Triboelectricity Effect by the Flow of Liquid Water in the Insulating Pipe, J. Electrostat, 2011, 69, 473-478.
Roundy, S. et al., A Piezoelectric Vibration Based Generator for Wireless Electronics, Smart Mater. Struct. 2004, 13, 1131-1142.
Santos, L. P. et al., Corona-Treated Polyethylene Films Are Macroscopic Charge Bilayers, Langmuir, 2013, 29, 892-901.
Snyder, G. J. et al., Complex Thermoelectric Materials, Nature Mater. 2008, 7, 105-114.
Stöber, W. et al., Controlled Growth of Monodisperse Silica Spheres in the Micron Size Range, J. Colloid Interface Sci., 1968, 26, 62-69.
Su, Y. et al., Hybrid Triboelectric Nanogenerator for Harvesting Water Wave Energy and as a Self-Powered Distress Signal Emitter, J. Nano En., 2014, DOI: 10.1016.
Takahashi, T., Measurement of Electric Charge of Cloud Droplets, Drizzle, and Raindrops, Rev. Geophys. and Space Physics, 1973, 11, 4, 903-924.
Taylor, G. W. et al.The Energy Harvesting Eel: A Small Subsurface Ocean/River Power Generator, IEEE J. Oceanic Eng. 2001, 26, 4, 539-547.
Thomson, S. W., On a Self-Acting Apparatus for Multiplying and Maintaining Electric Charges, with Applications to Illustrate the Voltaic Theory, Proc. R. Soc. London 1867, 16, 67-72.
Tian, B. et al., Coaxial Silicon Nanowires as Solar Cells and Nanoelectronic Power Sources, Nature, 2007, 449, 885-890.
Wang, R. et al., Studies of Surface Wettability Conversion on TiO2 Single-Crystal Surfaces, J. Phys. Chem. B, 1999, 103, 2188-2194.
Wang, S. H. et al., Nanoscale Triboelectric-Effect-Enabled Energy Conversion for Sustainably Powering Portable Electronics, Nano Lett. 2012, 12, 6339-6346.
Wang, S. H. et al., Sliding-Triboelectric Nanogenerators Based on In-Plane Charge-Separation Mechanism, Nano Lett., 2013, 13, 2226.
Wang, Z. L. et al., Nanotechnology-Enabled Energy Harvesting for Self-Powered Micro-Nanosystems, Angew Chem., Int. Ed., 2012, 51, 11700-11721.

Wang, Z. L. et al., Piezoelectric Nanogenerators Based on Zinc Oxide Nanowire Arrays. Science 2006, 312, 242-246.
Wang, Z. L. et al., Progress in Nanogenerators for Portable Electronics, Mater. Today 2012, 15, 12, 532-543.
Wang, Z. L., Self-Powered Nanosensors and Nanosystems, Adv. Mater., 2012, 24, 280-285.
Wang, Z. L., Self-Powered Nanotech Nanosize Machines Need Still Tinier Power Plants, Sci. Am, 2008, 298, 82-87.
Wang, Z. L., Triboelectric Nanogenerators as New Energy Technology for Self-Powered Systems and as Active Mechanical and Chemical Sensors, ACS Nano, 2013, 7, 9533-9557.
Wen, D. et al., Self-Powered Sensor for Trace Hg2+ Detection, Anal. Chem, 2011, 83, 3968-3972.
Wiles, J. A. et al., A Tool for Studying Contact Electrification in Systems Comprising Metals and Insulating Polymers., Anal. Chem., 2003, 75, 4859-4867.
Williams, C. B. et al., Development of an Electromagnetic Micro-Generator, Proc IEEE Circ. Dev. Syst., 2001, 148, 6, 337-342.
Xie, Y. et al., Rotary Triboelectric Nanogenerator Based on a Hybridized Mechanism for Harvesting Wind Energy, ACS Nano 2013, 7, 7119-7125.
Xu, S. et al., Self-Powered Nanowire Devices, Nat. Nanotechnol, 2010, 5, 366-373.
Yang, Y. et al., A Single-Electrode Based Triboelectric Nanogenerator as Self-Powered Tracking System, Adv. Mater., 2013, 25, 6594-6601.
Yang, Y. et al., Human Skin Based Triboelectric Nanogenerators for Harvesting Biomechanical Energy and as Self-Powered Active Tactile Sensor System, ACS Nano., 2013, 7, 10, 9213-9222.
Yang, Y. et al., Nanowire-Composite Based Flexible Thermoelectric Nanogenerators and Self-Powered Temperature Sensors, Nano Res, 2012, 5, 12, 888-895.
Yang, Y. et al., Silicon-Based Hybrid Energy Cell for Self-Powered Electrodegradation and Personal Electronics., ACS Nano, 2013, 7, 3, 2808-2813.
Yang, Y. et al., Single-Electrode-Based Sliding Triboelectric Nanogenerator for Self-Powered Displacement Vector Sensor System, ACS Nano, 2013, 7, 8, 7342-7351.
Yang, Y. et al., Triboelectric Nanogeneator for Harvesting Wind Energy and as Self-Powered Wind Vector Sensor System, ACS Nano 2013, 7, 10, 9461-9468.
Zhang, J. et al., UV Raman Spectroscopic Study on TiO2. I. Phase Transformation at the Surface and in the Bulk, J. Phys. Chem. B, 2006, 110, 2, 927-935.
Zhang, X. S. et al., Frequency-Multiplication High-Output Triboelectric Nanogenerator for Sustainably Powering Biomedical Microsystems., Nano Lett., 2013, 13, 1168-1172.
Zhang, X.-S. et al., High-Performance Triboelectric Nanogenerator with Enhanced Energy Density Based on Single-Step Fluorocarbon Plasma Treatment, Nano Energy, 2014, 4, 123-131.
Zhao, D. et al., Patterning of Electrostatic Charge on Electrets Using Hot Microcontact Printing, Angew. Chem. Int. Ed., 2009, 48, 6699-6703.
Zheng, L. et al., Silicon-Based Hybrid Cell for Harvesting Solar Energy and Raindrop Electrostatic Energy, Nano Energy, 2014, 9, 291-300.
Zhu, G. et al., Linear-Grating Triboelectric Generator Based on Sliding Electrification, Nano Lett. 2013, 13, 2282-2289.
Zhu, G. et al., Toward Large-Scale Energy Harvesting by a Nanoparticle-Enhanced Triboelectric Nanogenerator, Nano Lett., 2013, 13, 847-853.
Zhu, G. et al., Triboelectric-Generator-Driven Pulse Electrodeposition for Micropatterning. Nano Lett. 2012, 12, 4960-4965.
Ahmad, M. A. et al., Electronically Droplet Energy Harvesting Using Piezoelectric Cantilevers, Electron. Lett. 2012, 18, 11, 2 pages.
Akyildiz, I. F. et al., Electromagnetic Wireless Nanosensor Networks, Nano Commun. Networks, 2010, 1, 3-19.
Bai, P. et al., Cylindrical Rotating Triboelectric Nanogenerator, ACS Nano, 2013, 7, 7, 6361-6366.
Banerji, S. K. et al., Electric Charges on Rain Drops, Nature, 3296, 130, 1932, 998-999.

(56) References Cited

OTHER PUBLICATIONS

Baytekin, B.; et al., What Really Drives Chemical Reactions on Contact Charged Surfaces?, J. Am. Chem. Soc. 2012, 134, 7223-7226.
Beeby, S. P. et al., A Micro Electromagnetic Generator for Vibration Energy Harvesting. J. Micromech. Microeng. 2007, 17, 1257-1265.
Beeby, S. P. et al., Energy Harvesting Vibration Sources for Microsystems Applications, Meas. Sci. Technol., 2006, 17, R175-R195.
Burgo, T. A. L. et al., Triboelectricity: Macroscopic Charge Patterns Formed by Self-Arraying Ions on Polymer Surfaces, Langmuir, 2012, 28, 7407-7416.
Castle, G. S. P., Contact Charging Between Insulators, J. Electrostat, 1997, 40-41, 13-20.
Chang, C. E. et al., Direct-Write Piezoelectric Polymeric Nanogenerator with High Energy Conversion Efficiency, Nano Lett., 2010, 10, 726-731.
Chen, F. et al., Correlation of Photocatalytic Bactericidal Effect and Organic Matter Degradation of $TiO_2$ Part I: Observation of Phenomena, Environ. Sci. Technol., 2009, 43, 1180-1184.
Chen, X. et al., 1.6 V Nanogenerator for Mechanical Energy Harvesting Using PZT Nanofibers, Nano Lett., 2010, 10, 2133-2137.
Chen, X. et al., Titanium Dioxide Nanomaterials: Synthesis, Properties, Modifications, and Applications, Chem. Rev., 2007, 107, 2891-2959.
Cheng, G. et al., Increase Output Energy and Operation Frequency of a Triboelectric Nanogenerator by Two Grounded Electrodes Approach, Adv. Funct. Mater., 2014, 24, 2892-2898.
Cheng, G. et al., Simultaneously Harvesting Electrostatic and Mechanical Energies from Flowing Water by a Hybridized Triboelectric Nanogenerator, ACS Nano, 2014, 8, 2, 1932-1939.
Cheng, G. et al., Pulsed Nanogenerator with Huge Instantaneous Output Power Density, ACS Nano 2013, 7, 8, 7383-7391.
Choi, D. et al., Spontaneous Electrical Charging of Droplets by Conventional Pipetting, Sci. Rep., 2013, 3, 2037, 7 pages.
Deng, L. et al., Integrated Self-Powered Microchip Biosensor for Endogenous Biological Cyanide, Anal. Chem., 2010, 82, 4283-4287.
Fan, F. R. et al., Flexible Triboelectric Generator!, Nano Energy, 2012, 1, 328-334.
Fan, F. R. et al., Transparent Triboelectric Nanogenerators and Self-Powered Pressure Sensors Based on Micropatterned Plastic Films Nano Lett., 2012, 12, 3109-3114.
Feng, X. et al., The Fabrication and Switchable Superhydrophobicity of $TiO_2$ Nanorod Films, Angew. Chem., Int. Ed., 2005, 44, 5115-5118.
Gu, L. et al., Flexible Fiber Nanogenerator with 209 V Output Voltage Directly Powers a Light-Emitting Diode, Nano Lett., 2013, 13, 91-94.
Guigon, R. et al., Harvesting Raindrop Energy: Experimental Study, Smart Mater. Struct. 2008, 17, 015039, 6 pages.
Hoang, S. et al., Chemical Bath Deposition of Vertically Aligned $TiO_2$ Nanoplatelet Arrays for Solar Energy Conversion Applications, J. Mater. Chem. A, 2013, 1, 4307-4315.
Hosono, E. et al., Growth of Submicrometer-Scale Rectangular Parallelepiped Rutile $TiO_2$ Films in Aqueous $TiCl3$ Solutions under Hydrothermal Conditions, J. Am. Chem. Soc., 2004, 126, 7790-7791.
Hu, Y. et al., Replacing a Battery by a Nanogenerator with 20 V Output, Adv. Mater., 2012, 24, 110-114.
Jiang, P. et al., Single-Crystal Colloidal Multilayers of Controlled Thickness, Chem. Mater., 1999, 11, 2132-2140.
Katz, E. et al., Self-Powered Enzyme-Based Biosensors, J. Am. Chem. Soc., 2001, 123, 10752-10753.
Lee, M. et al., Self-Powered Environmental Sensor System Driven by Nanogenerators, Energy Environ. Sci, 2011, 4, 3359-3363.
Lee, S. et al.,Artificial Lotus Leaf Structures Made by Blasting with Sodium Bicarbonate, Curr. Appl. Phys. 2011, 11, 800-804.
Lee, S. et al., Tens of Centimeter-Scale Flexible Superhydrophobic Nanofiber Structures Through Curing Process, Lab Chip 2009, 9, 2234-2237.
Lin, L. et al., Segmentally Structured Disk Triboelectric Nanogenerator for Harvesting Rotational Mechanical Energy, Nano Lett, 2013, 13, 2916-2923.
Lin, Z.-H. et al., A Self-Powered Triboelectric Nanosensor for Mercury Ion Detection, Angew. Chem. Int. Ed., 2013, 52, 5065-5069.
Lin, Z.-H. et al., Enhanced Triboelectric Nanogenerators and Triboelectric Nanosensor Using Chemically Modified $TiO_2$ Nanomaterials, ACS Nano, 2013, 7, 5, 4554-4560.
Lin, Z.-H. et al., Harvesting Water Drop Energy by a Sequential Contact-Electrification and Electrostatic-Induction Process, Adv. Mater., 2014, DOI: 10.1002/adma.201400373.
Lin, Z.-H. et al., $BaTiO_3$ Nanotubes-Based Flexible and Transparent Nanogenerators, J. Phys. Chem. Lett. 2012, 3, 3599-3604.
Lin, Z.-H., Dual-Mode Triboelectric Nanogenerator for Harvesting Water Energy and as a Self-Powered Ethanol Nanosensor, ACS Nano, 2014, 10.1021/nn501983s.
Lin, Z.-H. et al., Triboelectric Nanogenerator as an Active UV Photodetector, Adv. Funct. Mater, 2014, 28, 2810-2816.
Lin, Z.-H. et al., Water-Solid Surface Contact Electrification and its Use for Harvesting Liquid-Wave Energy, Angew. Chem. Int. Ed., 2013, 52, 12545-12549.
Liu, C. Y. et al.,Chemical Redox Reactions Induced by Cryptoelectrons on a PMMA Surface, J. Am. Chem. Soc. 2009, 131, 6397-6401.
Liu, C. Y. et al., Electrostatic Electrochemistry at Insulators, Nat. Mater, 2008, 7, 505-509.
Ma, M. et al., Bio-Inspired Polymer Composite Actuator and Generator Driven by Water Gradients, Science, 2013, 339, 186-189.
Ma, X. et al., Selective Discharge of Electrostatic Charges on Electrets Using a Patterned Hydrogel Stamp, Angew. Chem. Int. Ed. 2010, 122, 5669-5672.
Mazza, T. et al., Raman Spectroscopy Characterization of $TiO_2$ Rutile Nanocrystals, Phys. Rev. B, 2007, 75, 045416-1 to 045416-5.
McCarty, L. S. et al., Electrostatic Charging Due to Separation of Ions at Interfaces: Contact Electrification of Ionic Electrets. Angew. Chem. Int. Ed. 2008, 47, 2188-2207.
Mitcheson, P. D. et al., Energy Harvesting from Human and Machine Motion for Wireless Electronic Devices, Proc IEEE, 2008, 96, 9, 1457-1486.
Mitcheson, P. D. et al., MEMS Electrostatic Micropower Generator for Low Frequency Operation, Sens. Actuators, A 115, 2004, 115, 523-529.
Moon, J. K. et al., Electrical Power Generation by Mechanically Modulating Electrical Double Layers, Nat. Commun., 2013, 4, 1-6.
Naruse, Y. et al., Electrostatic Micro Power Generation from Low-Frequency Vibration such as Human Motion, J. Micromech. Microeng., 2009, 19, 094002, 5 pages.
Nguyen, V. et al., Effect of Humidity and Pressure on the Triboelectric Nanogenerator, Nano Energy, 2013, 2, 604-608.

\* cited by examiner

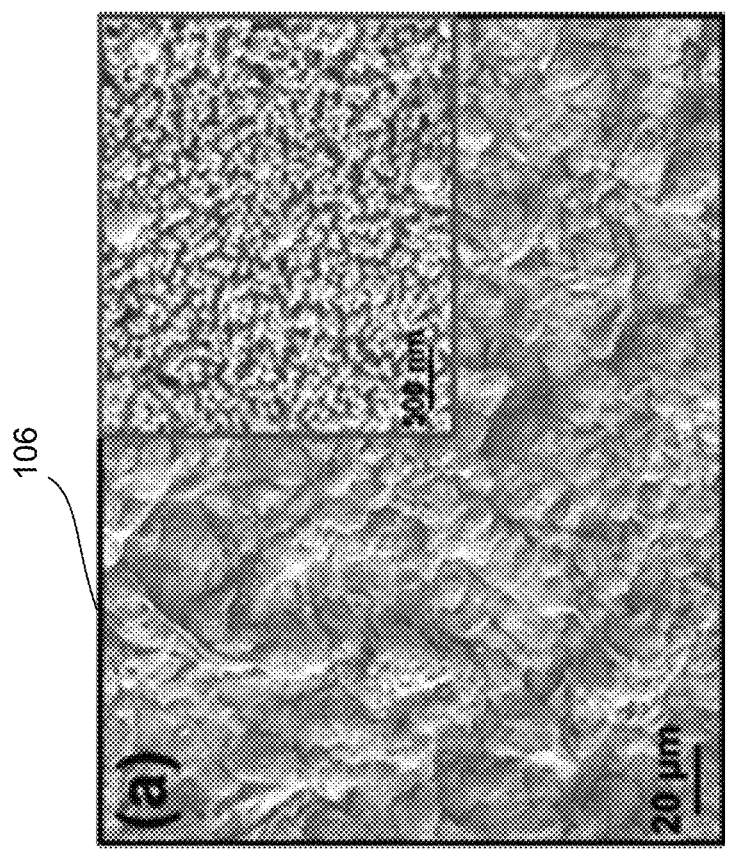
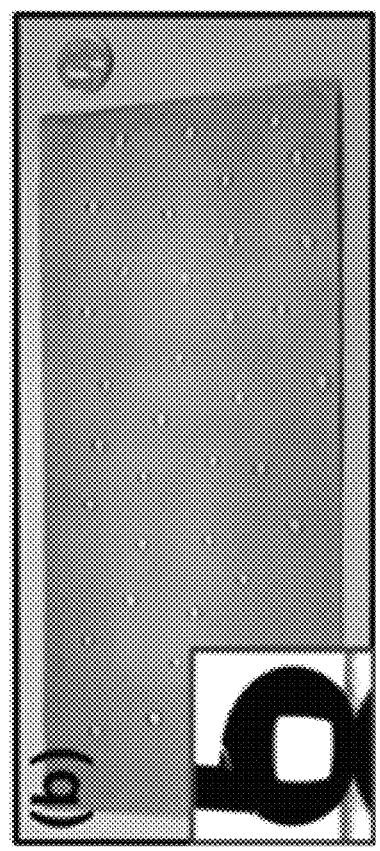
FIG. 2A
FIG. 2B

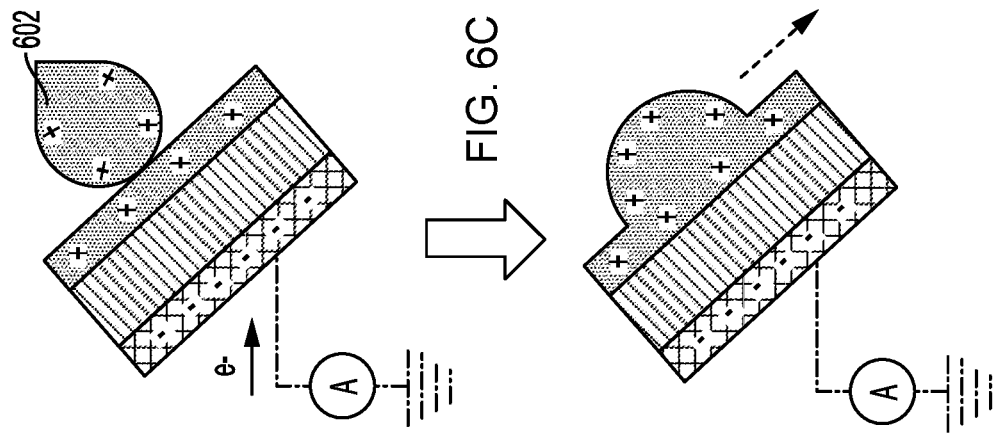
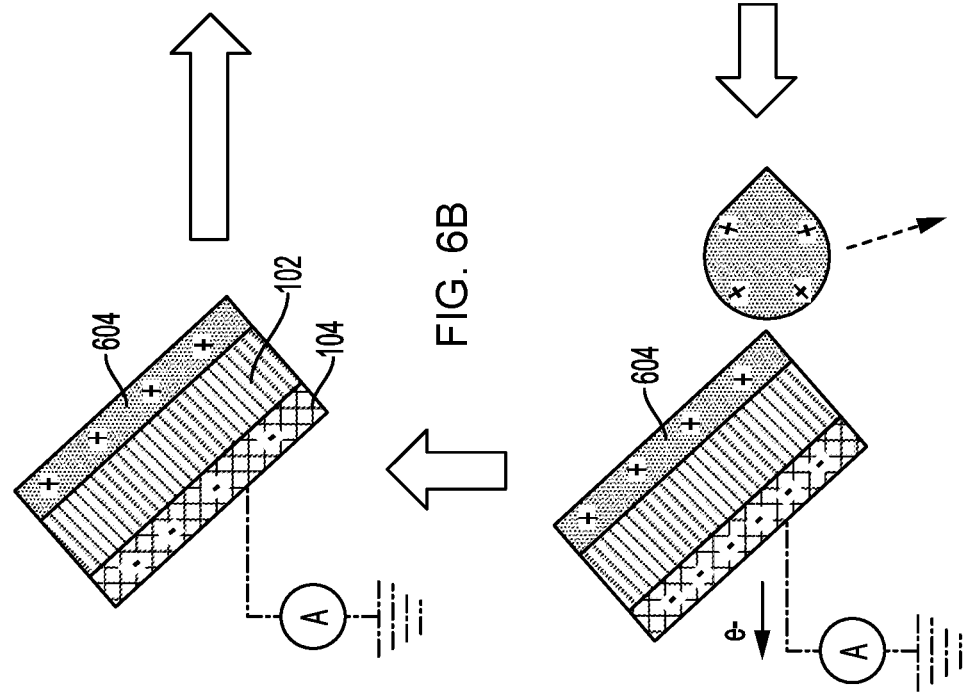
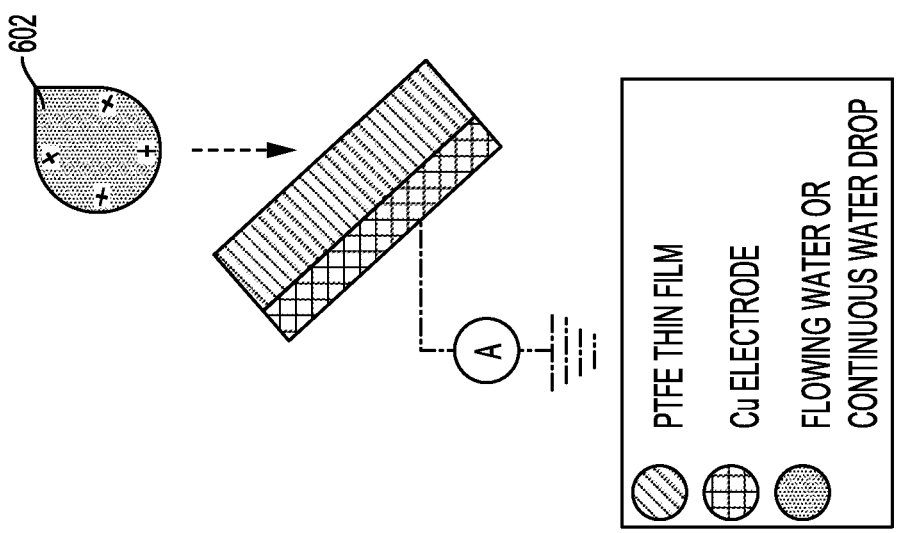
FIG. 6A FIG. 6B FIG. 6C FIG. 6D FIG. 6E

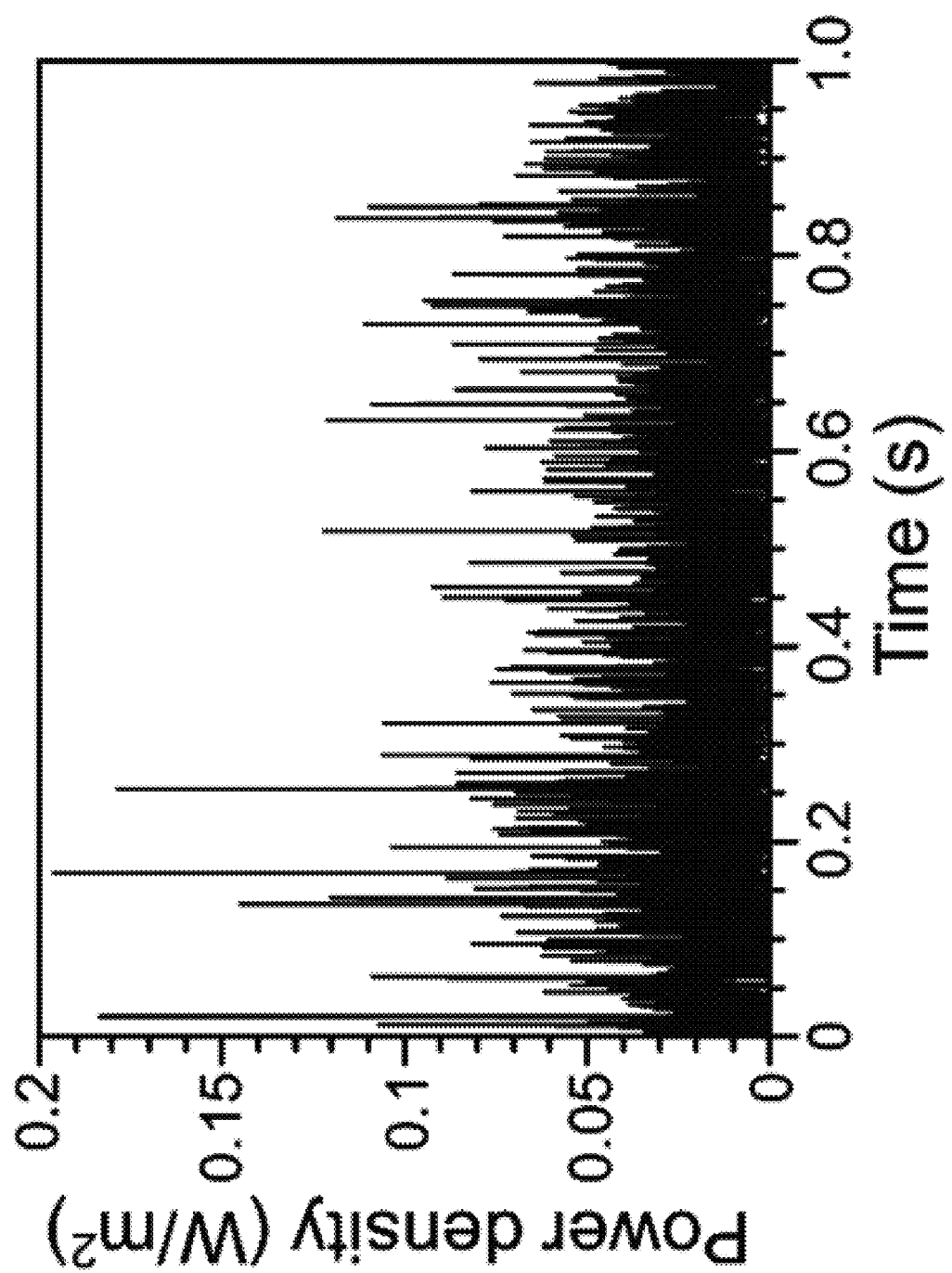

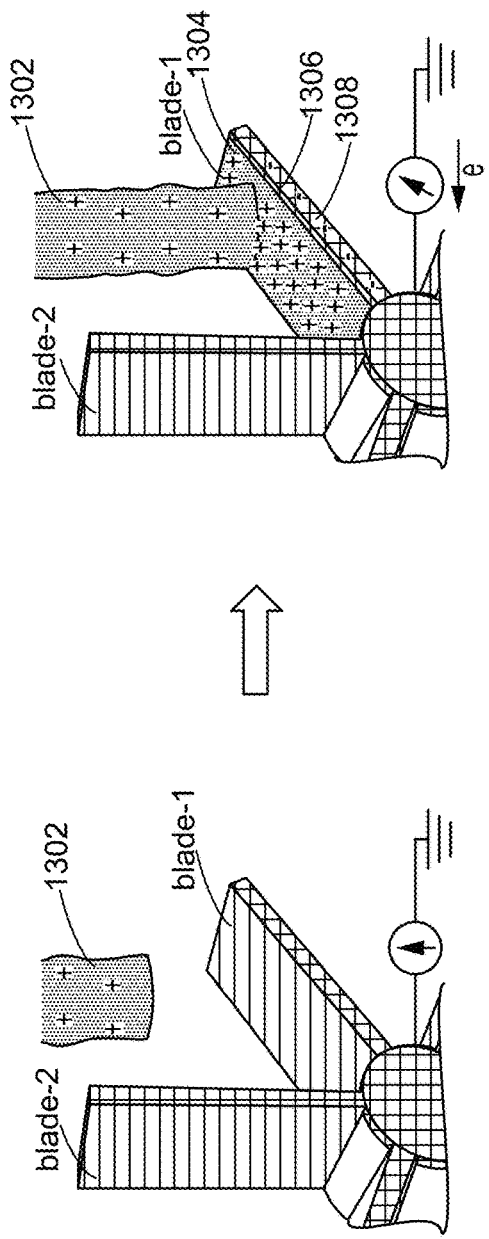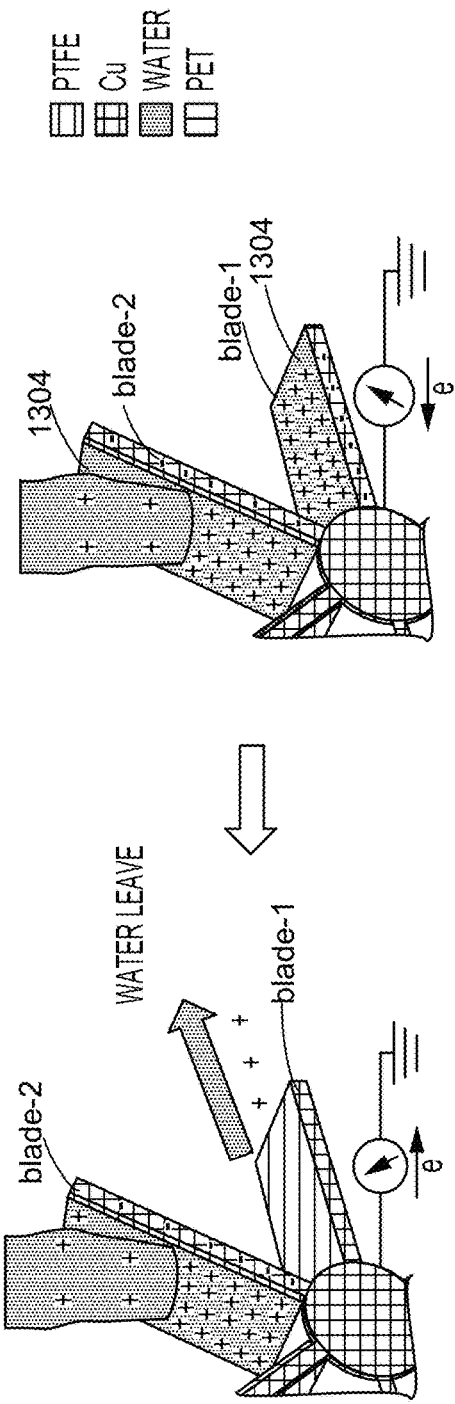
FIG. 13A  FIG. 13B  FIG. 13C  FIG. 13D

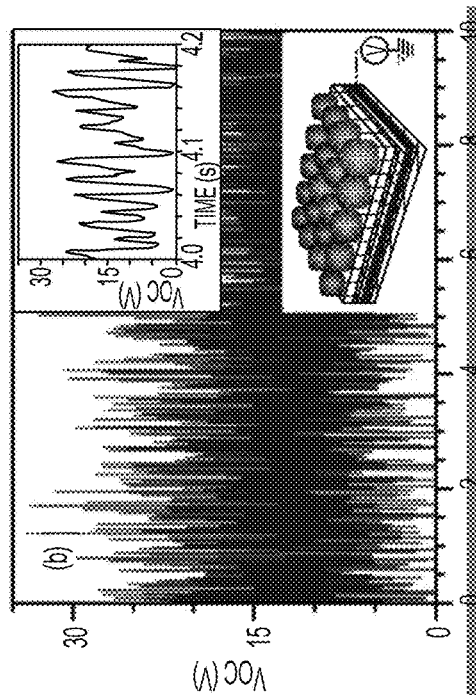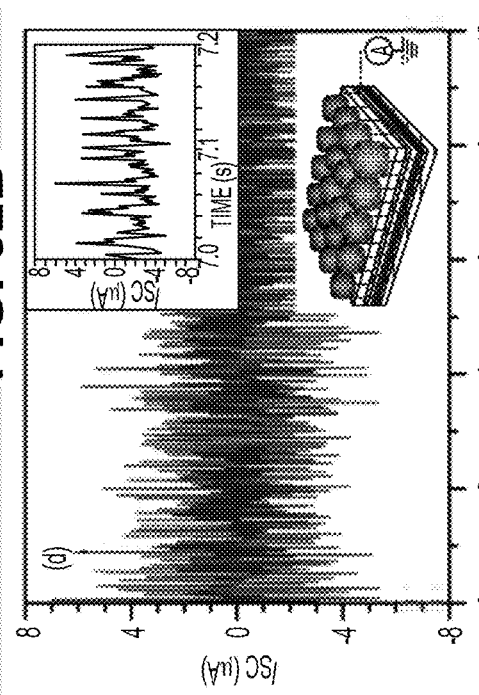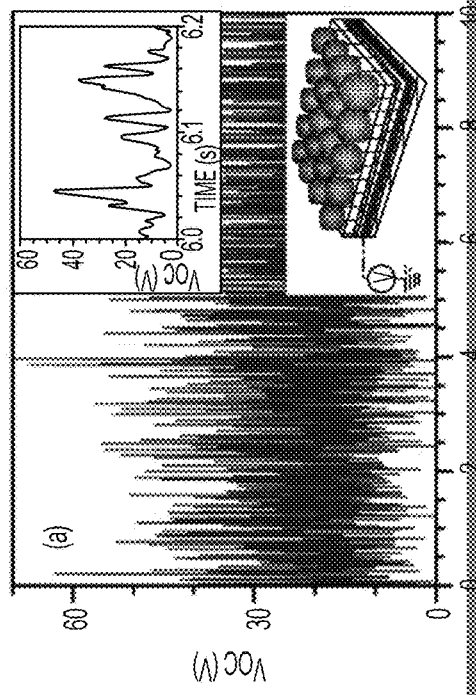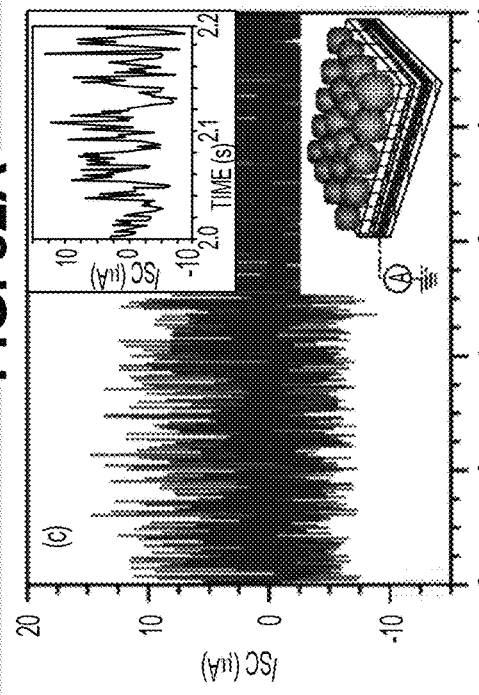

TRIBOELECTRIC NANOGENERATOR FOR HARVESTING ENERGY FROM WATER

CROSS-REFERENCE TO RELATED APPLICATIONS

This application is division of and claims benefit of priority pursuant to 35 USC § 120 of, U.S. application Ser. No. 15/006,865 filed 26 Jan. 2016, which U.S. Application claims the benefit of U.S. Provisional Patent Application No. 62/128,757, filed 5 Mar. 2015, and U.S. Provisional Patent Application No. 62/107,855, filed 26 Jan. 2015, each of which are hereby incorporated by reference to their entireties.

STATEMENT REGARDING FEDERALLY SPONSORED RESEARCH

This invention was made with government support under grant number DE-FG02-07ER46394, awarded by the US Department of Energy. The government has certain rights in the invention.

BACKGROUND OF THE INVENTION

1. Technical Field

Embodiments of the disclosed technology generally relate to triboelectric nanogenerators for harvesting energies from water.

2. Description of Related Art

There are abundant of water-related energy sources in the environment including, for example, ocean wave, tide, waterfall, and rainwater. Each water source can carry multiple types of energy. For example, a single water drop carries two types of energy, including mechanical kinetic energy and electrostatic energy owing to triboelectric charges caused by its contact with surrounding media.

Since 1867, the Kelvin water dropper has been invented to collect the water electrostatic energy and illustrate the natural generation of electricity in atmospheric phenomena such as thunderstorms. The Kelvin water dropper uses falling water to generate a potential difference by electrostatic induction between two interconnected, oppositely charged systems, and it utilizes the initial instantaneous non-equilibrium status of charge distributions in the liquid rather than the friction between the liquid and air.

Recently, triboelectric nanogenerator (TENG) has been developed to convert mechanical vibration energy into electricity. The working mechanism of TENG is based on a combination of contact electrification and electrostatic induction. Normally, TENG needs a relatively dry condition to provide a stable output, because the surface triboelectrification would be largely reduced or totally eliminated owing to the presence of water.

There is a need for a new prototype TENG to harvest water-related energy. There is also a need to maximize the TENG's output by converting both mechanical kinetic energy and electrostatic energy from water into electricity.

BRIEF SUMMARY OF THE INVENTION

The disclosed technology relates to energy harvesting. One aspect of the disclosed technology relates to a generator. The generator includes a plurality of blades arranged in a radially outward fashion. Each blade includes an electrode and a surface layer for receiving flowing water carrying triboelectric charges. The flowing water affects a flow of electrons between the electrode and ground.

Another aspect of the disclosed technology relates to a generator having a first component for receiving flowing water carrying triboelectric charges. The first component harvests electrostatic energy from the flowing water. The generator includes a second component coupled to the first component. The second component includes a rotatable disk that rotates when the first component receives the flow water. The second component harvests mechanical kinetic energy from the flowing water during rotation.

Yet another aspect of the disclosed technology relates to a generator for harvesting energy from wind. The generator includes a first member including a first electrode. A second member is coupled to the first member about an axis. The second member includes a second electrode and a surface layer between the first electrode and the second electrode. The second member is rotatable with respect to the axis by wind to change triboelectric charges on the electrodes, and to affect a flow of electrons between the electrodes.

A further aspect of the disclosed technology relates to a self-powered sensor for detecting energy flow rate. The sensor includes a first member including a first electrode. The sensor also includes a second member coupled to the first member about an axis. The second member includes a second electrode and a surface layer between the first electrode and the second electrode. The second member is rotatable with respect to the axis by energy flow to change triboelectric charges on the electrodes, and to affect a flow of electrons between the electrodes. A processor is configured to detect the energy flow rate based on at least one of a measurement of current generated by the flow of electrons and a rotation speed of the second member.

One aspect of the disclosed technology relates to a generator. The generator includes an electrode and a superhydrophobic surface layer for receiving flowing water carrying triboelectric charges. The surface layer includes a $TiO_2$ layer with nanostructures thereon. The flowing water affects a flow of electrons between the electrode and ground.

Another aspect of the disclosed technology relates to a generator. The generator includes a first component for receiving flowing water carrying triboelectric charges, and harvesting electrostatic energy from the flowing water. A second component is coupled to the first component. The second component harvests mechanical kinetic energy from the flowing water. When the first component receives the flowing water, the first component contacts the second component to affect a flow of electrons at the first component and the second component.

A further aspect of the disclosed technology relates to a self-powered sensor for detecting chemical. The sensor includes a triboelectric generator including an electrode and a superhydrophobic surface layer for receiving a solution containing a chemical and water. The chemical removes at least one triboelectric charge from the water. The sensor also includes a power indicator indicative of whether the chemical is present based on power output of the triboelectric generator.

In another exemplary embodiment, the present invention is a generator comprising a plurality of blades arranged in a radially outward fashion, each blade including an electrode, and a surface layer for receiving flowing water carrying triboelectric charges, the flowing water affecting a flow of electrons between the electrode and ground.

The plurality of blades can exhibit a wheel-like structure.

The surface layer can superhydrophobic. The surface layer can include a plurality of nanostructures thereon. The surface layer can include at least one of the following materials polyethylene terephthalate, poly(methyl methacrylate), polydimethylsiloxane, polytetrafluoroethylene, fluorinated ethylene propylene, poly(vinyl chloride), polyimide, metal and alloy.

The electrode can include at least one of the following materials metal, indium tin oxide and conductive polymer.

In another exemplary embodiment, the present invention is a generator comprising a first component for receiving flowing water carrying triboelectric charges, and harvesting electrostatic energy from the flowing water, and a second component coupled to the first component, including a rotatable disk that rotates when the first component receives the flow water, the second component harvesting mechanical kinetic energy from the flowing water during rotation.

The first component can include a plurality of blades, each blade configured to receive the flowing water and induce rotation of the first component and the rotatable disk of the second component about a rotation axis when the blade receives the flowing water.

The second component can include two segmented disks, and each disk includes an electrode.

In another exemplary embodiment, the present invention is a generator for harvesting energy from wind comprising a first member including a first electrode, a second member coupled to the first member about an axis, including a second electrode, and a surface layer between the first electrode and the second electrode, the second member being rotatable with respect to the axis by wind to change triboelectric charges on the electrodes, and to affect a flow of electrons between the electrodes.

The surface layer can include at least one of the following materials polyethylene terephthalate, poly(methyl methacrylate), polydimethylsiloxane, polytetrafluoroethylene, fluorinated ethylene propylene, poly(vinyl chloride), polyimide, metal and alloy.

The surface layer can be superhydrophobic. The surface layer can include a plurality of nanostructures thereon.

In another exemplary embodiment, the present invention is a self-powered sensor for detecting energy flow rate comprising a first member including a first electrode, a second member coupled to the first member about an axis, including a second electrode, and a surface layer between the first electrode and the second electrode, wherein the second member is rotatable with respect to the axis by energy flow to change triboelectric charges on the electrodes, and to affect a flow of electrons between the electrodes, and a processor configured to detect the energy flow rate based on at least one of a measurement of current generated by the flow of electrons and a rotation speed of the second member.

Each of the first member and the second member can define a segmented disk profile.

The energy flow rate can include at least one of water flow rate and wind speed.

In another exemplary embodiment, the present invention is a generator comprising an electrode, and a superhydrophobic surface layer for receiving flowing water carrying triboelectric charges, the surface layer including a $TiO_2$ layer with nanostructures thereon, the flowing water affecting a flow of electrons between the electrode and ground.

In another exemplary embodiment, the present invention is a generator comprising a first component for receiving flowing water carrying triboelectric charges, and harvesting electrostatic energy from the flowing water, a second component coupled to the first component, the second component harvesting mechanical kinetic energy from the flowing water, wherein when the first component receives the flowing water, the first component contacts the second component to affect a flow of electrons at the first component and the second component.

The first component can include a superhydrophobic surface layer.

The surface layer can include a $TiO_2$ layer with nanostructures thereon.

In another exemplary embodiment, the present invention is a self-powered sensor for detecting a chemical comprising a triboelectric generator including an electrode, and a superhydrophobic surface layer for receiving a solution containing a chemical and water, where the chemical removes at least one triboelectric charge from the water, and a power indicator indicative of whether the chemical is present based on power output of the triboelectric generator.

The chemical can be ethanol.

The power indicator can be an LED.

These and other aspects of the disclosed technology are described in the Detailed Description disclosed below and the accompanying figures. Other aspects and features of embodiments of the disclosed technology will become apparent to those of ordinary skill in the art upon reviewing the following description of specific, exemplary embodiments of the disclosed technology in concert with the figures. While features of the disclosed technology can be discussed relative to certain embodiments and figures, all embodiments of the disclosed technology can include one or more of the features discussed herein. While one or more embodiments can be discussed as having certain advantageous features, one or more of such features can also be used with the various embodiments of the disclosed technology discussed herein. In similar fashion, while exemplary embodiments can be discussed below as system or method embodiments, it is to be understood that such exemplary embodiments can be implemented in various devices, systems, and methods of the disclosed technology.

BRIEF DESCRIPTION OF THE SEVERAL VIEWS OF THE DRAWINGS

The following Detailed Description technology is better understood when read in conjunction with the appended drawings. For the purposes of illustration, there is shown in the drawings exemplary embodiments, but the subject matter is not limited to the specific elements and instrumentalities disclosed.

FIG. 2A provides a scanning electron microscopy (SEM) image of a prepared polytetrafluoroethylene (PTFE) thin film with hierarchical micro-/nanostructures according to one aspect of the disclosed technology.

FIG. 2B is a photograph of a large-sized PTFE thin film with a uniform superhydrophobic property according to one aspect of the disclosed technology.

FIGS. 6A-E schematically illustrate an operating principle of the water-TENG for harvesting energy from flowing water or continuous water drop according to one aspect of the disclosed technology.

FIG. 9E illustrates power density of the water-TENG when harvesting energy from flowing tap water according to one aspect of the disclosed technology.

FIGS. 13A-D illustrate the working mechanism of the water-TENG of the generator of FIG. 12A according to one aspect of the disclosed technology.

FIG. 32A illustrates generated $V_{oc}$ from Output 1 of the generator of FIG. 24 under the impact of the flowing water from a household faucet according to one aspect of the disclosed technology.

FIG. 32B illustrates generated $V_{oc}$ from Output 2 of the generator of FIG. 24 under the impact of the flowing water from a household faucet according to one aspect of the disclosed technology.

FIG. 32C illustrates generated $I_{sc}$ from Output 1 of the generator of FIG. 24 under the impact of the flowing water from a household faucet according to one aspect of the disclosed technology.

FIG. 32D illustrates generated $I_{sc}$ from Output 2 of the generator of FIG. 24 under the impact of the flowing water from a household faucet according to one aspect of the disclosed technology.

DETAILED DESCRIPTION OF THE INVENTION

Figure 1:
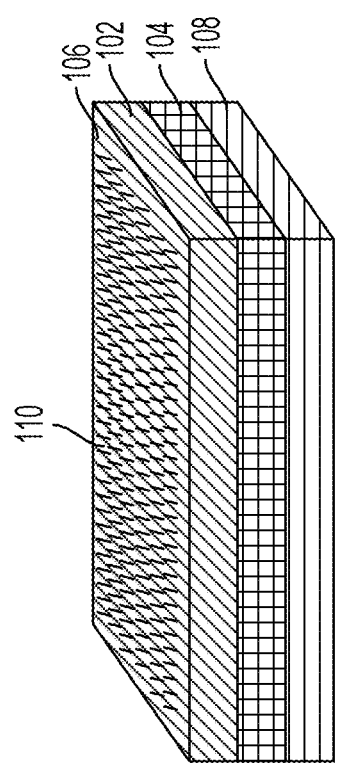
FIG. 1 provides a schematic illustration of a water-TENG according to one aspect of the disclosed technology.

To facilitate an understanding of the principles and features of the various embodiments of the present invention, various illustrative embodiments are explained below. Although exemplary embodiments of the present invention are explained in detail, it is to be understood that other embodiments are contemplated. Accordingly, it is not intended that the present invention is limited in its scope to the details of construction and arrangement of components set forth in the following description or examples. The present invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents that operate in a similar manner to accomplish a similar purpose.

Ranges can be expressed herein as from "about" or "approximately" or "substantially" one particular value and/ or to "about" or "approximately" or "substantially" another particular value. When such a range is expressed, other exemplary embodiments include from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified. Such other components or steps not described herein can include, but are not limited to, for example, similar components or steps that are developed after development of the disclosed technology.

The materials described as making up the various elements of the present invention are intended to be illustrative and not restrictive. Many suitable materials that would perform the same or a similar function as the materials described herein are intended to be embraced within the scope of the present invention. Such other materials not described herein can include, but are not limited to, for example, materials that are developed after the time of the development of the present invention.

FIG. 1 is a schematic illustration of a TENG 100 according to one embodiment of the disclosed technology. The TENG 100 can also be referred to as water-TENG 100. The water-TENG 100 can harvest energy from flowing water such as household wastewater, spray water drop and ocean wave. For example, the water-TENG 100 can harvest the electrostatic energy from the water drop.

The water-TENG 100 can include a surface layer 102, an electrode 104, and a substrate 108. The surface layer 102 can include a superhydrophobic surface 106. In one embodiment, the surface layer 102 can include a PTFE thin film. The superhydrophobic surface 106 can include PTFE hierarchical micro-/nanostructures 110.

FIG. 2A provide a SEM image of an exemplary surface layer 102. The inset of FIG. 2A illustrates the SEM image at a higher magnification. The surface layer 102 can be prepared on a large scale. For example, FIG. 2B illustrates a prepared large-sized surface layer with a uniform superhydrophobic property. The large-sized PTFE thin film can have a dimension of 13 cm×33 cm.

As shown in FIG. 2A, the surface 106 of the surface layer 102 can include irregular microstructures, which can be further covered by high-density nanostructures, such as nanorods. In one embodiment, the mean length and diameter of the nanorods can be about 360 nm and 45 nm, respectively. The hierarchical micro-/nanostructures can contain trapped air, which can reduce the actual contact area between the surface layer 102 and a water drop, consequently strengthening the superhydrophobic ability of the surface layer 102.

The superhydrophobic property of the hierarchical micro-/nanostructures-composed thin film 102 can be assessed by measuring the contact angle of a water drop. The inset of FIG. 2B shows the advancing contact angle of the surface layer 102.

In one embodiment, the average value of the measured contact angle of the surface layer 102 is 169°, which exceeds a minimum requirement for a superhydrophobic surface.

The water-TENG 100 can have any effective dimension, including but not limited to, 4 cm×4 cm and 15 cm×15 cm, among many other possibilities.

Figure 39:
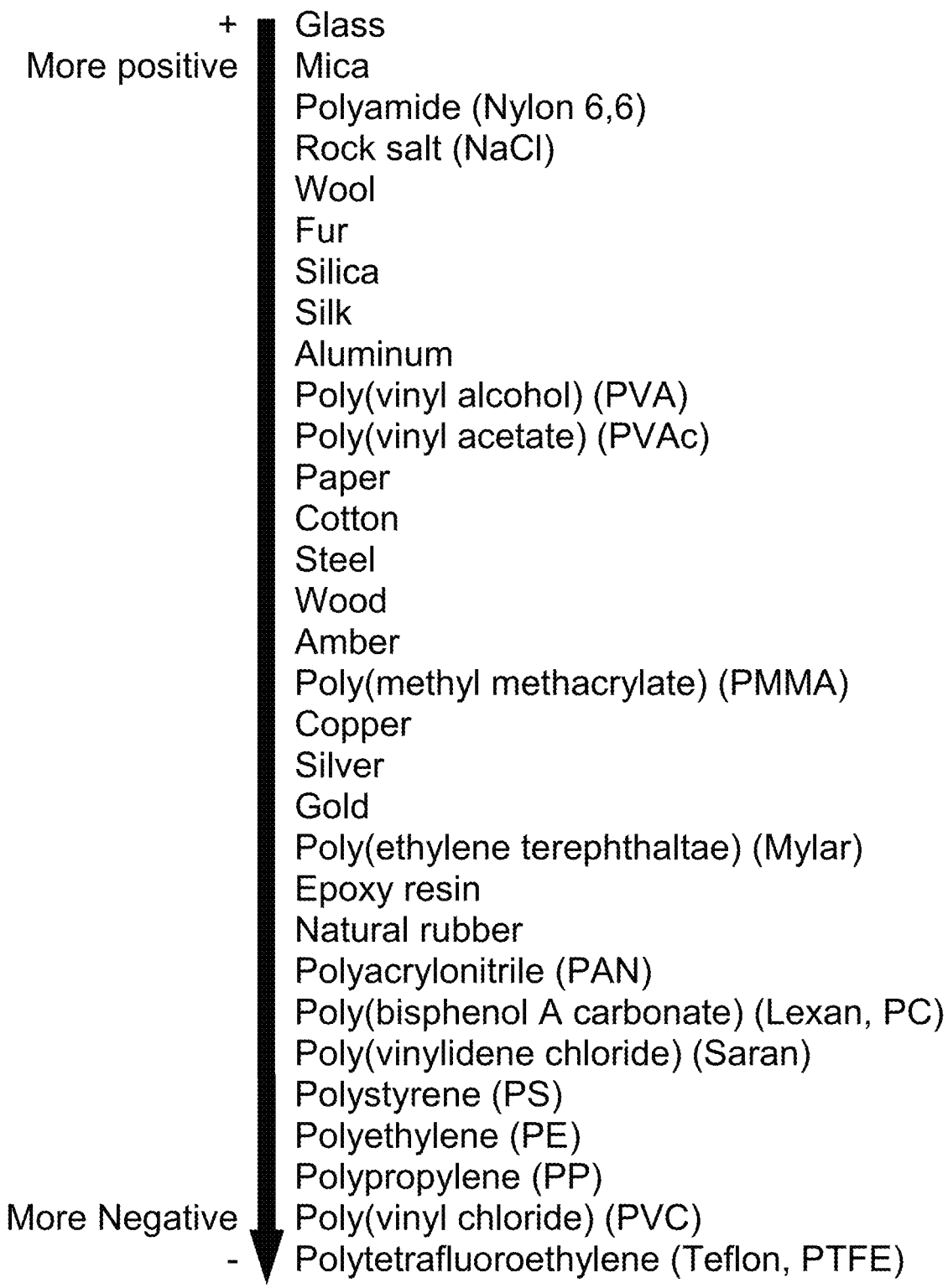
FIG. 39 illustrates a triboelectric series according to one aspect of the disclosed technology.

The surface layer 102 can have triboelectric characteristics, a triboelectric series rating, a triboelectric polarity, or a charge affinity different from that of water. FIG. 39 provides a triboelectric series.

In one example, the surface layer 102 can include a material with a relatively less negative triboelectric series rating. Examples of suitable materials for the surface layer 102 can include, but not limited to, anyone or a combination of the following materials: polyethylene terephthalate (PET), poly (methyl methacrylate) (PMMA), PDMS, PTFE, fluorinated ethylene propylene (FEP), poly (vinyl chloride) (PVC), polyimide, metal and alloy, among many other possibilities.

The electrode 104 can include, but not limited to, any one or a combination of the following materials: metal such as copper, gold, silver and aluminum, indium tin oxide (ITO) and conductive polymer, among many other possibilities.

The substrate 108 can include anyone or a combination of the following materials: PMMA and PET, among other possibilities.

Figure 3:
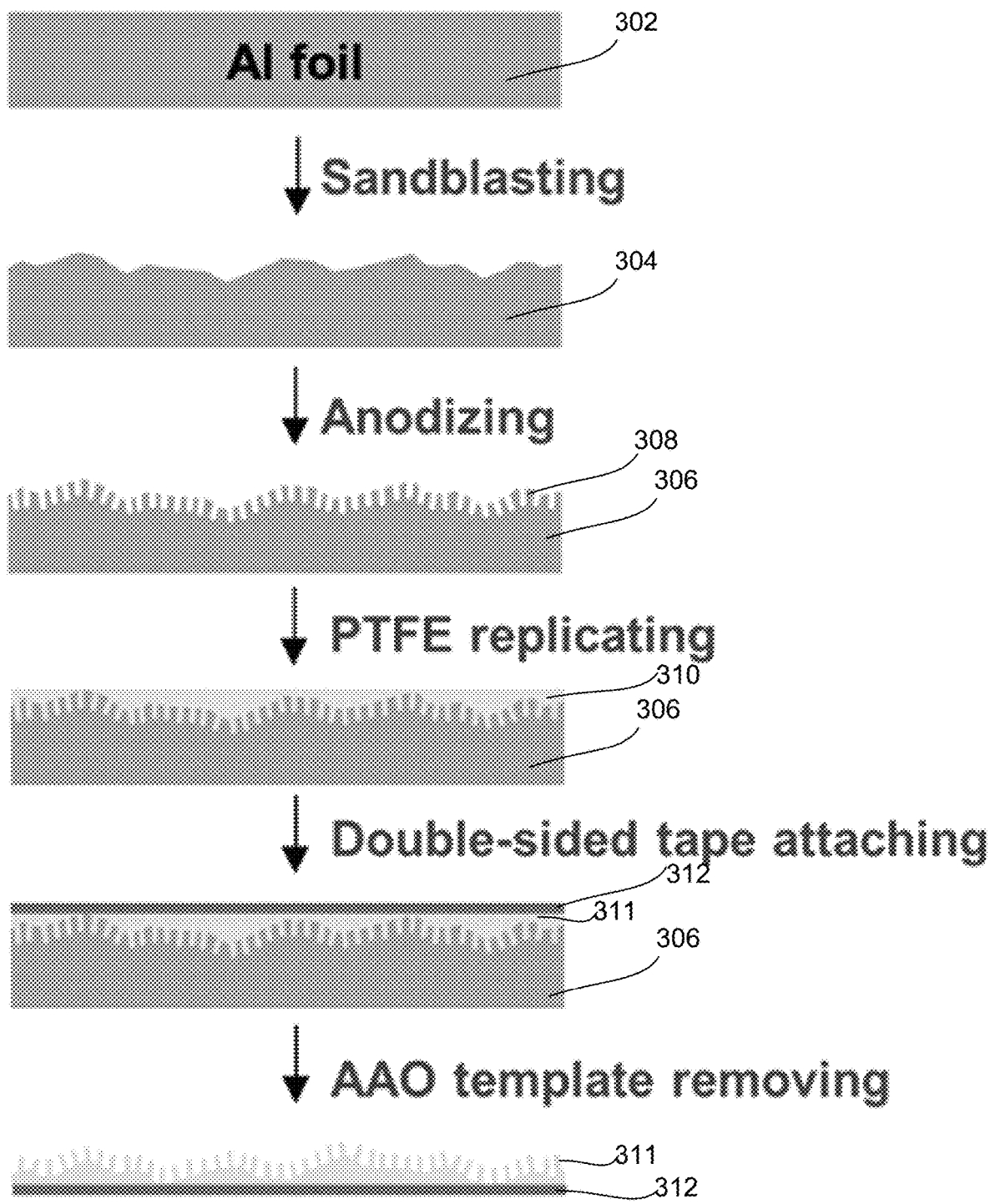
FIG. 3 illustrates a fabrication process of a superhydrophobic PTFE thin film with hierarchical micro-/nanostructures according to one aspect of the disclosed technology.

The fabrication process of water-TENG can start from the preparation of the surface layer 102 with superhydrophobic hierarchical structures. FIG. 3 describes a process for fabricating a PTFE thin film which can serve as the surface layer 102.

Figure 4:
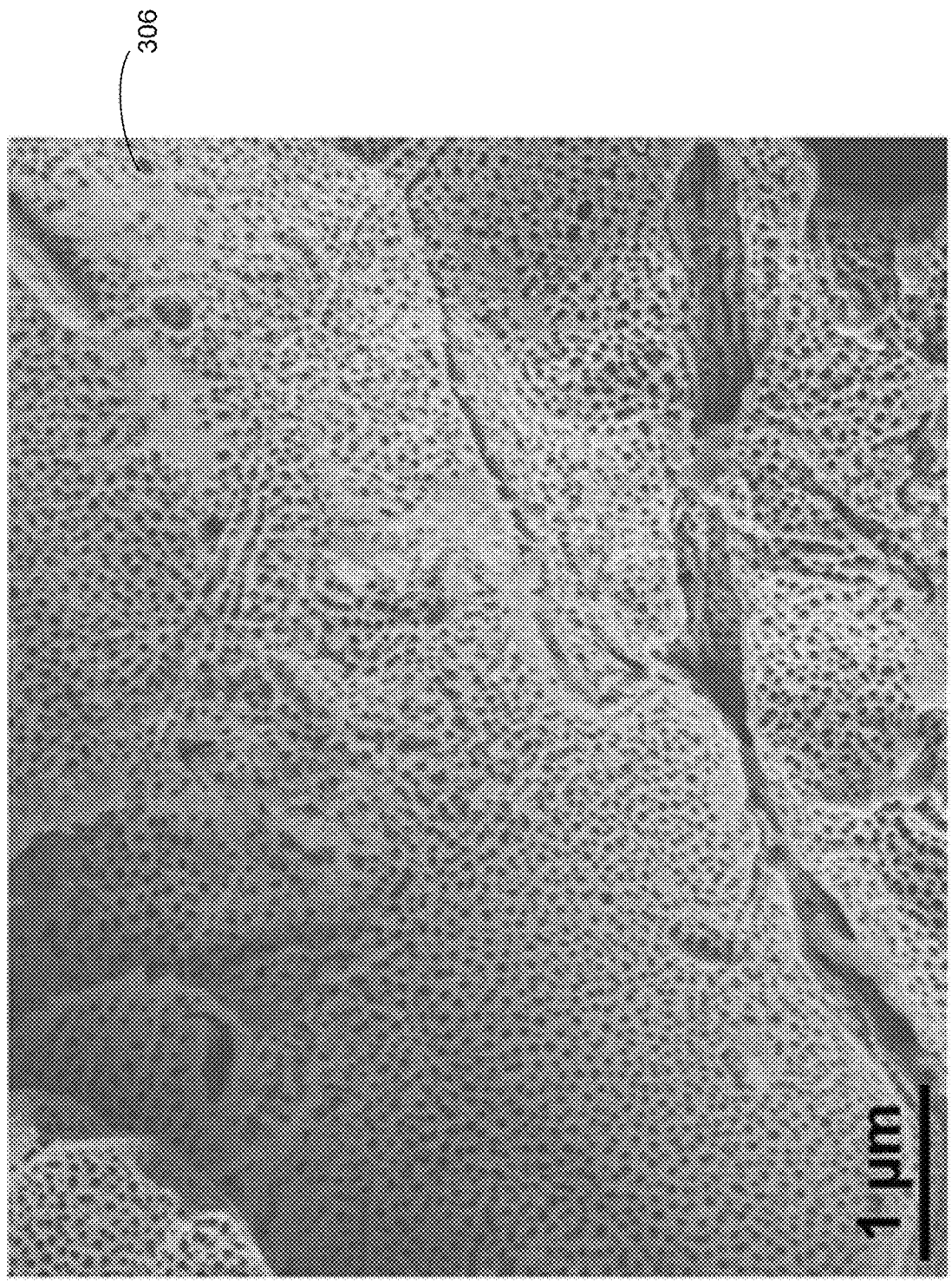
FIG. 4 provides a SEM image of an Al oxide (AAO) template with irregular microstructures and nanometer-sized holes according to one aspect of the disclosed technology.

First, microstructures can be fabricated by blasting an Al foil 302 with sand particles (diameter around 30 µm) using compressed air (4 kgf/cm$^2$). The sand-blasted Al foil 304 can be further anodizing in a 0.3 M oxalic acid solution to obtain an anodic AAO template 306 with nanometer-sized holes 308. Specifically, the sand-blasted Al foil 304 can be put into the oxalic acid solution and acting as the anode. Another flat Al sheet can be used as the cathode. The distance between those two electrodes can be 5 cm. The operating voltage can be set up at 40 V by using a computer-interfaced power supply. During the anodization process, the solution can be maintained at a temperature of 15° C. by a circulator. As a result, the AAO template 306 with nanometer-sized holes 308 can be obtained. A Hitachi SU8010 field emission scanning electron microscope (SEM) can be used to measure the size and shape of PTFE hierarchical micro-/nanostructures and the pore diameter of AAO template. FIG. 4 provides an exemplary SEM image of the AAO template 306 with irregular microstructures and nanometer-sized holes.

Next, after cleaning the AAO template 306 with water, a commercial PTFE precursor (AF 601S2, 6 wt %, DuPont) can be poured into the AAO template. A conventional vacuum process can be applied to remove the air remaining in the nanoholes.

After the curing at ambient temperature for one day, the solvent can evaporate, leaving behind a PTFE thin film 311 with hierarchical micro-/nanostructures. Finally, the PTFE thin film 311 can be peeled off from the AAO template by using a double-sided tape 312.

In one embodiment, the electrode 104 of the water-TENG can include a Cu thin film. The Cu thin film can have a thickness about 100 nm. In one embodiment, Cu thin films can be deposited on PMMA substrates by a RF magnetron sputtering deposition system. Conducting wires can be connected to the Cu thin films as leads for subsequently electrical measurements.

Once the PTFE thin film 311 is peeled off from the AAO template by using the double-sided tape 312, the double-sided tape 312 can then be attached to the Cu electrode 104 deposited PMMA substrate to form the complete water-TENG 100.

The water-TENG 100 works substantially different from the working mechanism of the Kelvin water dropper. The working mechanism of the water-TENG 100 can include a sequential contact-electrification and electrostatic-induction process.

Figure 5:
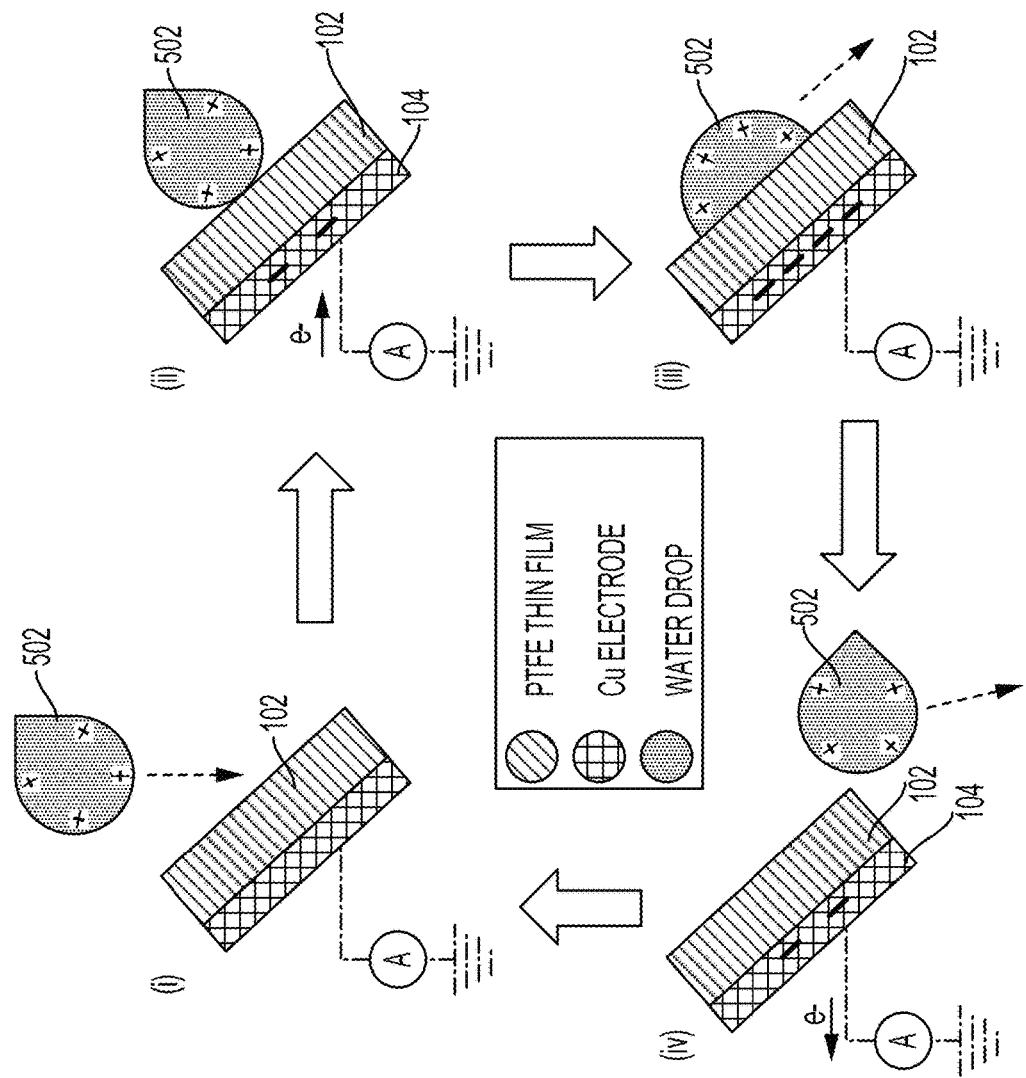
FIG. 5 schematically illustrates an operating principle of the water-TENG for harvesting energy from a water drop according to one aspect of the disclosed technology.

FIG. 5 schematically illustrates the working mechanism of a single-electrode-based water-TENG 100. As shown in step (i), when the water drop 502 falls from the sky or flows through an insulating tube, triboelectricity is created and causes the surface of the water drop 502 to be positively or negatively charged. In one example, each water drop 502 can have a surface charge density of 4.5 µC/m$^2$. The charge on the water drop surface can be positive or negative depending on the counterpart that the drop interacts with. For simplicity purposes, positive charges on the water drop surface are used in FIG. 5 to illustrate the process of converting the electrostatic energy to electricity.

With continued reference to FIG. 5, at step (ii), as the positively charged water drop 502 reaches the surface layer 102, a positive electric potential difference can be established between the water drop 502 and ground. In the short-circuit case, the electrons can transfer from ground to the electrode 104 to balance the potential from the water drop 502 and finally reach an equilibrium condition at step (iii). This contributes to an instantaneously positive current. The charge density on the water drop surface and the contact area between the water drop 502 and the surface layer 102 can affect the inductively transferred charges on the electrode 104, which, in turn, can affect the magnitude of the generated current.

At step (iv), once the water drop moves off the surface layer 102, it causes a negative electric potential difference and therefore, the electrons can flow from the electrode 104 to ground, until achieving a new equilibrium at step (i). This process corresponds to another instantaneously negative current. If the water drops and contacts the surface layer 102 periodically, an AC output can be continuously generated. To obtain the maximum electricity output, the water drop should be completely off after contacting the surface layer 102 to keep the surface layer 102 clean for the next cycle. When the surface layer 102 is superhydrophobic, the electricity output can be improved.

FIGS. 6A-E illustrates working mechanism of the water-TENG 100 in case of flowing water or continuous water drops such as raindrop. Again, a sequential process of contact electrification and electrostatic induction is involved.

As shown in FIG. 6B, once water is left on the surface layer 102, a thin water layer 604 can be formed on the surface layer 102 during the energy harvesting process. The water layer 604 can be a positively charged thin layer. As shown in FIG. 6C, a positive electric potential difference can occur, causing the electrons to transfer from ground to the electrode 104 to balance the potential difference and reach equilibrium. As positively charged water drops 602 fall on the thin water layer 604, another positive electric potential difference can occur between the water drops and ground. Then, electrons can transfer from ground to the electrode 104 to balance the potential difference and achieve equilibrium, as shown in FIG. 6D. This contributes to an instantaneously positive current.

As shown in FIG. 6E, once the water drops move off the water thin layer 604, a negative electric potential difference occurs. As a result, the electrons can flow from the electrode 104 to ground, until achieving a new equilibrium as illustrated in FIG. 6B. This process corresponds to another instantaneously negative current. If the water drops fall on the thin layer-remained water-TENG periodically, continuous outputs can be generated and collected.

In one experiment, to measure the electrical output of the water-TENG 100, a programmable syringe pump (PHD 2000, Harvard Apparatus) is applied to control the volume and dropping speed of each water drop. In the experiment, the volume of each water drop is fixed at 30 µL, the dropping speed is around 1 m/s when the water drop falls from a height of 90 cm, and the tap water is chosen as the water source. In the experiment, the electrical outputs of water-TENG are measured using a programmable electrometer (Keithley Model 6514) and a low-noise current preamplifier (Stanford Research System Model SR570).

Figure 7A:
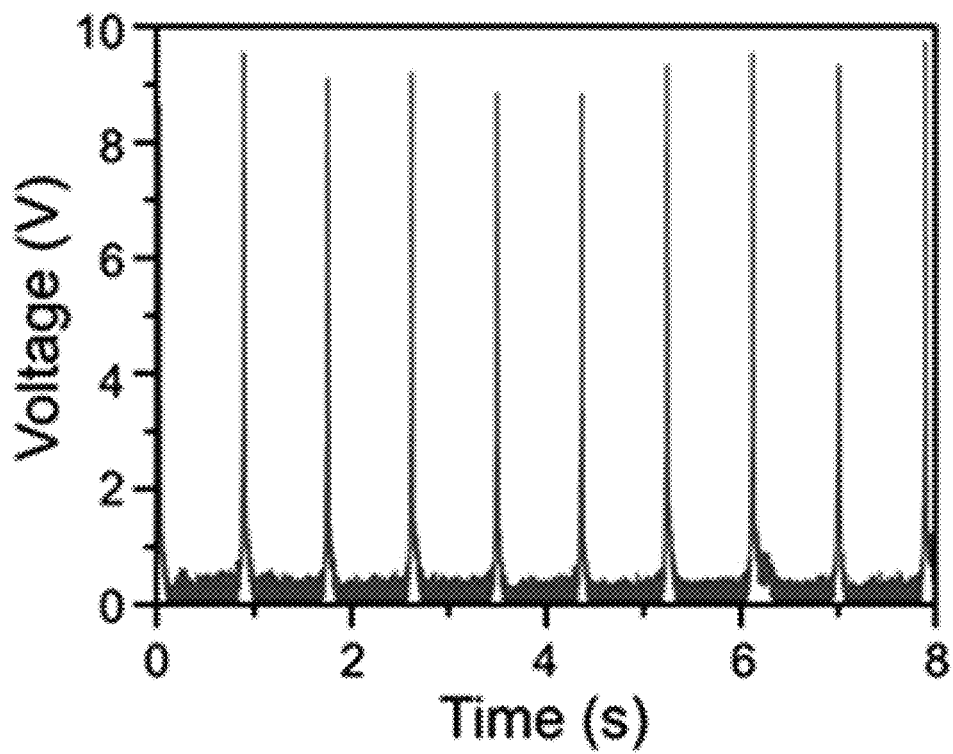
FIG. 7A illustrates output voltage of the water-TENG according to one aspect of the disclosed technology.

From a 30 µL water drop, the water-TENG 100 can generate a peak voltage of 9.3 V. FIG. 7A illustrates that the output voltage of 9.3 V is switched between zero and a pinnacle value, which correspond to the separated and contacted status.

Figure 7B:
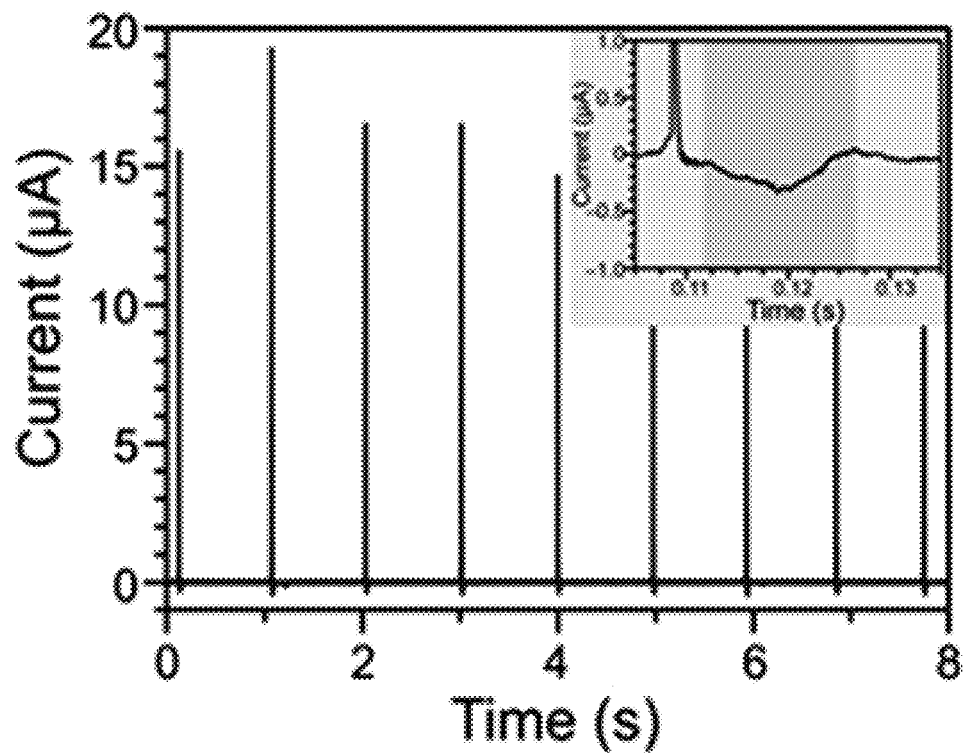
FIG. 7B illustrates output current of the water-TENG according to one aspect of the disclosed technology.

From a 30 µL water drop, the water-TENG 100 can generate a peak current of 17 µA. FIG. 7B illustrates that the output current reaches a value of 17 µA and exhibits AC behavior, with an equal amount of electrons flowing in opposite directions within one cycle. The inset of FIG. 7B is the magnified output curve in one cycle. The inset of FIG. 7B illustrates that the current peak corresponding to separating has a smaller magnitude but lasts longer than that for contacting. This observation can be explained by the fact that separating corresponds to a slower process and thus a smaller but wider current signal.

Figure 7C:
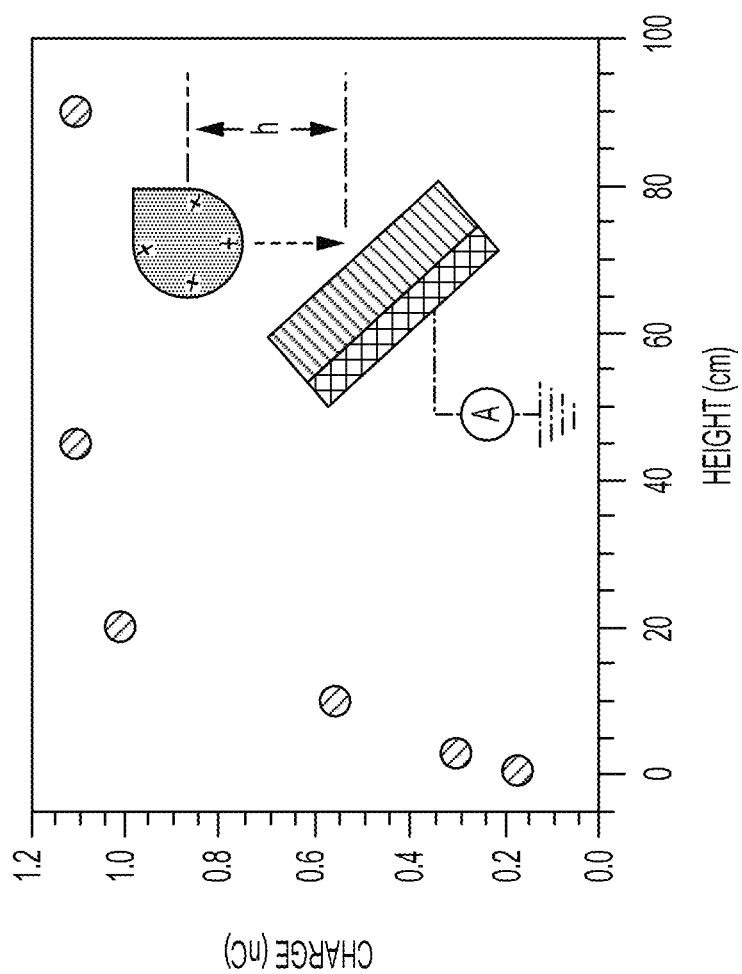
FIG. 7C illustrates a relationship between water drop falling height and inductively transferred charges of the water-TENG according to one aspect of the disclosed technology.

The output performance of the water-TENG 100 can depend upon the water falling distance. Specifically, the charge density on the water drop surface can impact the generated output. FIG. 7C illustrates a relationship between the triboelectricity and the water falling distance. The inductively transferred charges on the electrode can be deduced by integrating the current peak of the water-TENG obtained at different falling heights from the contact surface. The inductively transferred charges on the electrode can be proportional to the charge density of water drop. As shown in FIG. 7C, the inductively transferred charges are increased when enlarging the falling height, and finally saturated at a falling height of 20 cm, corresponding to the maximum charges that a water drop can hold. FIG. 7C verifies that the triboelectricity does exist when the water drop falls through the air, and also indicates that the concept can be applied to harvest the raindrop energy from the environment.

Figure 7D:
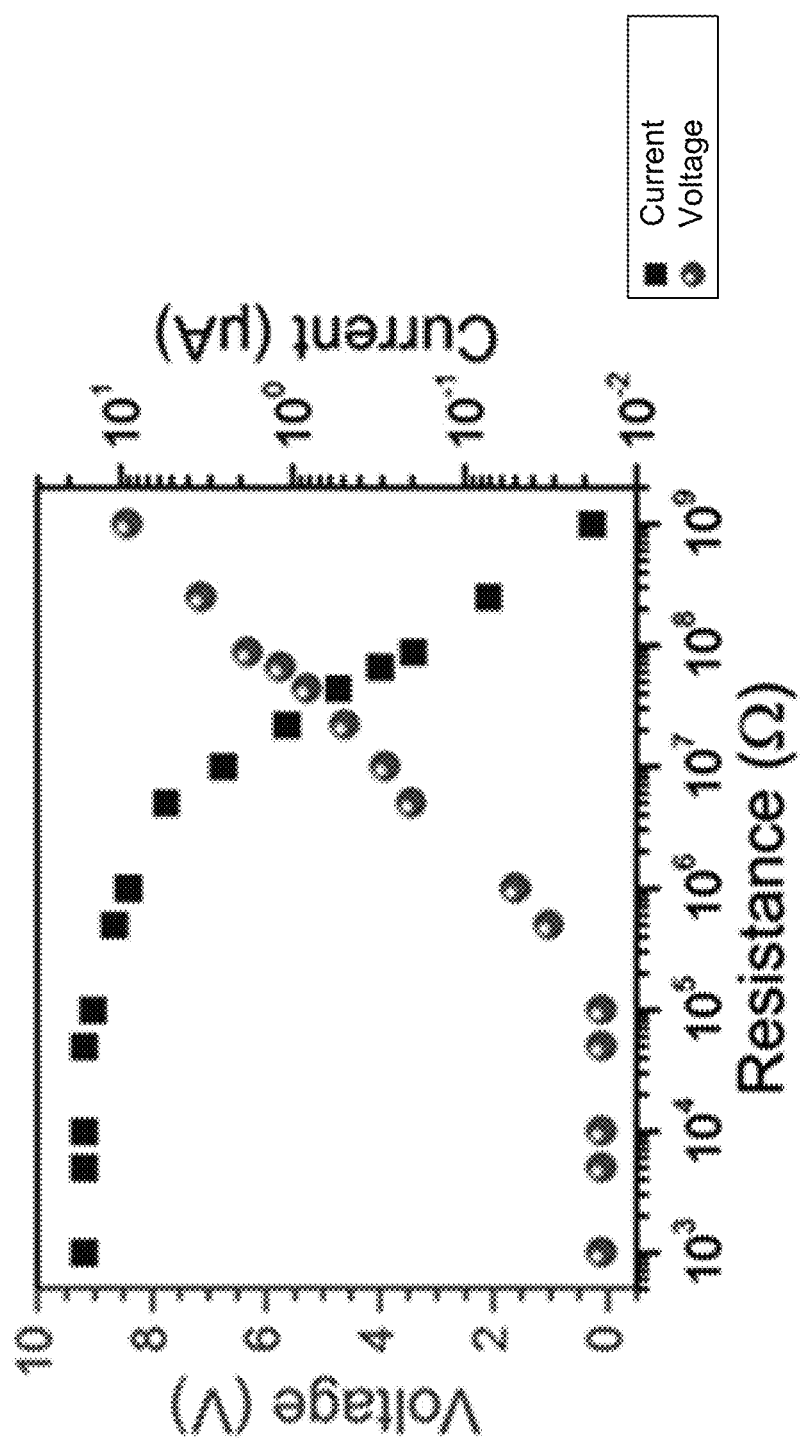
FIG. 7D illustrates dependence of output voltage and output current of the water-TENG on the resistance of the external load according to one aspect of the disclosed technology.
Figure 7E:
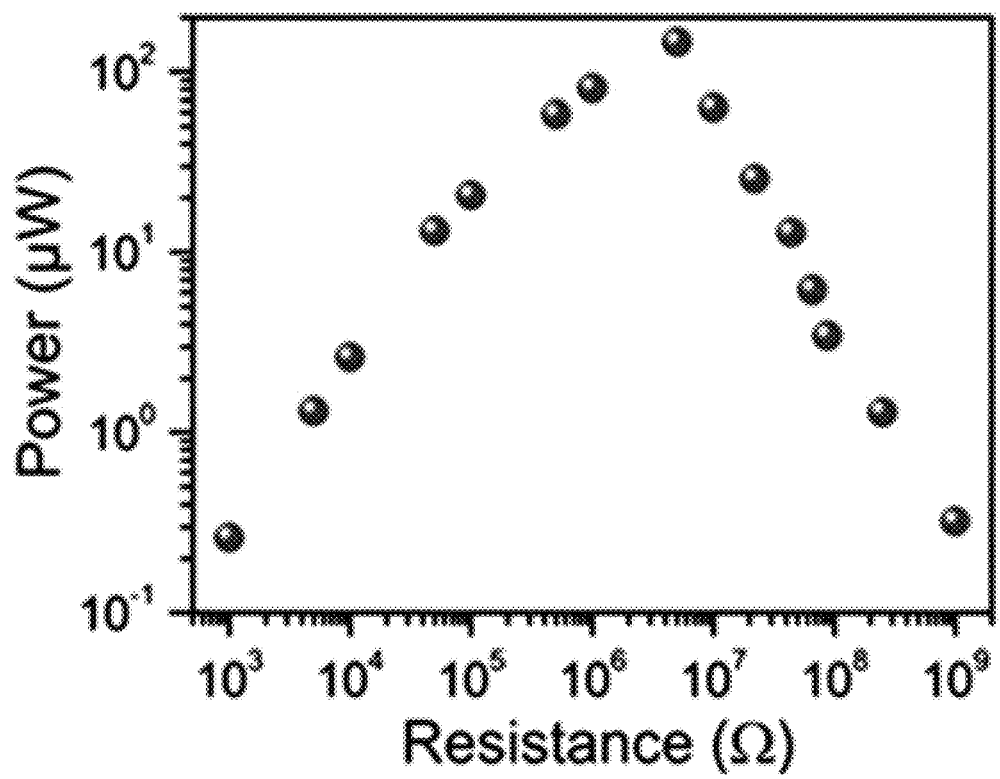
FIG. 7E illustrates dependence of output power of the water-TENG on the resistance of the external load according to one aspect of the disclosed technology.
Figure 7F:
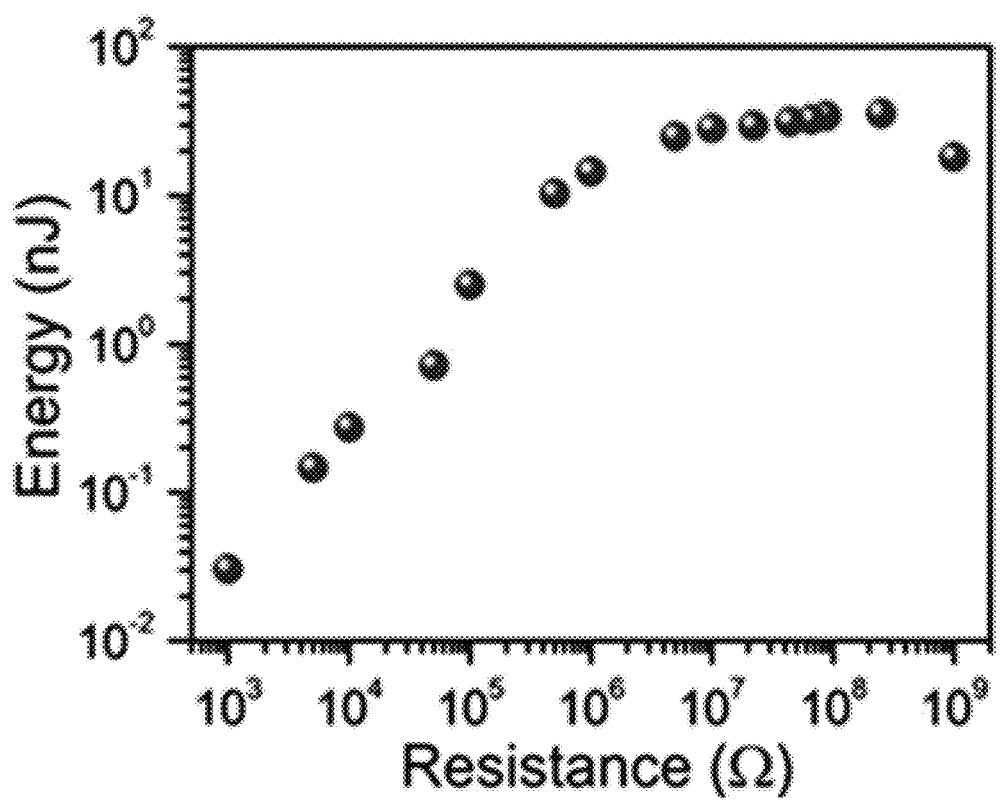
FIG. 7F illustrates dependence of output energy of the water-TENG on the resistance of the external load according to one aspect of the disclosed technology.

The output performance of the water-TENG 100 can depend upon the load resistance. In one experiment, the electrical output of the water-TENG 100 is measured by connecting the water-TENG 100 directly to loads of various resistances at a falling height of 90 cm. As shown in FIG. 7D, when the resistance is below 0.1 MΩ, the voltage remains close to 0 and the current density almost has no change. When the resistance increases from 0.1 MΩ to 1 GΩ, the voltage through the load generally increases, but the current across the load follows an opposite trend. Therefore, as illustrated in FIG. 7E, the instantaneous power on the load remains small with the resistance below 0.1 MΩ and reaches the maximum value of 145 µW at a resistance of 5 MΩ. The generated output here is from a single water drop. The output energy is also calculated by the time integral of $I^2R$, as illustrated in FIG. 7F. As shown in FIG. 7F, the curve exhibits that the output energy increases as the resistance increases, and gradually saturates at a resistance of 22 MΩ (30 nJ), which is 3 orders of magnitude larger than that of 1 KΩ (0.03 nJ).

Figure 8A:
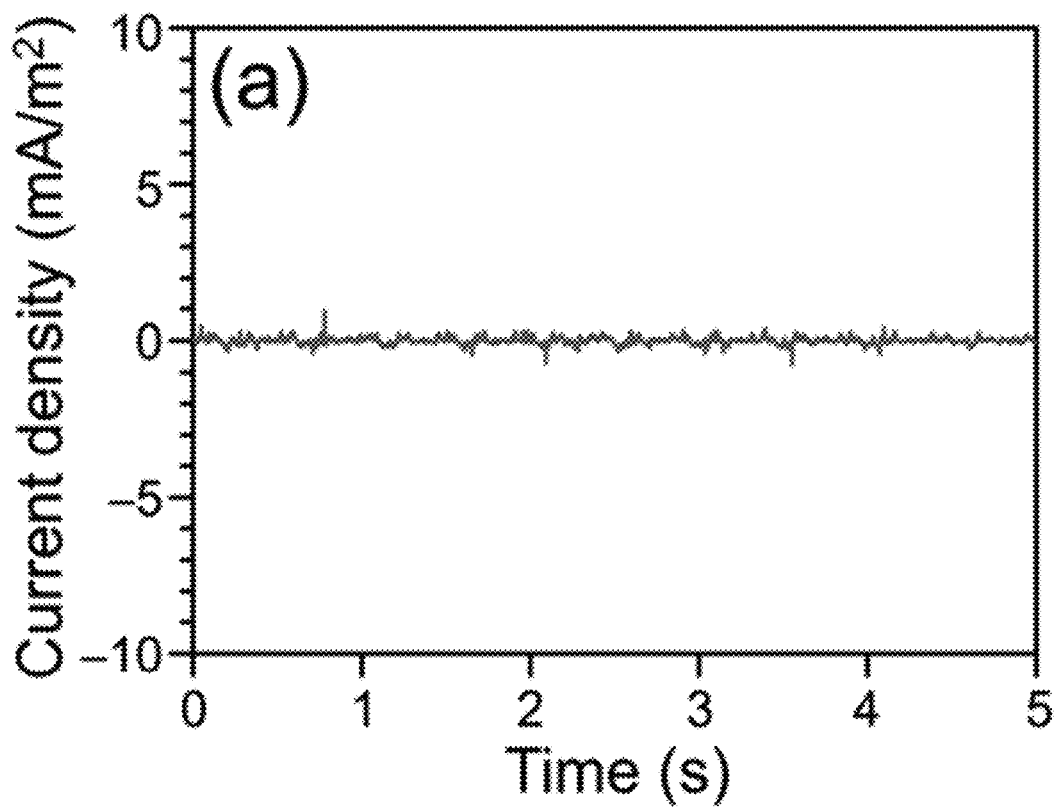
FIG. 8A illustrates output current density of a water-TENG having a hydrophilic Nylon film with a smooth surface according to one aspect of the disclosed technology.
Figure 8B:
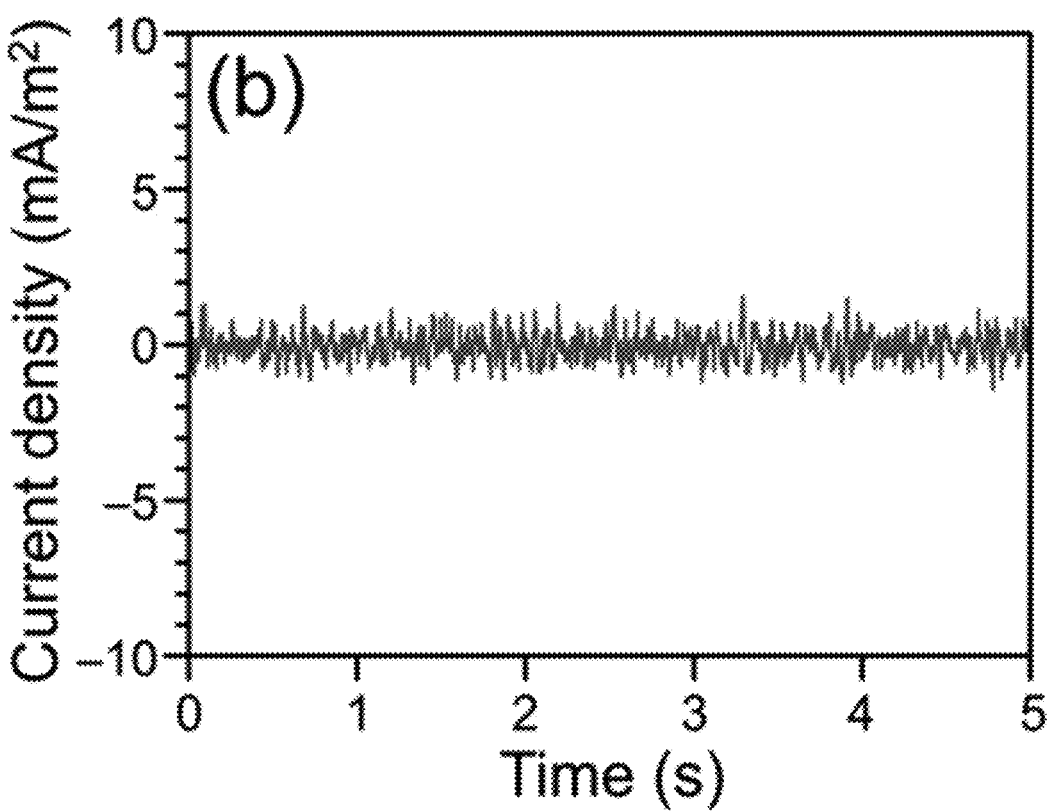
FIG. 8B illustrates output current density of a water-TENG having hydrophobic PTFE film with a smooth surface according to one aspect of the disclosed technology.

The output performance of the water-TENG 100 can depend upon the superhydrophobic nature of the surface layer 102. In one experiment, the water-TENG 100 is modified by removing the superhydrophobic nature, for example by replacing the superhydrophobic PTFE film 102 with hydrophilic Nylon film and hydrophobic PTFE film with a smooth surface. FIGS. 8A and 8B respectively illustrate the output performance of the two modified water-TENG generators. Both of the results clearly show the importance of superhydrophobic surface.

The water-TENG 100 can be used to collect the energy of a continuously flowing tap water from a kitchen faucet. The output current density and instantaneous power density can reach 15 mA/m$^2$ and 0.2 W/m$^2$, respectively, when considering the water-TENG dimensions. The output can directly drive 20 light-emitting diodes (LEDs) instantaneously.

Figure 9A:
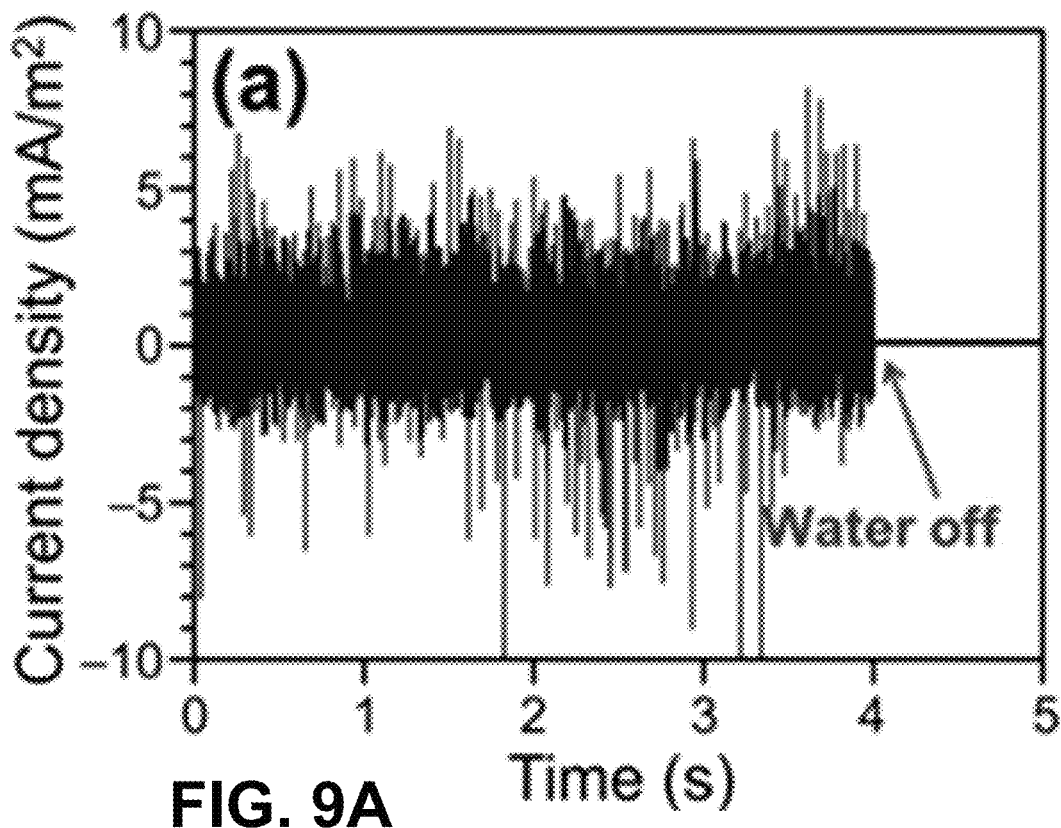
FIG. 9A illustrates output current density of the water-TENG when harvesting energy from flowing tap water according to one aspect of the disclosed technology.
Figure 9B:
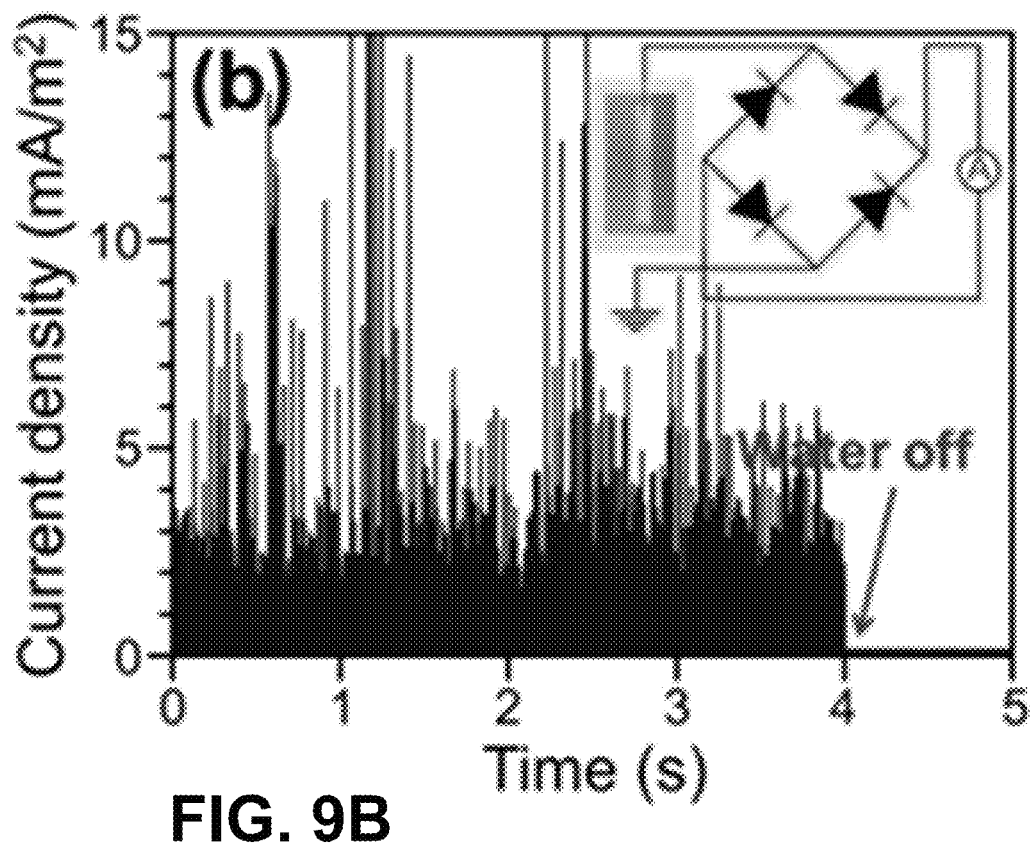
FIG. 9B illustrates AC output transformed to pulse output in the same direction by a full-wave rectifying bridge according to one aspect of the disclosed technology.
Figure 9C:
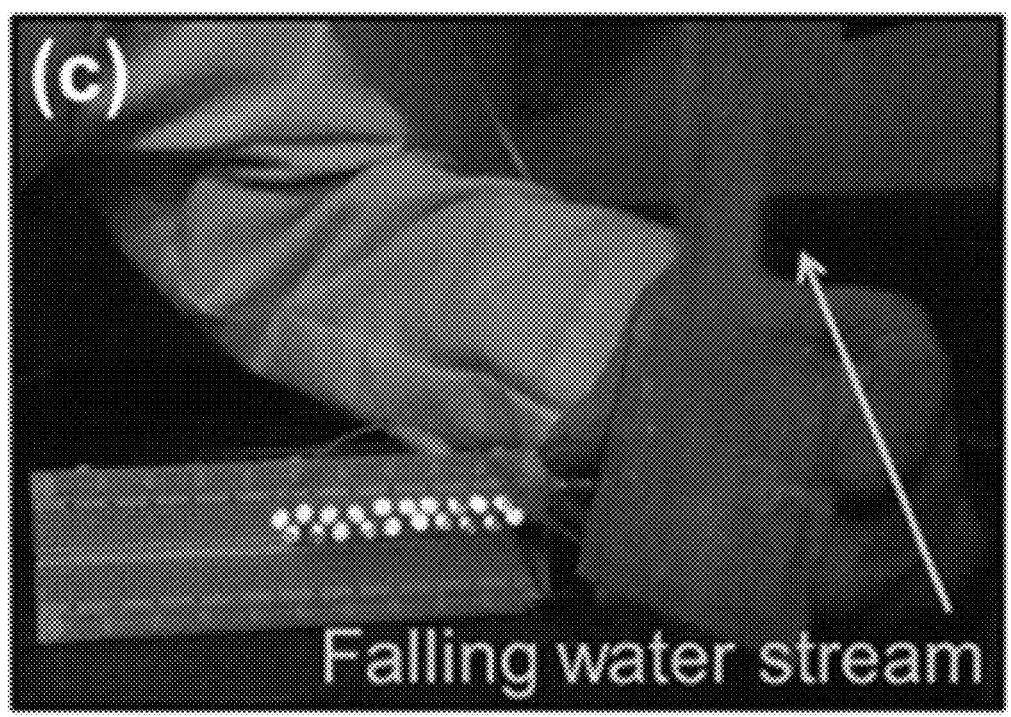
FIG. 9C is a photograph of the water-TENG used as a direct power source to light up 20 LEDs according to one aspect of the disclosed technology.
Figure 9D:
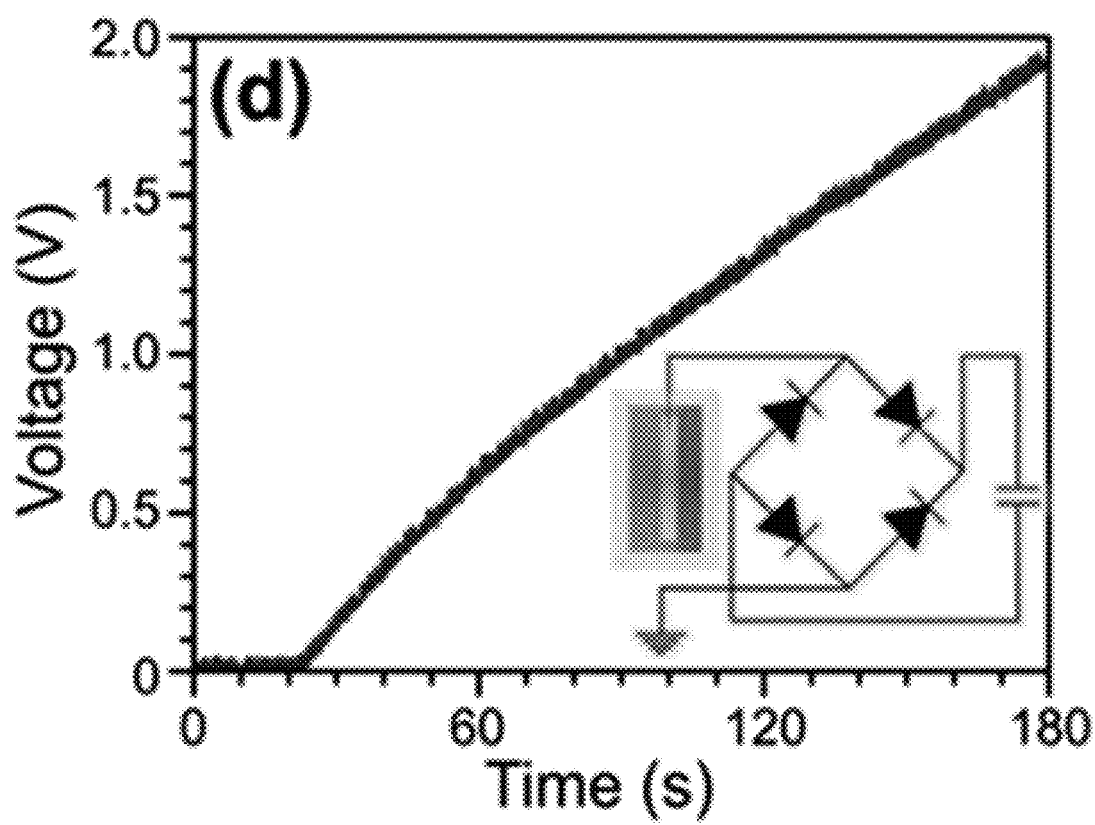
FIG. 9D illustrates a rectified output of the water-TENG used to charge a commercial capacitor of 33 µF.

In one experiment, the flowing rate of tap water is set up at around 30 mL/s and the distance between the water-TENG and faucet is 20 cm. To highlight the potential application, the generated output is divided by the water-TENG dimensions (4 cm×4 cm). FIG. 9A displays the output current density of the water-TENG. It is noticed that the maximum output current density can reach 15 mA/m$^2$ and the signal varies due to the unstable flowing of tap water from the faucet. The output signal becomes zero after the faucet is turned off, revealing that the output is generated from the faucet flowing water. As shown in FIG. 9B, the AC output can be transformed to pulse output in the same direction simply by a full-wave rectifying bridge. The inset of FIG. 9B provides a sketch of exemplary circuit connection polarities. The rectified output can be utilized to drive 20 commercial LEDs instantaneously as illustrated FIG. 9C, and charge a 33 µF capacitor as illustrated in FIG. 9D. The inset of FIG. 9D illustrates a sketch of exemplary circuit connection polarities.

As shown in FIG. 9E, the instantaneous peak to peak power density is determined about 0.2 W/m$^2$ when the water-TENG is connected to a 5 MΩ load resistor.

Figure 10A:
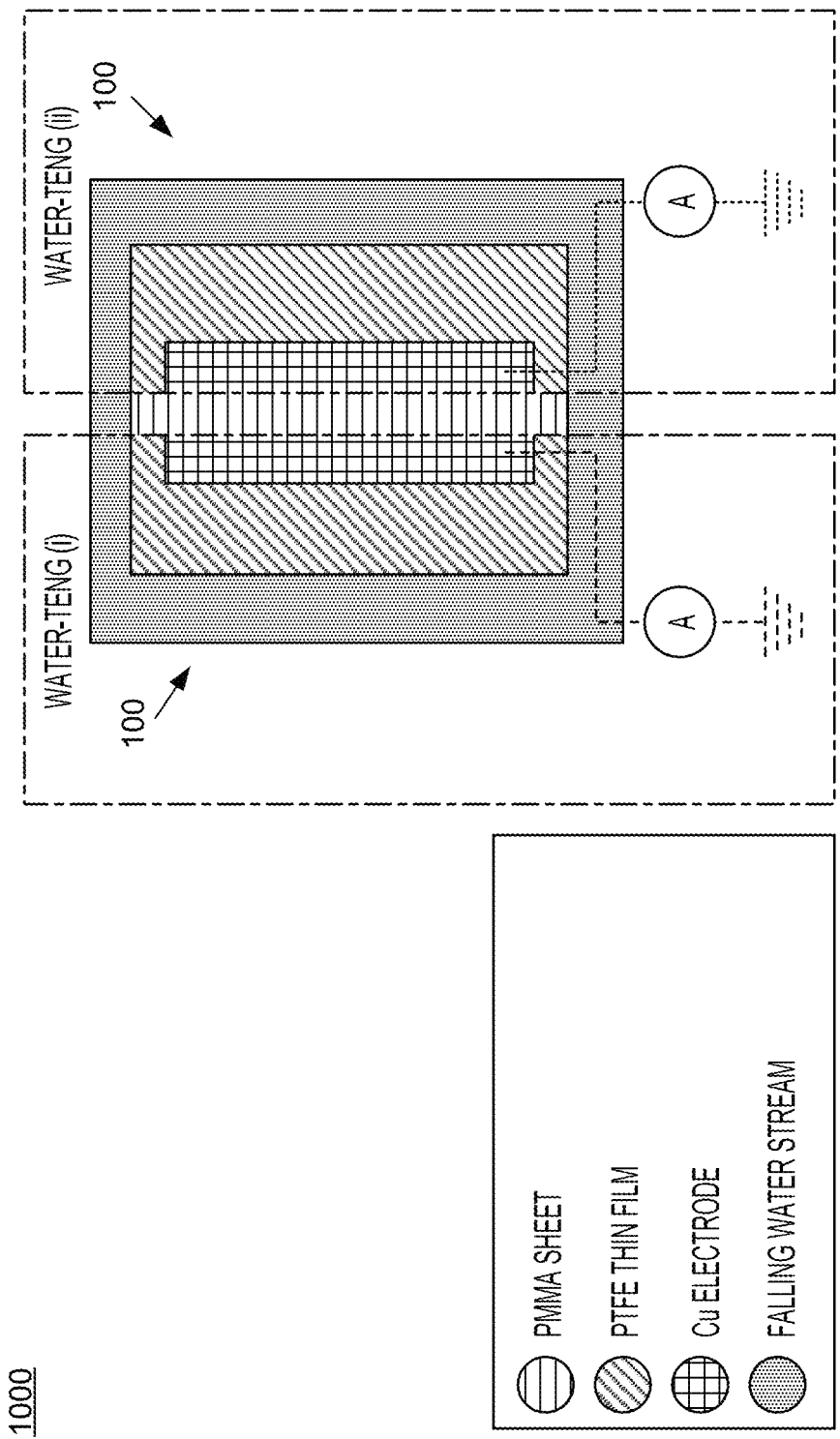
FIG. 10A provides a schematic illustration of a double-layered water-TENG according to one aspect of the disclosed technology.
Figure 10B:
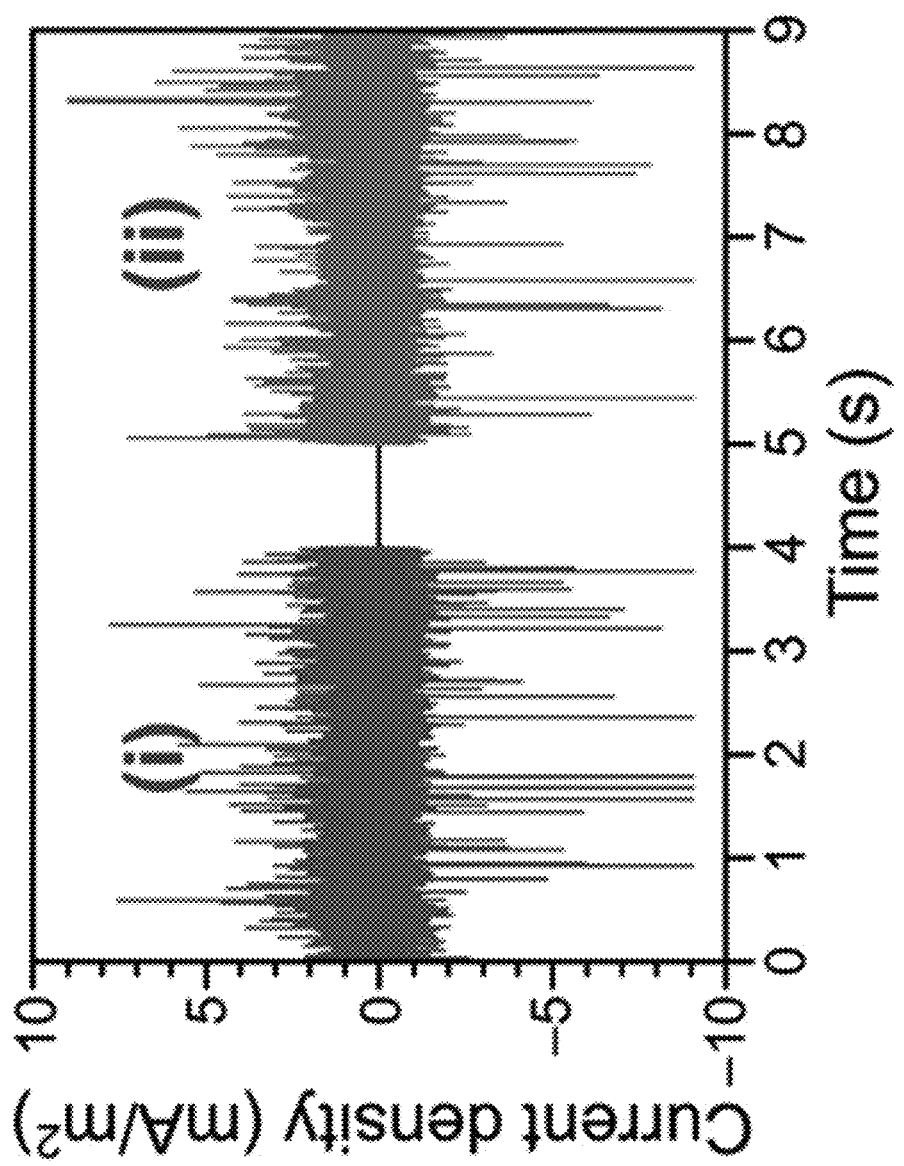
FIG. 10B illustrates output current density of the double-layered water-TENG when harvesting energy from flowing tap water according to one aspect of the disclosed technology.

FIG. 10A illustrates a multilayer-based device 1000 to harvest energy from water according to one aspect of the disclosed technology. The device 1000 can include multiple layers of the water-TENG 100 described earlier. In one example, the device 1000 can be a double-layered water-TENG. The double-layered water-TENG 1000 can be more effective than the single-layered water-TENG 100 in harvesting energy from faucet flowing water. FIG. 10B shows that the double-layered water-TENG 1000 can provide twice generated output as compared to that of single-layered water-TENG as illustrated in FIG. 9A.

Flowing water carries two types of energies. One type of energy is electrostatic energy due to the existence of triboelectric charges on its surface as a result of contact with surrounding media due to the contact electrification, such as contact with air/solid surface during its traveling processes in pipe and/or air. The other type of energy is mechanical kinetic energy.

The disclosed technology includes various embodiments of a hybrid TENG designed to simultaneously harvest the electrostatic and mechanical kinetic energies of flowing water. Detailed discussions with respect to these alternative embodiments are provided herein.

Figure 11A:
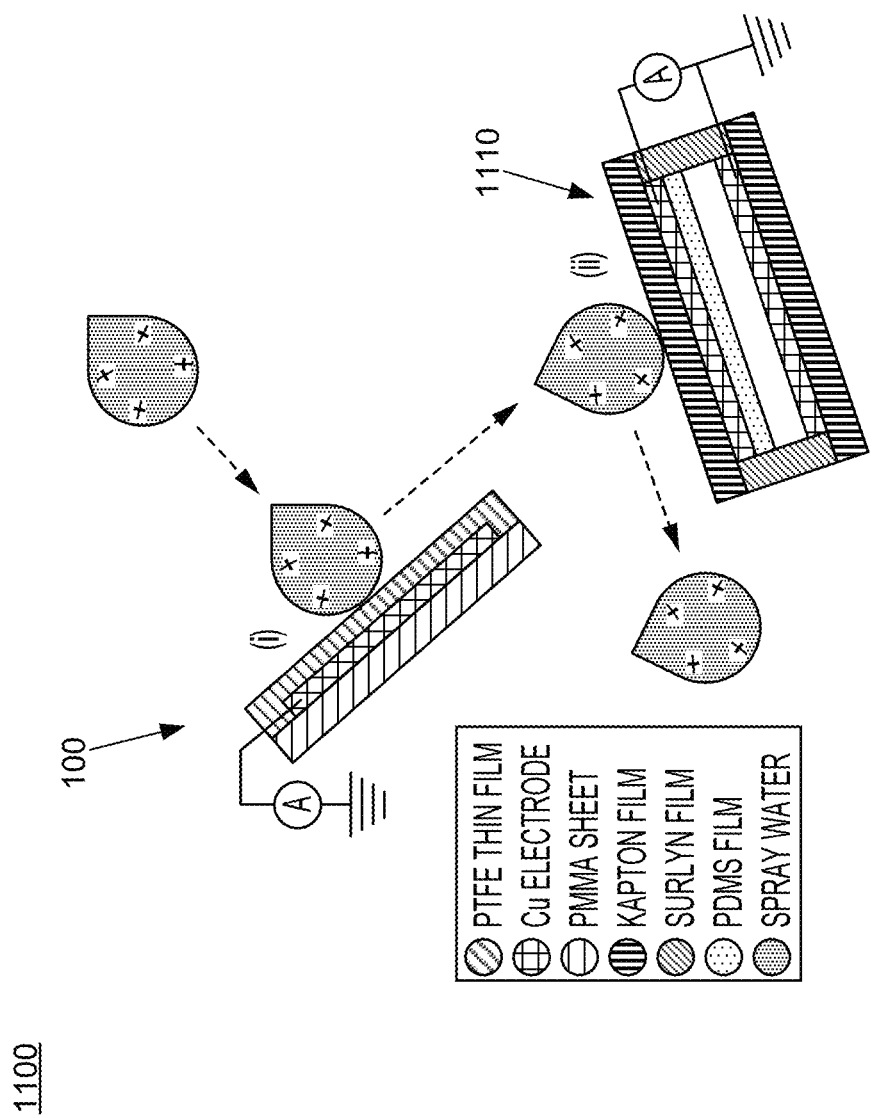
FIG. 11A provides a schematic diagram of an integrated TENG system having a water-TENG and a packaged conventional TENG according to one aspect of the disclosed technology.

FIG. 11A illustrates an integrated energy collection system 1100 including a water-TENG 100 (also denoted by (i) in the figure) and a packaged TENG 1110 (also denoted by (ii) in the figure) according to one aspect of the disclosed technology. The water-TENG 100 can harvest the electrostatic energy, whereas the packaged TENG 1110 can harvest the mechanical energy. The system 1100 can effectively collect, including but not limited to, the spray water drop energy as well as the raindrop energy, among other possibilities.

Figure 11B:
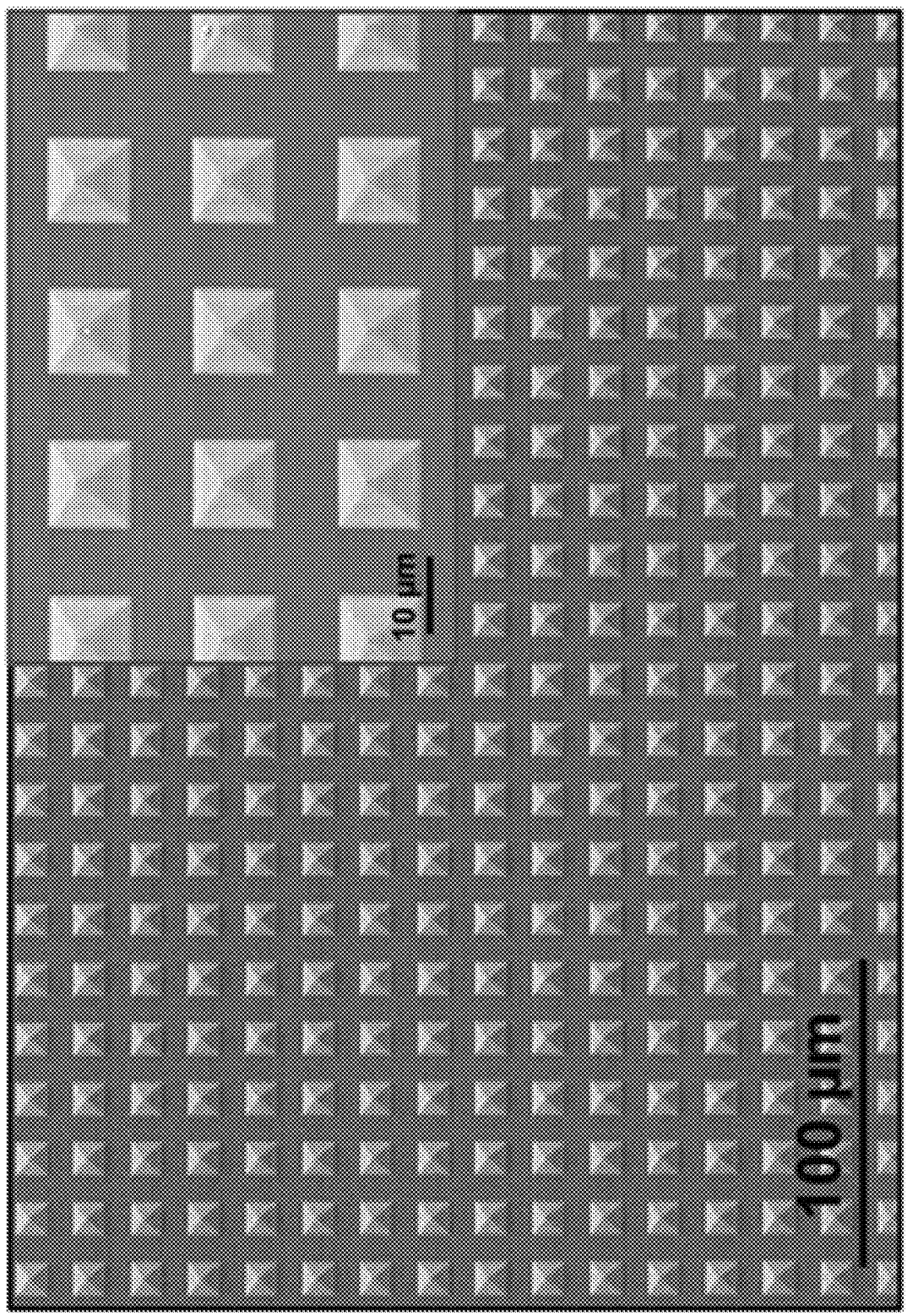
FIG. 11B provides a SEM image of a patterned polydimethylsiloxane (PDMS) pyramid array according to one aspect of the disclosed technology.

Fabrication of the packaged TENG 1110 can start from the design of PDMS film with patterned pyramid array as illustrated in FIG. 11B. The inset of FIG. 11B is a SEM image at a higher magnification.

At first, a Si wafer can be molded using photolithography. Then, the wafer can be etched through a dry etching process, resulting in the Si wafer mold with a notched pyramid feature. After a clean wash by acetone and ethanol, the prepared Si wafer mold can be treated with chlorotrimethylsilane to avoid the adhesion between PDMS and Si in the next step. A PDMS mixture can be spin-coated (1000 rounds per minute (rpm), one minute) on the Si wafer mold and then incubated at 60° C. The PDMS can include PDMS elastomer and cross-linker in a ratio of 5:1. After 24 hours, a uniform PDMS film with patterned pyramid array can be formed.

100 nm of Cu thin films can be deposited on two Kapton substrates (127 μm, DuPont) by a RF magnetron sputtering deposition system. Conducting wires can be connected to the Cu thin films as leads for subsequently electrical measurements.

The formed PDMS film with patterned pyramid array can be peeled from Si wafer mold and then placed onto a Cu thin film-deposited Kapton substrate with uncured PDMS mixture on the top, then incubating at 60° C. for another 24 hours. Finally, those two Kapton substrates can be assembled by using a 60 μm-thick hot-melt ionomer film (Surlyn 1702, DuPont) under heating at 150° C. for 10 minutes and a fully packaged TENG is obtained.

Figure 11C:
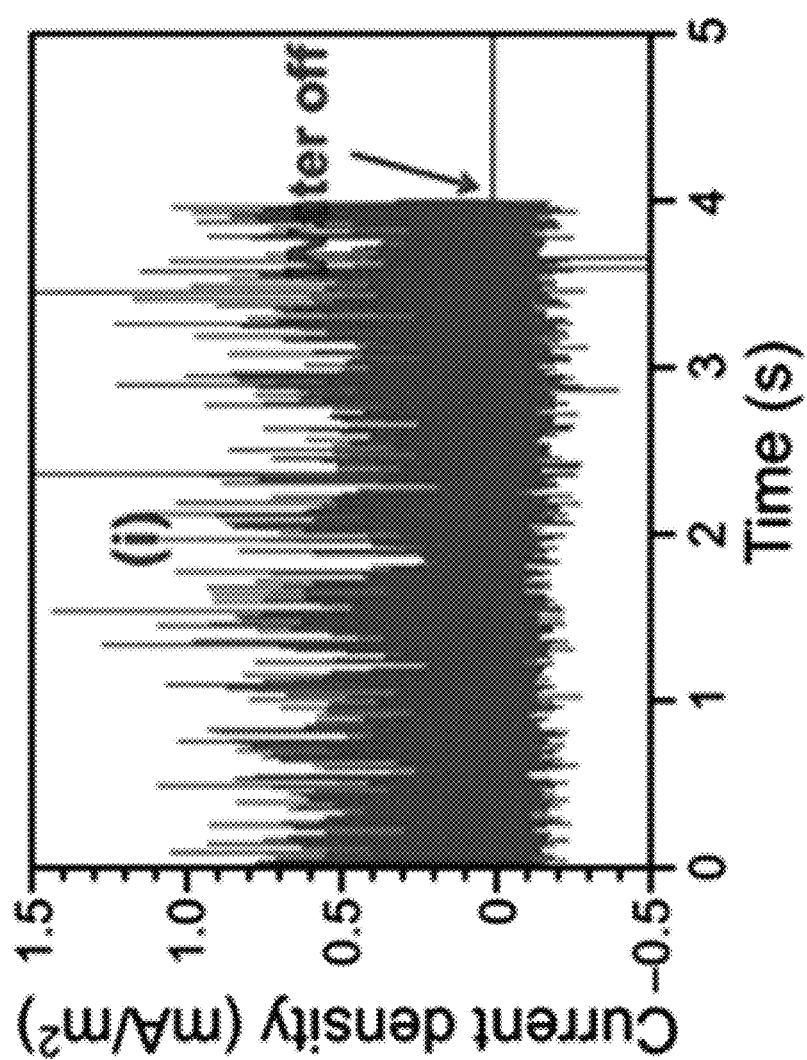
FIG. 11C illustrates output current density of the water-TENG of the integrated TENG system of FIG. 11A according to one aspect of the disclosed technology.
Figure 11D:
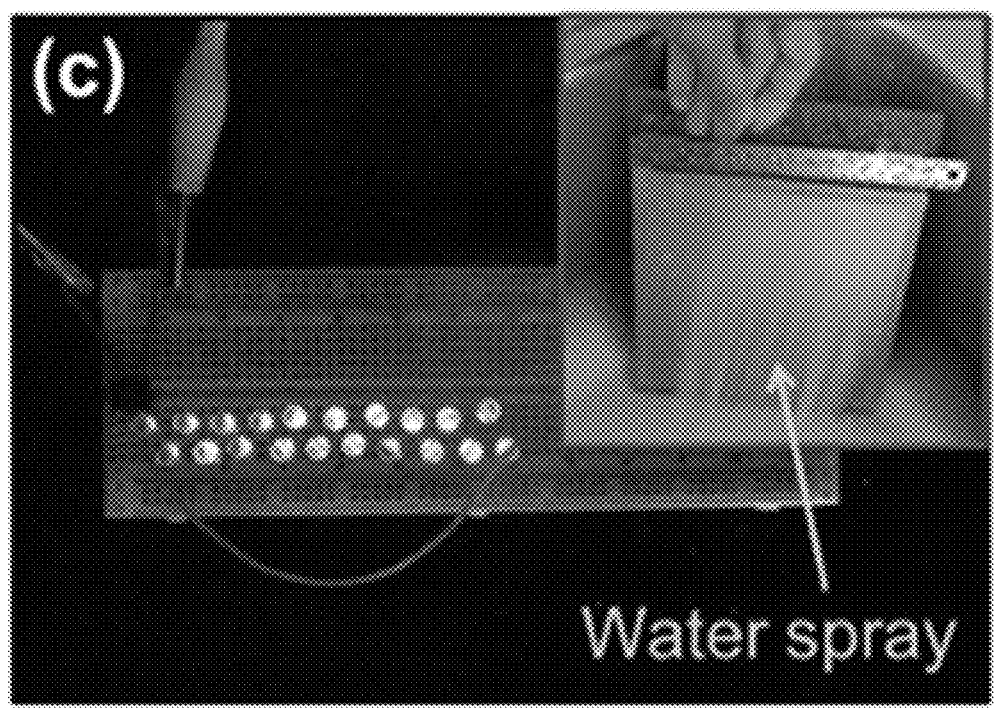
FIG. 11D provides a photograph of the water-TENG used as a direct power source to light up 20 LEDs according to one aspect of the disclosed technology.

In one experiment, to measure the output performance of the system 1100, the water-TENG 100 is configured to dimensions of 15 cm×15 cm. In the experiment, a household shower jet system is used for the demonstration of the spray water drop. FIG. 11C illustrates that the water-TENG 100 of the system 1100 can achieve a maximum output current density of 1.5 mA/m$^2$. The water-TENG 100 can be the primary source for harvesting energy from the spray water drop. The rectified output can successfully power 20 commercial LEDs instantaneously as illustrated in FIG. 11D.

Figure 11E:
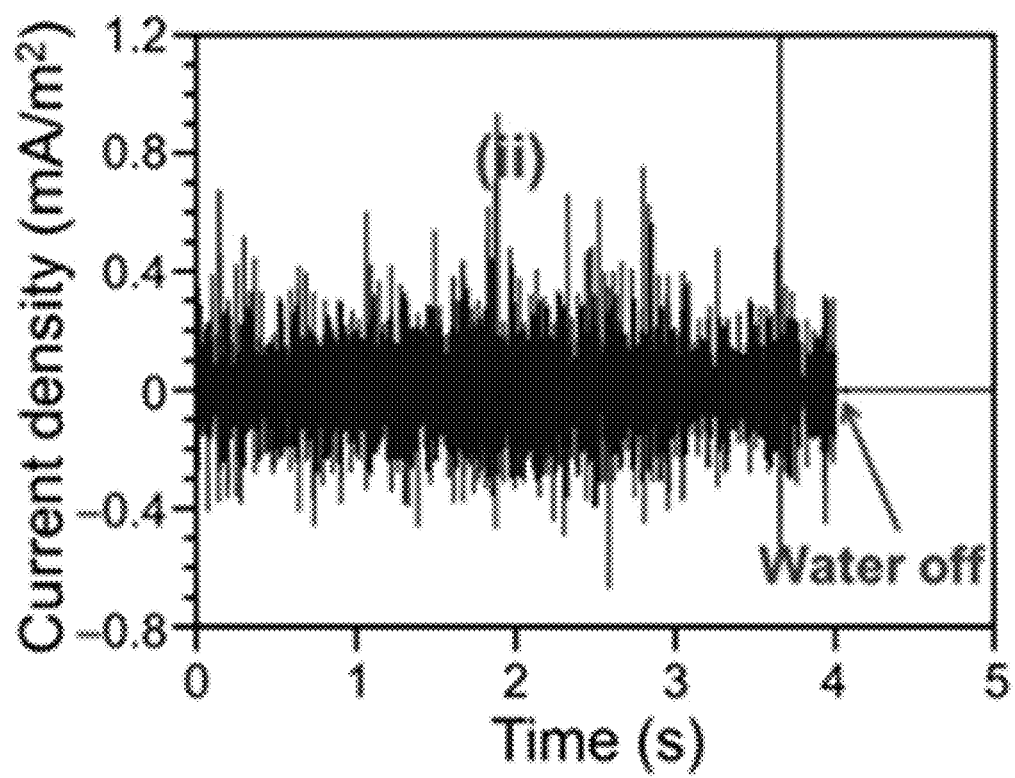
FIG. 11E illustrates output current density of the packaged conventional TENG according to one aspect of the disclosed technology.
Figure 11F:
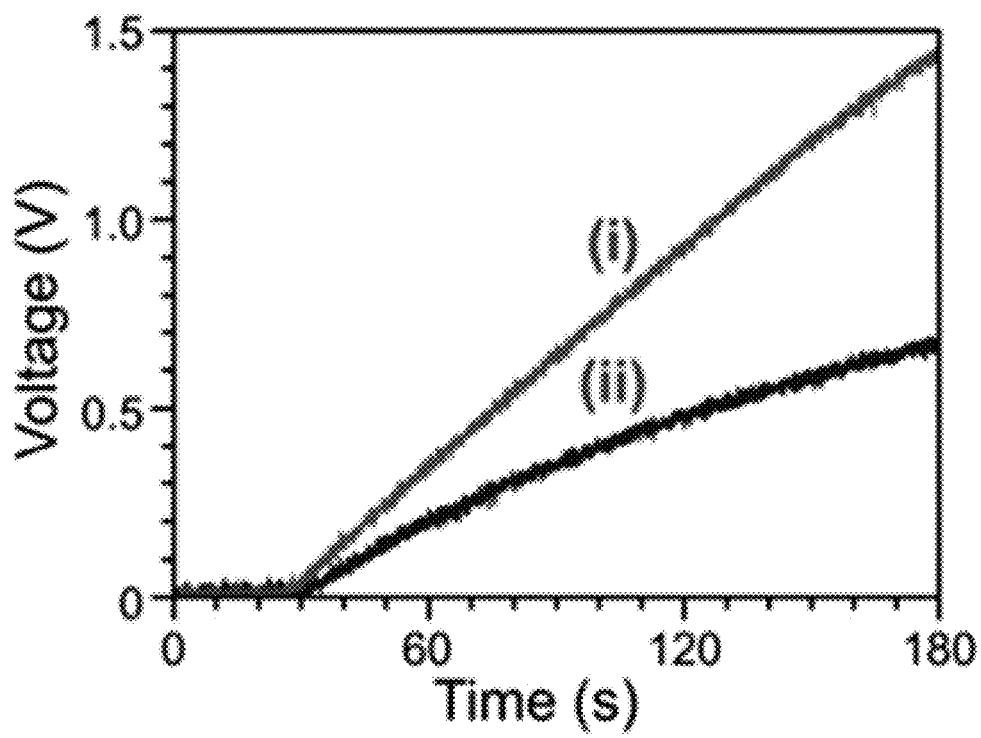
FIG. 11F illustrates both the rectified outputs from the water-TENG and the packaged TENG used to charge commercial capacitors of 33 µF according to one aspect of the disclosed technology.

Also, from FIGS. 11E and 11F, the packaged TENG 1110 can also successfully collect the mechanical energy of spray water drop. The packaged TENG 1110 can act as the secondary source for harvesting energy from the spray water drop.

Figure 11G:
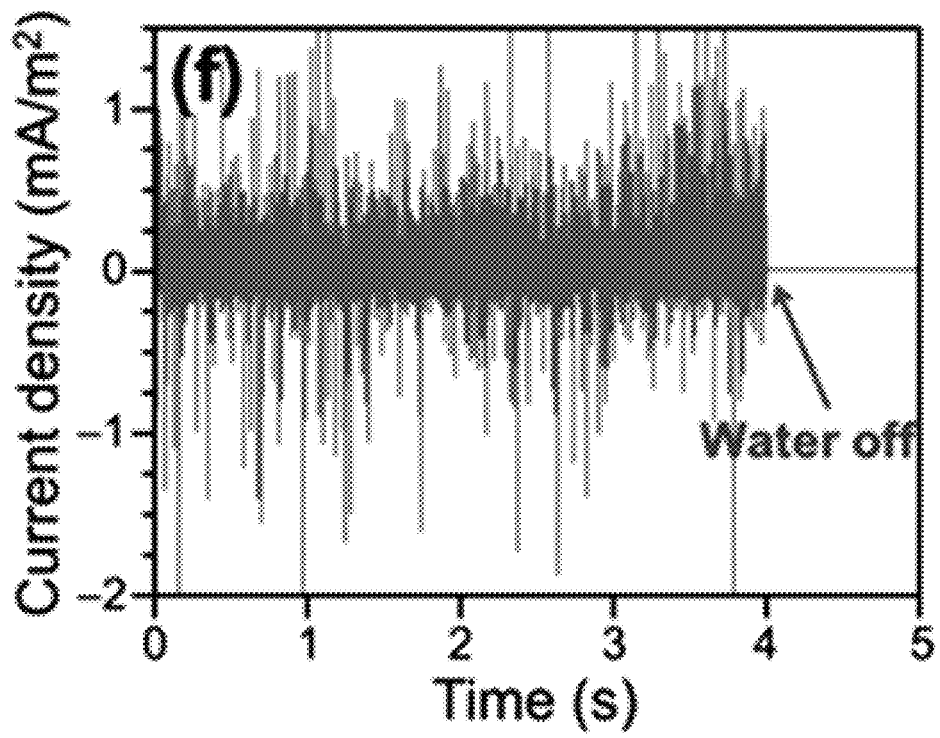
FIG. 11G illustrates output current density of the water-TENG for harvesting energy from spray water drop at a higher water temperature of 65° C. according to one aspect of the disclosed technology.

The rectified outputs of the system 1100 including the water-TENG 100 and the packaged TENG 1110 can charge a 33 g capacitor as illustrated in FIG. 11F. The generated output of the water-TENG 100 may not be impacted by a higher water temperature of 65° C., as illustrated in FIG. 11G.

Figure 12A:
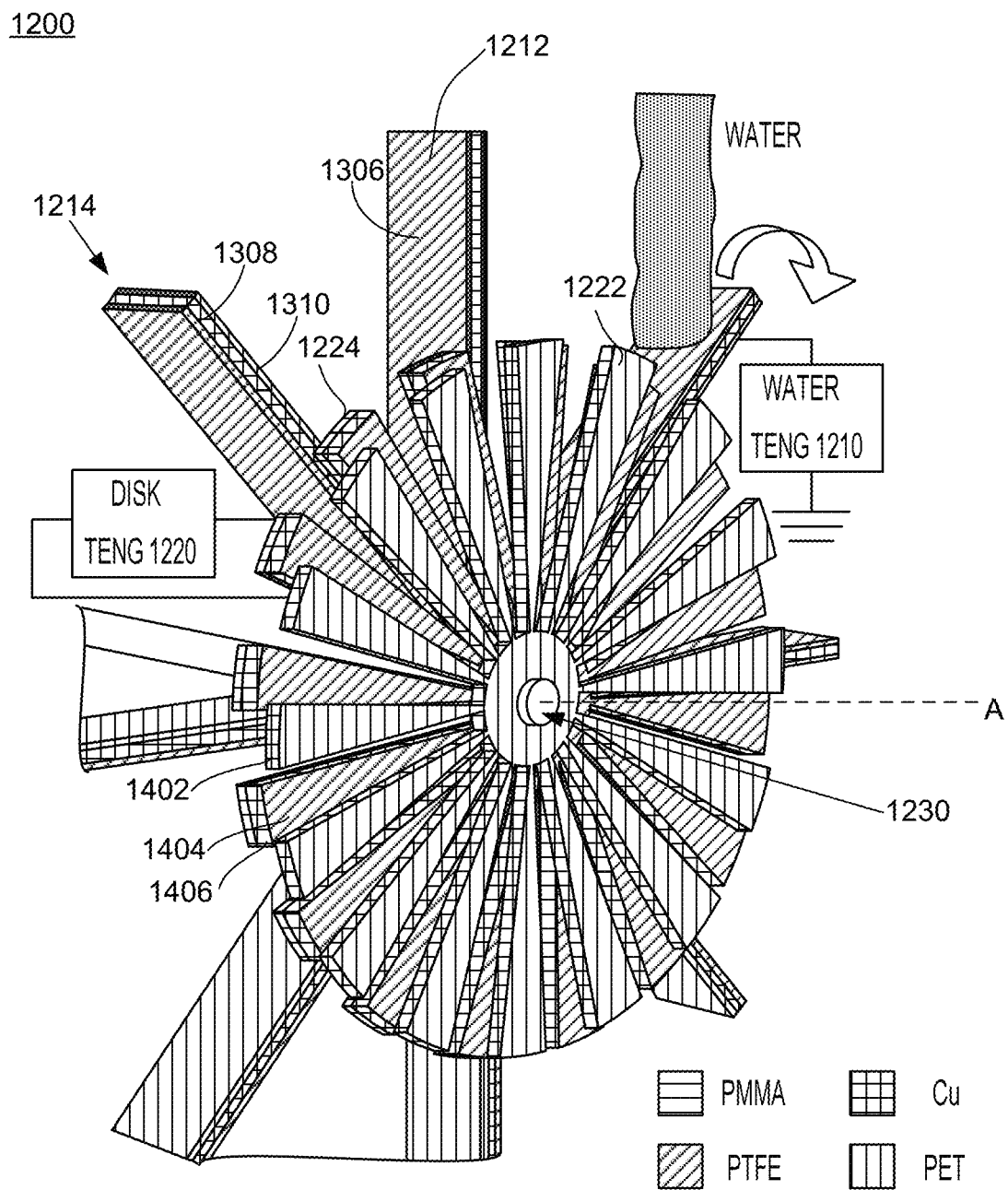
FIG. 12A provides a structure diagram of a water wheel hybridized TENG according to one aspect of the disclosed technology.

FIG. 12A illustrates a structure diagram of a water wheel hybridized TENG 1200. The generator 1200 can include a first component 1210 for receiving flowing water carrying triboelectric charges and harvesting electrostatic energy from the flowing water. The first component can be referred to as a water-TENG 1210. The generator 1200 can include a second component 1220 coupled to the first component for harvesting mechanical kinetic energy from the flowing water. The second component can be referred to as a disk-TENG 1220.

The water-TENG 1210 can include a plurality of wheel blades 1212. The plurality of blades 1212 can be arranged in a radially outward fashion. The plurality of blades 1212 can exhibit a wheel-like structure 1214. In one example, the water-TENG 1210 can include 8 blades and operate as a single-electrode-based TENG to harvest the electrostatic energy from flowing water.

Each blade 1212 can have a surface layer 1306 for receiving flowing water. The surface layer 1306 can be superhydrophobic. The surface layer 1306 can include a plurality of nanostructures thereon. In one example, the surface layer 1306 can include a material with a relatively less negative triboelectric series rating. Examples of suitable materials for the surface layer 102 can include, but not limited to, anyone or a combination of the following materials: PET, PMMA, PDMS, PTFE, FED, PVC, polyimide, metal and alloy, among many other possibilities.

Each blade 1212 can include an electrode 1308. An electrical channel can be formed between the electrode on each blade and ground. The electrode 1308 can include, but not limited to, anyone or a combination of the following materials: metal such as copper, gold, silver and aluminum, ITO and conductive polymer, among many other possibilities.

The electrode 1308 can be deposited on a substrate 1310. The substrate 1310 can include anyone or a combination of the following materials: PMMA and PET, among other possibilities.

The flowing water that falls upon each blade 1212 can carry triboelectric charges. The flowing water can affect a flow of electrons between the electrode 1308 and ground. The flowing water impacted on the blades 1212 can induce rotation of the disk-TENG 1220.

The disk-TENG 1220 can have a disk configuration. The disk-TENG 1220 can include two disks, a front disk 1222 and a back disk 1224. Each disk can exhibit a segmented disk profile. For example, each disk can include 16 segments as illustrated in FIG. 12A. Each disk can include an electrode. For example, as illustrated in FIG. 12A, the front disk 1222 can include a front electrode 1402, and the back disk 1224 can include a back electrode 1406. Each electrode can include, but not limited to, anyone or a combination of the following materials: metal such as copper, gold, silver and aluminum, ITO and conductive polymer, among many other possibilities.

The back disk 1224 can include a surface layer 1404 over the electrode 1406. The surface layer 1404 can be superhydrophobic. The surface layer 1404 can include a plurality of nanostructures thereon. The surface layer 1404 can include anyone or a combination of the following materials: PET, PMMA, PDMS, PTFE, FED, PVC, polyimide, metal and alloy, among many other possibilities.

A smooth metal rod 1230 can travel through the centers of the wheel-like structure 1214 and the two disks along the rotation axis "A".

The front disk 1222 can be fixed on the rotation axis and stays motionless during the whole process. A screw behind the back disk 1224 can be used to adjust the distance between the two disks. A closer contact can induce higher effective contact area, tribo-charge density, $V_{oc}$ and $I_{sc}$, while largely increasing the rotation resistance between the two disks. In one embodiment, the two disks can moderately contact in a low rotation resistance status, as seen in FIG. 14A. In FIG. 14A, the surface layer 1404 of the back disk 1224 is positioned between the back electrode 1406 and the front electrode 1402. The disk-TENG 1220 can harvest the mechanical energy of the water, in which an electrical channel is formed between the electrodes of the two disks.

The back disk 1224 can be rotatable with respect to the rotation axis "A" by energy flow, such as flowing water or wind, to change triboelectric charges on the front electrode 1402 and the back electrode 1406. Rotation of the back disk 1224 can affect a flow of electrons between the electrodes 1402 and 1406.

The back disk 1224 can be connected to the wheel-like structure 1214. The back disk 1224 can be rotatable such that it can rotate when the water-TENG 1210 receives the flowing water. For example, when a blade 1212 receives the flowing water, the blade 1212 can gather the flowing water force. The blade 1212 can induce rotation of the water-TENG 1210 and the back disk 1224 about a rotation axis "I" as depicted in FIG. 12A. The blade 1212 can gather the flowing water force to drive the rotation of the wheel-like structure 1214 and the back disk 1224.

The back disk 1224 can rotate together with the blades 1212 under the impact of flowing water. The disk-TENG 1220 can harvest mechanical kinetic energy from the flowing water during rotation.

Figure 12C:
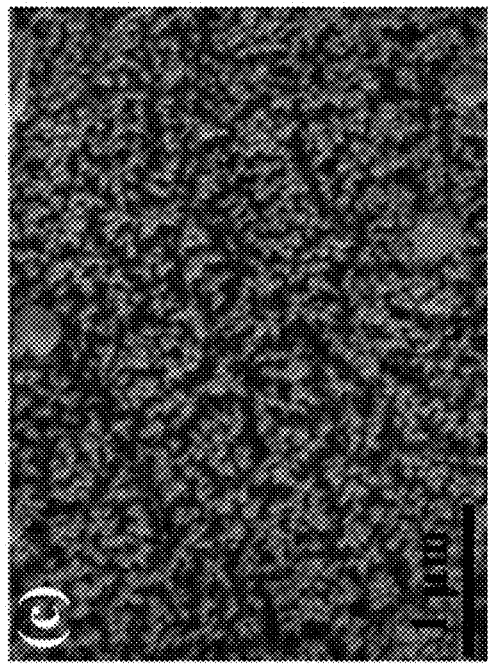
FIG. 12C provides a SEM image of the PTFE thin film with nanostructures according to one aspect of the disclosed technology.

In one example, each blade 1212 as well as the back disk 1224 can include a superhydrophobic surface layer. The surface layer can include high-density PTFE nanostructures 1240 as illustrated in FIG. 12B. In one embodiment, the surface layer can include a PTFE film. FIG. 12C provides a SEM image of the surface layer. In one embodiment, the mean length and diameter of the PTFE nanostructures 1240 can be 360 nm and 45 nm. The contact angle of the surface layer can be 162°, as illustrated in FIG. 12D. The high-density nanostructures 1240 covered on the surface layer can contain trapped air and reduce the actual contact area between the surface layer and water droplets, which increases the superhydrophobic ability. The nanostructures 1240 on the surface layer can increase the effective contact area of two tribo-surfaces and enhance the electrical output of the disk-TENG 1220.

Figure 12E:
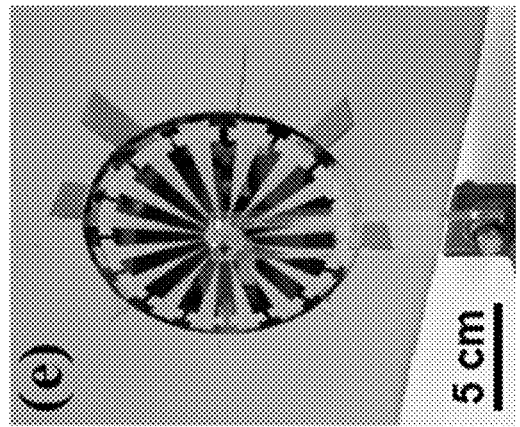
FIG. 12E is a photograph of the generator of FIG. 12A according to one aspect of the disclosed technology.
Figure 12B:
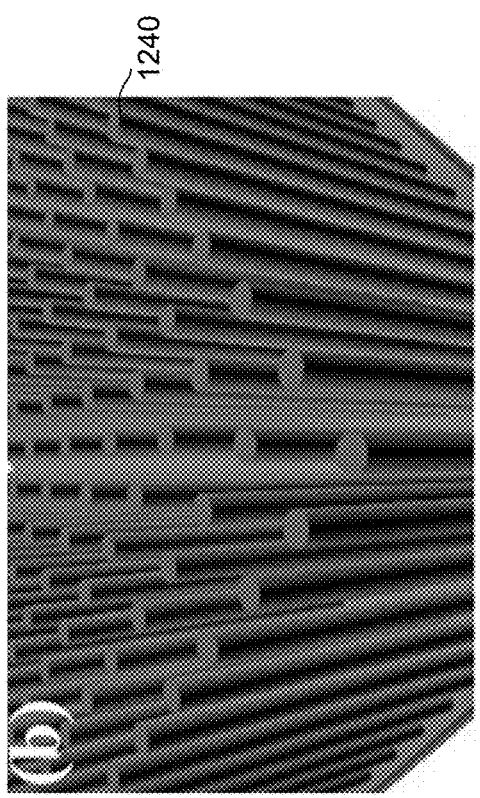
FIG. 12B provides a structure diagram of a PTFE thin film with nanostructures according to one aspect of the disclosed technology.
Figure 12D:
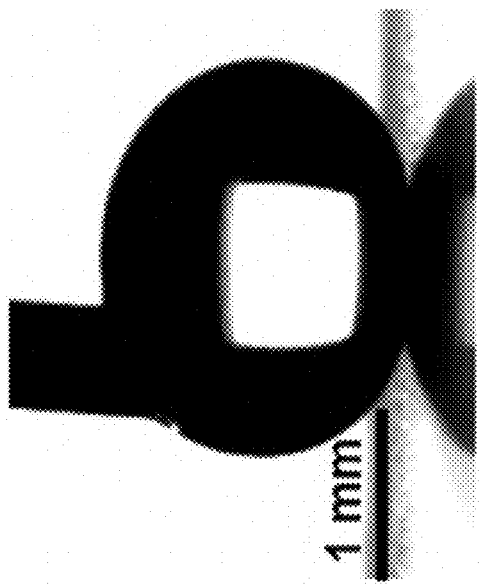
FIG. 12D illustrates a contact angle of the PTFE thin film with nanostructures according to one aspect of the disclosed technology.

FIG. 12E is a photograph of the generator 1200. In one embodiment, the generator 1200 can include a PET sheet between the blades 1212 and the back disk 1224 to prevent the disk-TENG 1220 from water when the generator is at work. However, for the purpose of clearly showing the structure of the generator 1200, the PET sheet is not shown in the structure diagram FIG. 12A nor the photograph FIG. 12E of the generator 1200.

The generator 1200 can be fabricated according to the following exemplary process. To fabricate the blades 1212, a 100 nm thin Cu film can be deposited on a square PET sheet to serve as the electrode layer. The PET sheet can have a thickness of 0.5 mm. The PET sheet can be processed by laser cutting (e.g., PLS6.75, Universal Laser Systems) to serve as the substrate of the blades. A Cu film, e.g., of thickness of 100 nm, can be deposited on the substrate by e-beam evaporator. A PTFE film with nanostructures fabricated by using porous anodic AAO as template can be attached onto the Cu electrode by using a double-sided tape. The Cu electrodes of the eight blades can be electrically connected together.

To fabricate the disks 1222 and 1224, two PMMA sheets can be first processed by laser cutting to form the 16-segment-structured circle disks as the substrates of the disks 1222 and 1224. The PMMA sheets can have a thickness of three mm. For the back disk, a 100 nm thin Cu film can be deposited on one PMMA substrate by e-beam evaporator. Then, a PTFE film with nanostructures can be attached onto the Cu electrode by using a double-sided tape. For the front disk, another 100 nm thin Cu film can be deposited on the other PMMA substrate and directly used as the contact material. The PTFE layer of the back disk and the Cu layer of the front disk can be brought to a face-to-face intimate contact to form a sliding TENG operating at a rotation disk mode.

The smooth metal rod 1230 can be used as a rotation axis to assemble the generator 1200 through the centers of the blades 1212 and the two disks 1222 and 1224.

FIGS. 13A-D schematically illustrate the working mechanism of the water-TENG 1210 of the generator 1200.

As shown in FIG. 13A, flowing water 1302 can have positive tribo-charges due to the contact electrification between the water and the pipe/air during its traveling processes. As the flowing water reaches the blade-1, a positively charged water film 1304 can be formed on the surface layer 1306 of the blade-1, because of the tribo-charges created between the water and the water pipe. As a result, a positive potential difference can be created between the electrode 1308 of the blade-1 and ground, which can drive the electrons to transfer from ground to the electrode 1308 of the blade-1 and generate a positive current until the potential difference is decreased to zero. Because the flowing water impacted on the blade-1 can also cause the rotation of wheel, the flowing water can next contact the blade-2 as illustrated in FIG. 13C. Then, another positively charged water film 1304 can form on the PTFE surface of the blade-2, consequently, another positive potential difference can be created between the electrode 1308 of the blade-2 and ground, attributing a positive current until the potential difference is decreased to zero. After this, as illustrated in FIG. 13D, the water film with its positive charges can move off the surface layer, e.g., the PTFE film, of blade-1 due to the continuous rotation of blades and the superhydrophobic property of the surface. With continued reference to FIG. 13D, with the removal of the water film from the blade-1, a negative potential difference can be generated between the electrode of blade-1 and ground because of the negative charges on the electrode, which drives the electrons to transfer from the electrode to ground and generates a negative current until the potential difference becomes zero. With the continuous rotation of the blades, the water reaches different blades in sequence. Alternative positive and negative current can be generated with similar processes as shown in FIGS. 13C-D.

The superhydrophobicity of the surface layer on the blades plays a key role for the removal of the water film. As a result, the superhydrophobicity enhances the electrical output of the water-TENG.

Figure 14B:
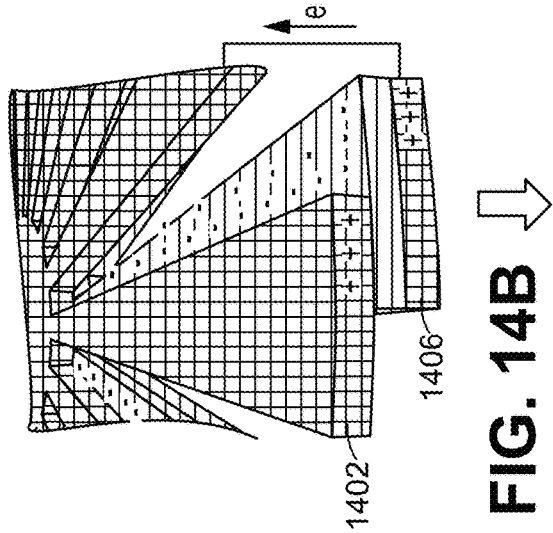
FIGS. 14A-D illustrate the working mechanism of the disk-TENG of the generator of FIG. 12A according to one aspect of the disclosed technology.
Figure 14C:
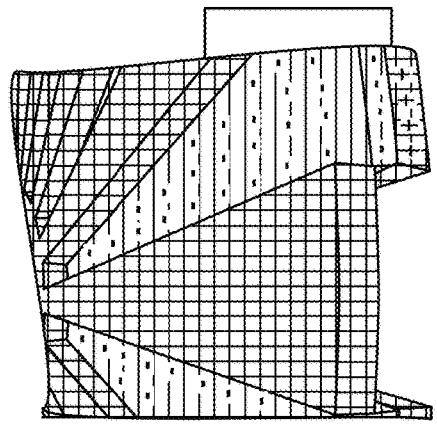
Figure 14A:
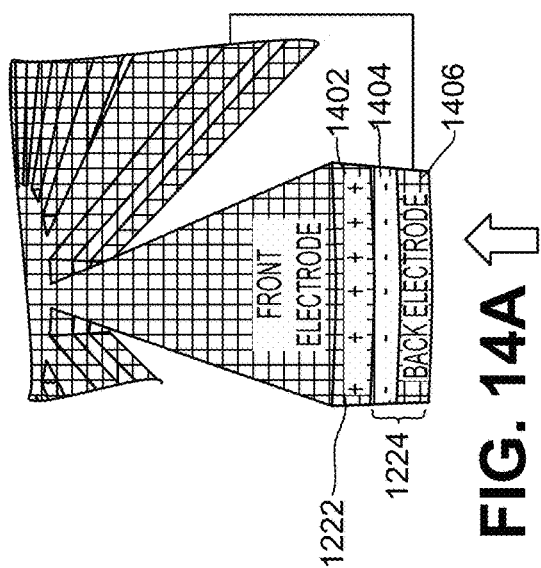
Figure 14D:
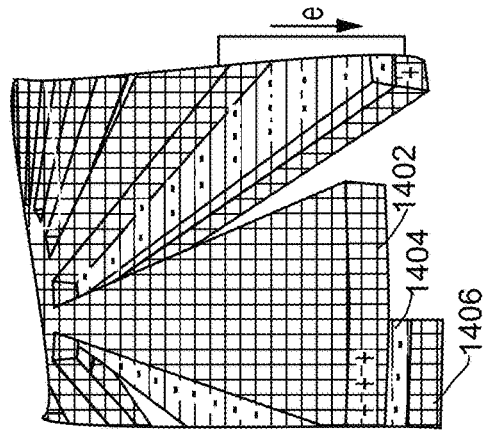

FIGS. 14A-14D schematically illustrate the working mechanism of the disk-TENG 1220 of the generator 1200. In the initial stage, the front disk 1222 and the back disk 1224 can fully contact each other. As illustrated in FIG. 14A, the positive and negative tribo-charges can be generated on the Cu electrode surface 1402 of the front disk 1222 and the PTFE surface 1404 of the back disk 1224, respectively, since PTFE has stronger tendency to gain electrons than Cu in the triboelectric series. At the initial stage, the positive and negative charges can fully overlap with each other, and thus there is no potential difference between the Cu electrodes of the two disks and no current is generated. With the rotation of the back disk, the two disks are partly separated as shown in FIG. 14B, and a positive potential difference on the front electrode 1402 is formed, which drives the electrons to flow from the back electrode 1406 to the front electrode 1402 and generates a positive current. As the two disks are fully separated as shown in FIG. 14C, the induced positive charges on the back electrode 1406 can reach its maximum value, and the net charges on the front electrode 1402 can decrease to zero. As the back disk 1224 continues rotating, the front electrode 1402 begins to contact the PTFE film 1404 of another adjacent segment of the back disk as shown in FIG. 14D, and then a negative potential difference is formed on the front electrode 1402, which drives the electrons to flow from the front electrode 1402 to the back electrode 1406 and generates a negative current. Next, the two disks fully contact with each other again as shown in FIG. 14A, the induced charges in the back electrodes 1406 fully flow to the front electrode 1402. With the further rotation of the back disk 1224, another cycle similar to the processes from FIGS. 14A-4D will start.

In an experiment to measure electrical output properties of the generator 1200, tap water flowing from a household faucet at a flow rate of 54 mL/s is used to drive the generator 1200, and the vertical distance between the water outlet of the faucet and the rotation axis of the generator 1200 is around 25 cm. In the experiment, current meter (SR570 low noise current amplifier, Stanford Research System) and voltage meter (6514 system electrometer, Keithley) are used to measure the electric outputs of the generator 1200.

Figure 15A:
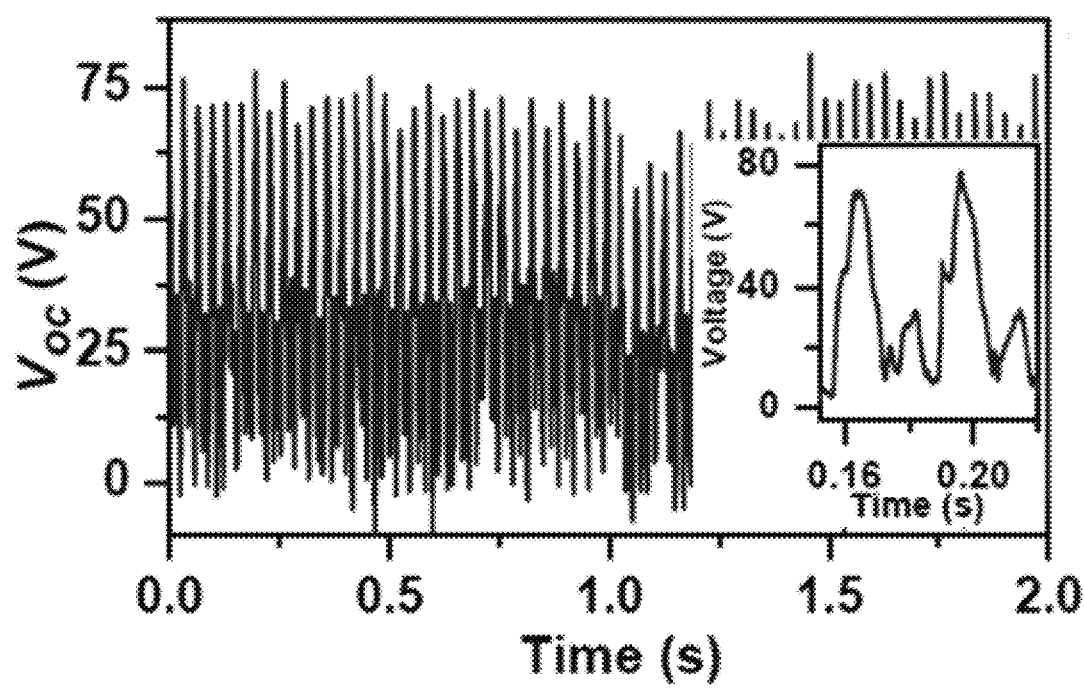
FIG. 15A illustrates $V_{oc}$ curve of the water-TENG of the generator of FIG. 12A according to one aspect of the disclosed technology.
Figure 15B:
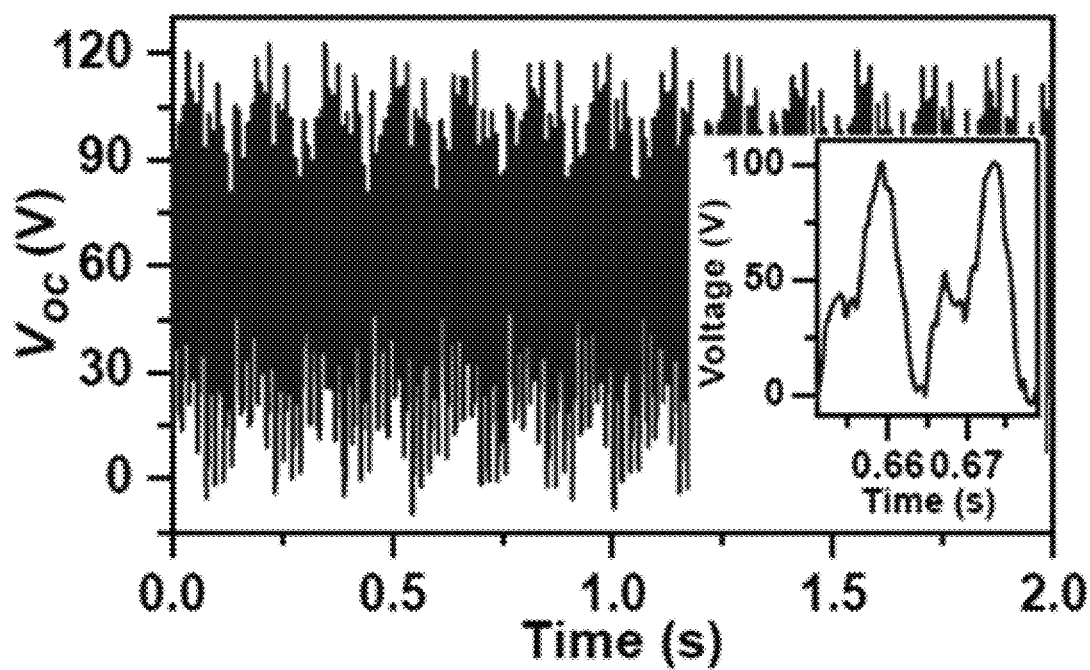
FIG. 15B illustrates $V_{oc}$ curve of the disk-TENG of the generator of FIG. 12A according to one aspect of the disclosed technology.

FIG. 15A and FIG. 15B illustrate curves of open-circuit voltage, $V_{oc}$, of the water-TENG 1210 and the disk-TENG 1220, respectively. Their magnification curves are shown in the insets. As illustrated, at a flowing water rate of 54 mL/s, the open-circuit voltage $V_{oc}$ of the water-TENG 1210 and the disk-TENG 1220 can be about 72 and 102 V, respectively. The positive $V_{oc}$ value of the water-TENG 1210 indicates the positive tribo-charges in the flowing water from the household faucet.

Figure 15C:
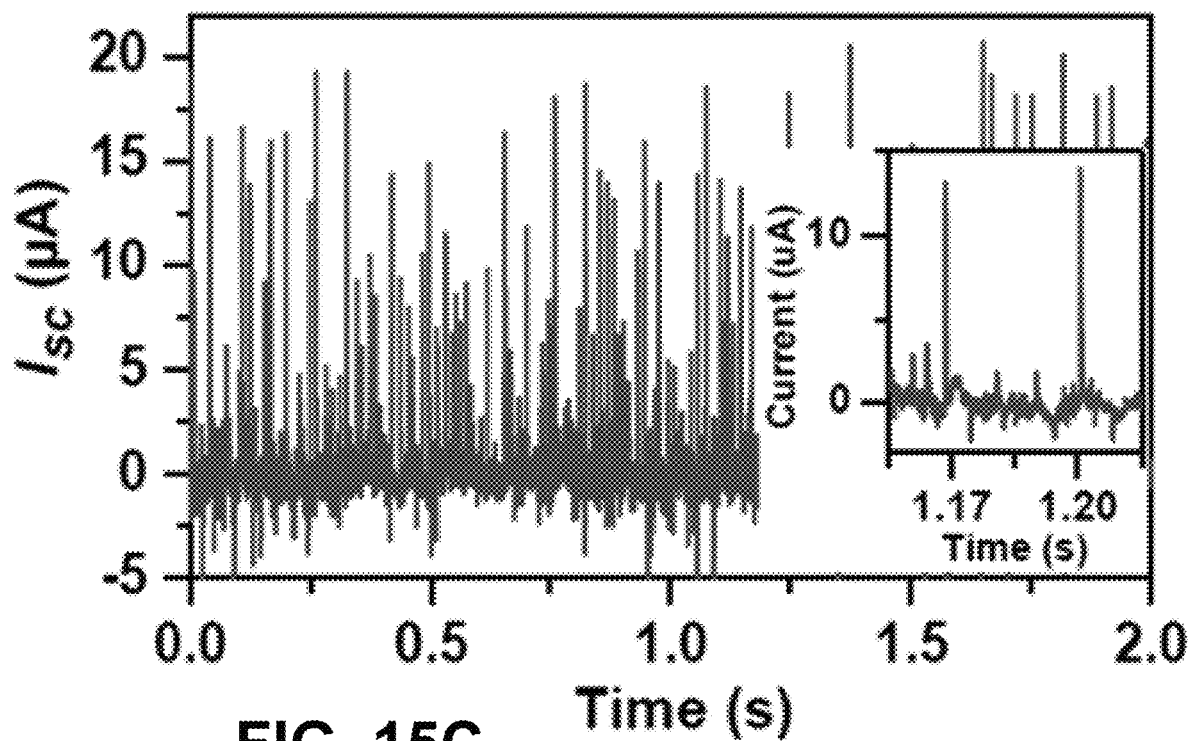
FIG. 15C illustrates $I_{sc}$ curve of the water-TENG of the generator of FIG. 12A according to one aspect of the disclosed technology.
Figure 15D:
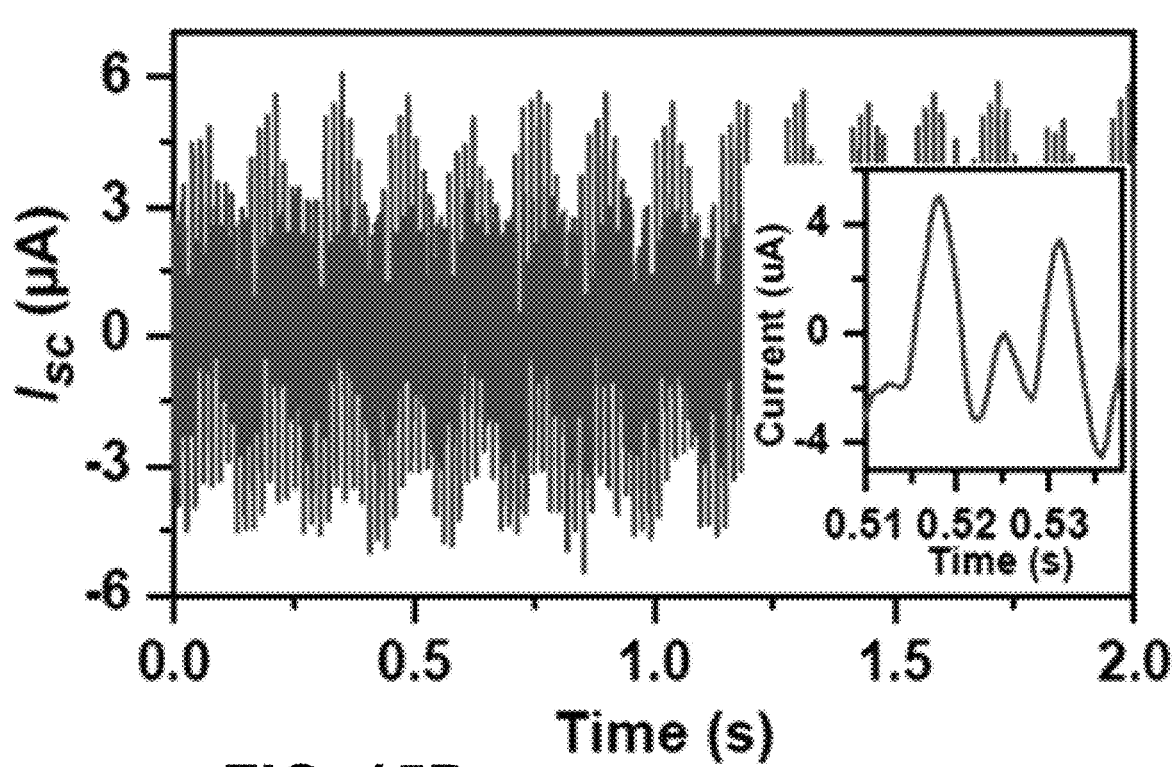
FIG. 15D illustrates $I_{sc}$ curve of the disk-TENG of the generator of FIG. 12A according to one aspect of the disclosed technology.

FIGS. 15C-D illustrate curves of the short-circuit current ($I_{sc}$) of the water-TENG 1210 and the disk-TENG 1220. Their magnification curves are shown in the insets. As illustrated, at a flowing water rate of 54 mL/s, the short-circuit current $I_{sc}$ of the water-TENG 1210 and the disk-TENG 1220 can reach 12.9 and 3.8 µA, respectively.

By integrating the absolute values of the $I_{sc}$ curve of the water-TENG 1210, the collected charge in a unit time is 0.68 µQ/s. Therefore, the carried tribo-charge in the flowing water in a unit time is 0.34 µQ/s, and the corresponding tribo-charge density in the flowing water from faucet is 6.3 nQ/ml. The mean interval time between two positive current peaks of the water-TENG 1210 and the disk-TENG 1220 are around 0.03 and 0.015 seconds, respectively, and the corresponding output frequencies are 33.3 and 66.7 Hz, respectively. The output frequency of the TENG with multiple segments can be expressed by f=nN/60, where n is the number of the divided segments in the generator 1200 and N is the rotation speed in rpm. According to this equation, the rotation speed of the generator 1200 at a flowing water rate of 54 mL/s is around 249 rpm. Since the two components 1210 and 1220 of the generator 1200 have the same rotation speed and the segment number of the disk-TENG 1220 (16) is two times of that of the water-TENG 1210 (8), the output frequency of the disk-TENG 1220 is two times of that of the water-TENG 1210. Increasing the segment number in the disk and the blades number in the blades can increase the output frequency of the disk-TENG 1220 and the water-TENG 1210, respectively.

For the water-TENG 1210, the positive and negative current peaks correspond to the processes of the formation and the removal of the positively charged water film on the blade surface, respectively. As shown in FIG. 15C, the positive current peak of the water-TENG 1210 is remarkably higher than the negative current peak, which indicates that the removal process of the water film requires longer time than the formation process.

Figure 16A:
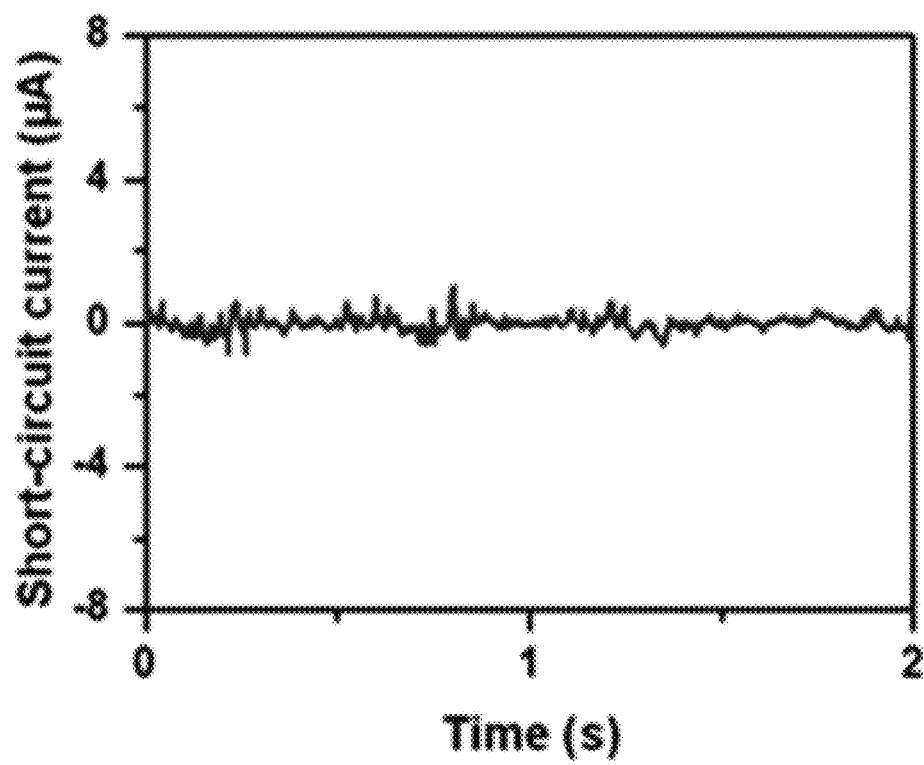
FIG. 16A illustrates short-circuit current curve of the water-TENG of the generator of FIG. 12A by using a nylon film according to one aspect of the disclosed technology.
Figure 16B:
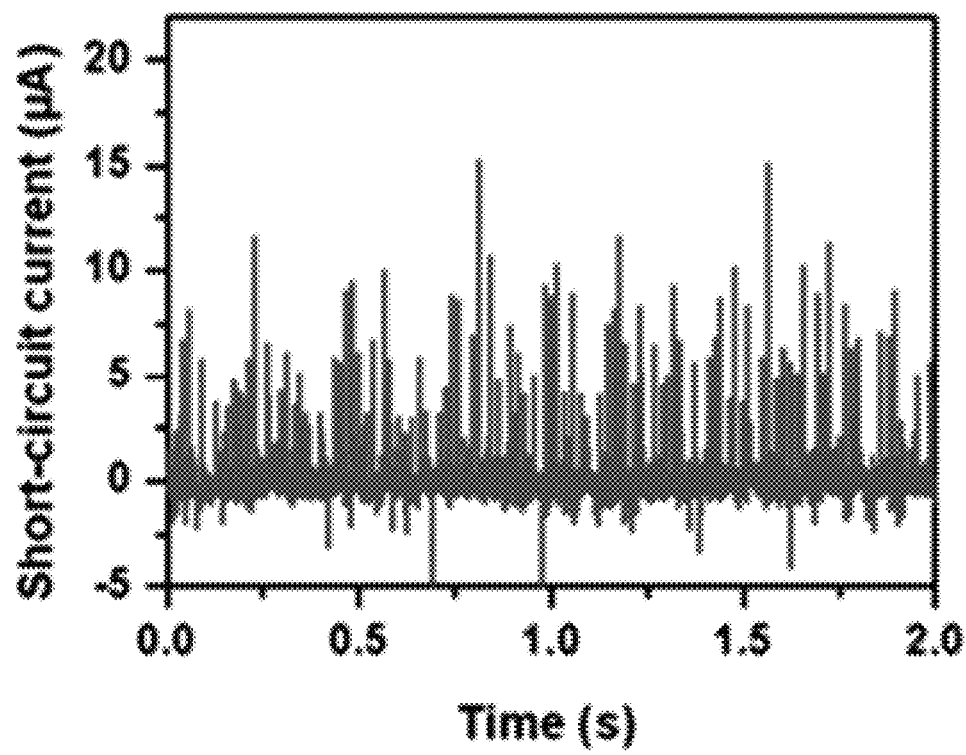
FIG. 16B illustrates short-circuit current curve of the water-TENG of the generator of FIG. 12A by using a smooth PTFE film without nanorods according to one aspect of the disclosed technology.
Figure 16C:
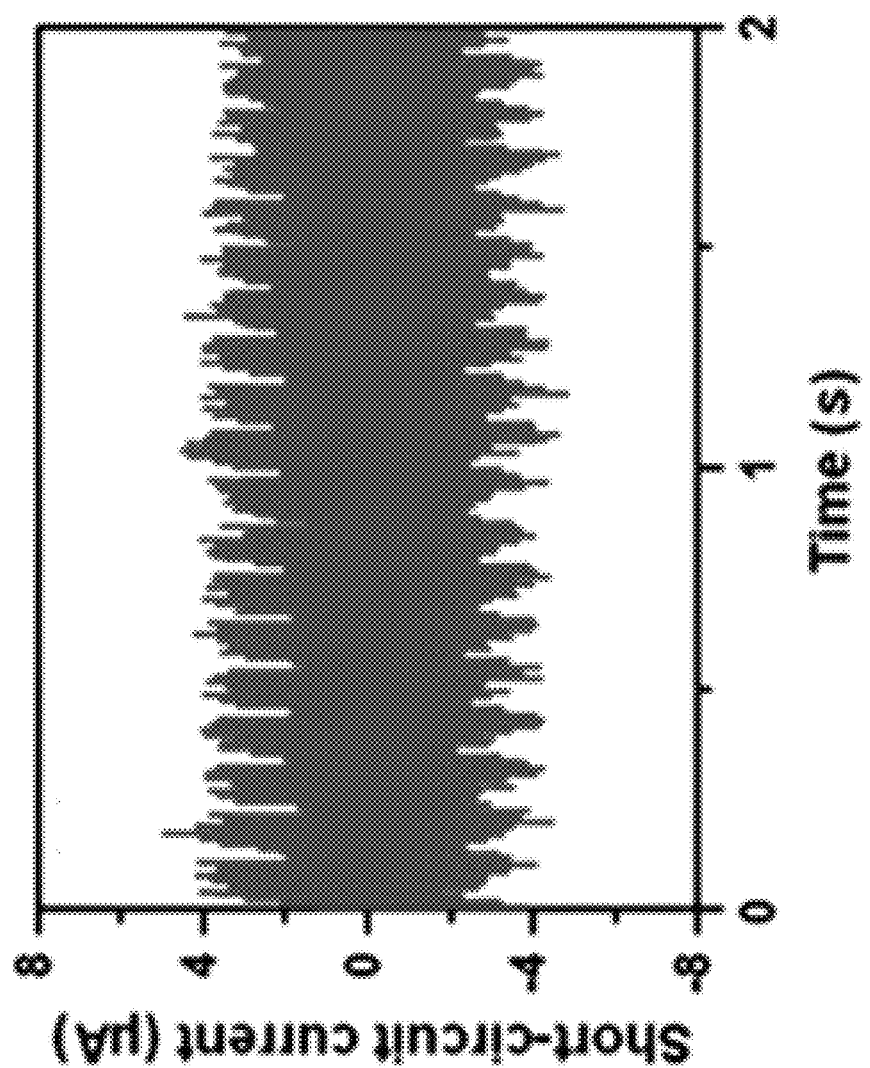
FIG. 16C illustrates short-circuit current of the disk-TENG of the generator of FIG. 12A with a flowing water rate of 54.4 mL/s, as the superhydrophobic PTFE film of the blades is replaced, according to one aspect of the disclosed technology.
Figure 17A:
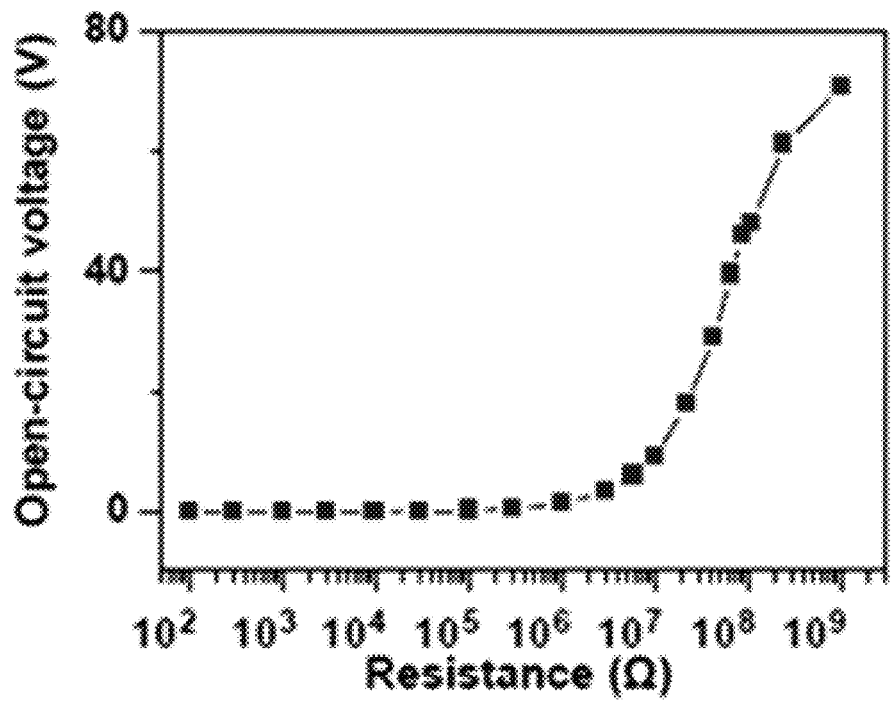
FIG. 17A illustrates dependences of the open-circuit voltage of the water-TENG of the generator of FIG. 12A on the load resistance according to one aspect of the disclosed technology.
Figure 17B:
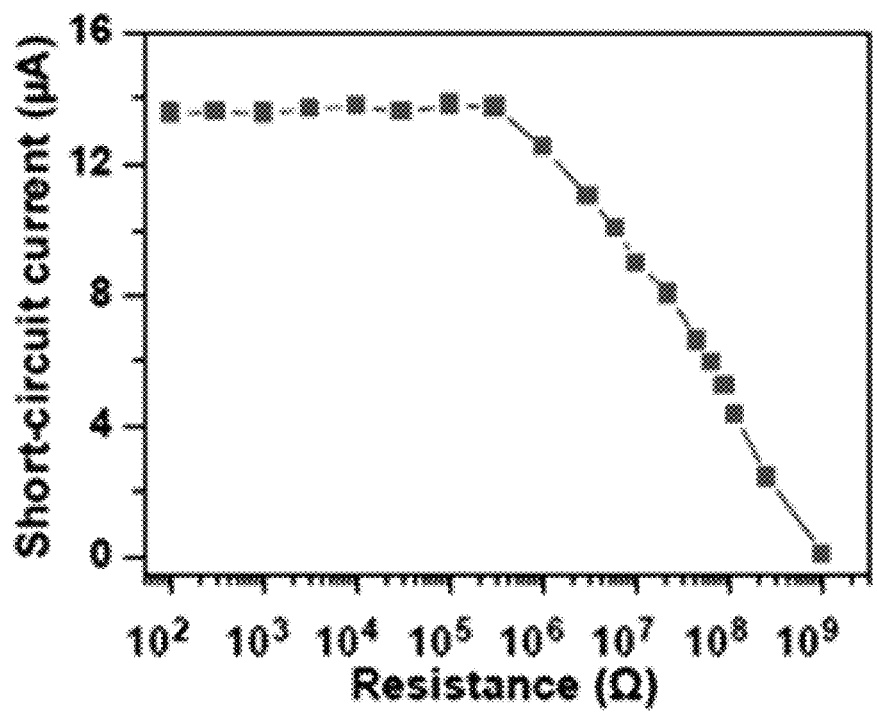
FIG. 17B illustrates dependences of the short-circuit current of the water-TENG of the generator of FIG. 12A on the load resistance according to one aspect of the disclosed technology.
Figure 17C:
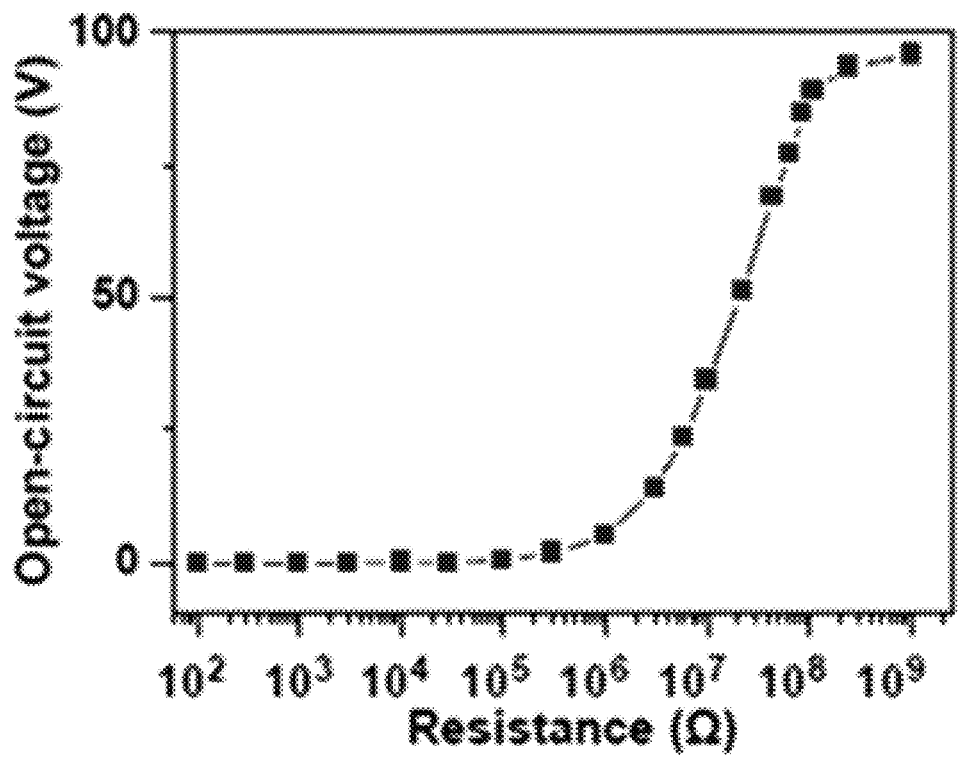
FIG. 17C illustrates dependences of the open-circuit voltage of the disk-TENG of the generator of FIG. 12A on the load resistance according to one aspect of the disclosed technology.
Figure 17D:
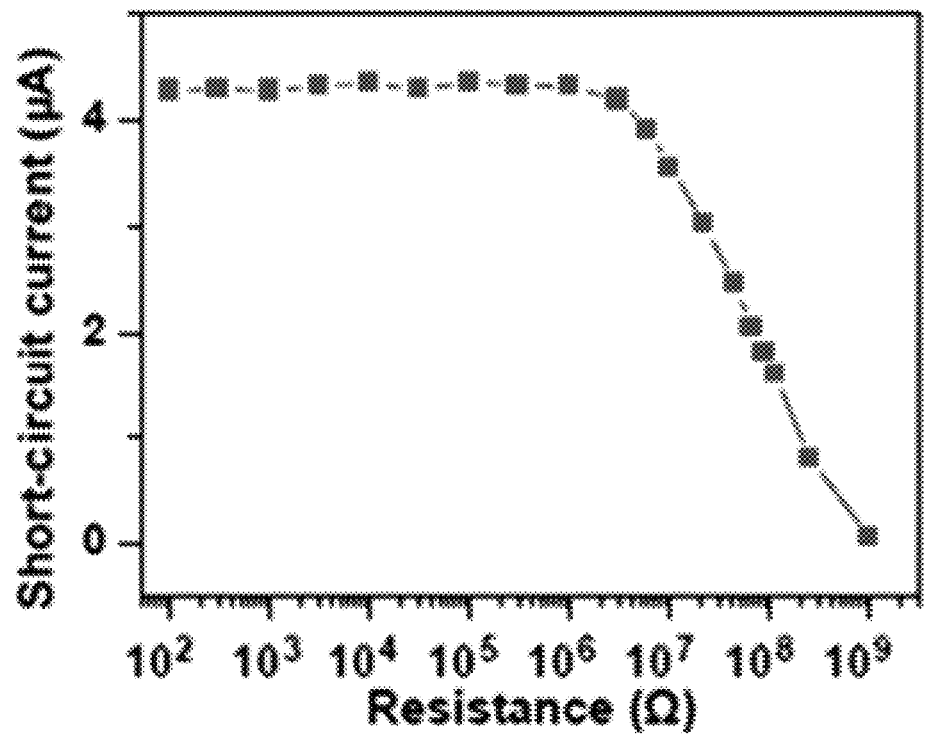
FIG. 17D illustrates dependences of the short-circuit current of the disk-TENG of the generator of FIG. 12A on the load resistance according to one aspect of the disclosed technology.

In another experiment, the superhydrophobic PTFE film on the blades is replaced by a hydrophilic nylon film and a hydrophobic smooth PTFE film without nanorods to test the effect of the superhydrophobicity on the output performance of the generator 1200. With the use of a nylon film in the blade surface and the same experiment conditions, the periodically sharp current peaks disappear and only some irregular peaks around 0.4 µA are present as shown in FIG. 16A. With the use of a smooth PTFE film of contact angle about 120° and the same experiment conditions, the $I_{sc}$ peaks of the water-TENG 1210, as illustrated in FIG. 16B, decrease about 60% compared to that using superhydrophobicity PTFE film with nanorods. As shown in FIG. 16C, the $I_{sc}$ curve of the disk-TENG 1220 stays almost the same as that using the superhydrophobicity PTFE film with nanorods in the blades. The comparison result indicates that superhydrophobic surface of the blades plays a critical role for the removal of the water film on the blade surface and is helpful for enhancing the output performance of the water-TENG 1210. Since the disk-TENG 1220 is designed to harvest the mechanical energy of the flowing water, its output performance is independent of the hydrophobic property of the blades surface.

Figure 18A:
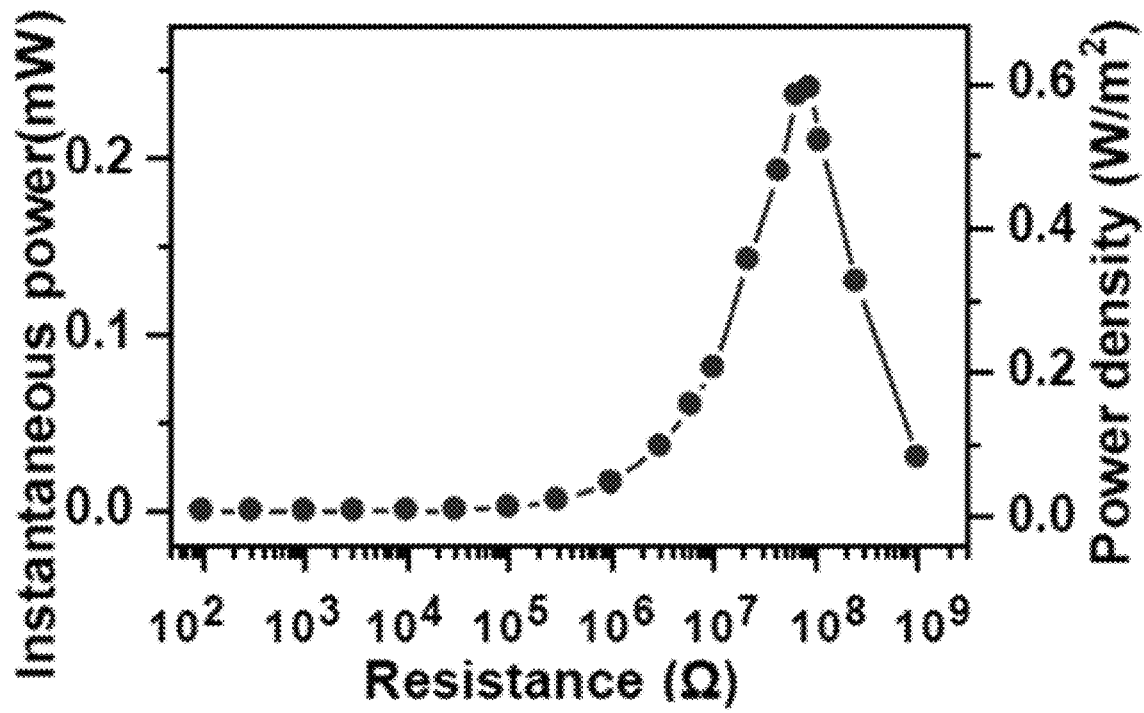
FIG. 18A illustrates dependences of the instantaneously maximum power and power density on the load resistance of the water-TENG of the generator of FIG. 12A according to one aspect of the disclosed technology.
Figure 18B:
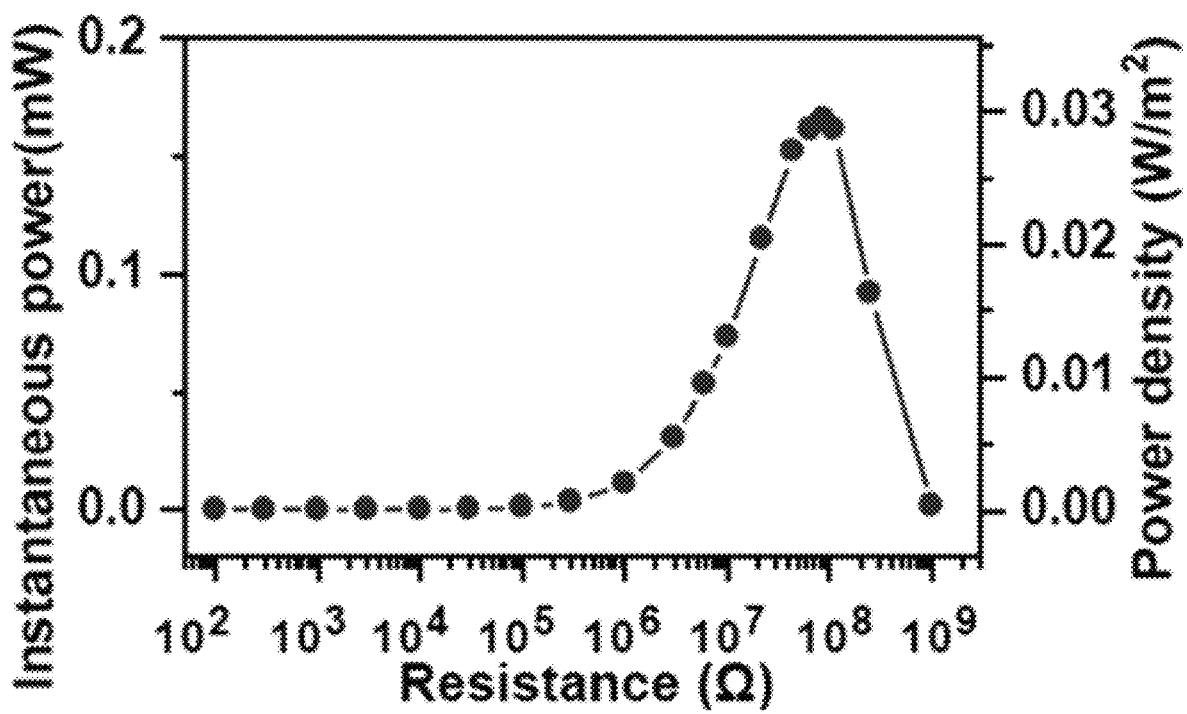
FIG. 18B illustrates dependences of the instantaneously maximum power and power density on the load resistance of the disk-TENG of the generator of FIG. 12A according to one aspect of the disclosed technology.
Figure 18C:
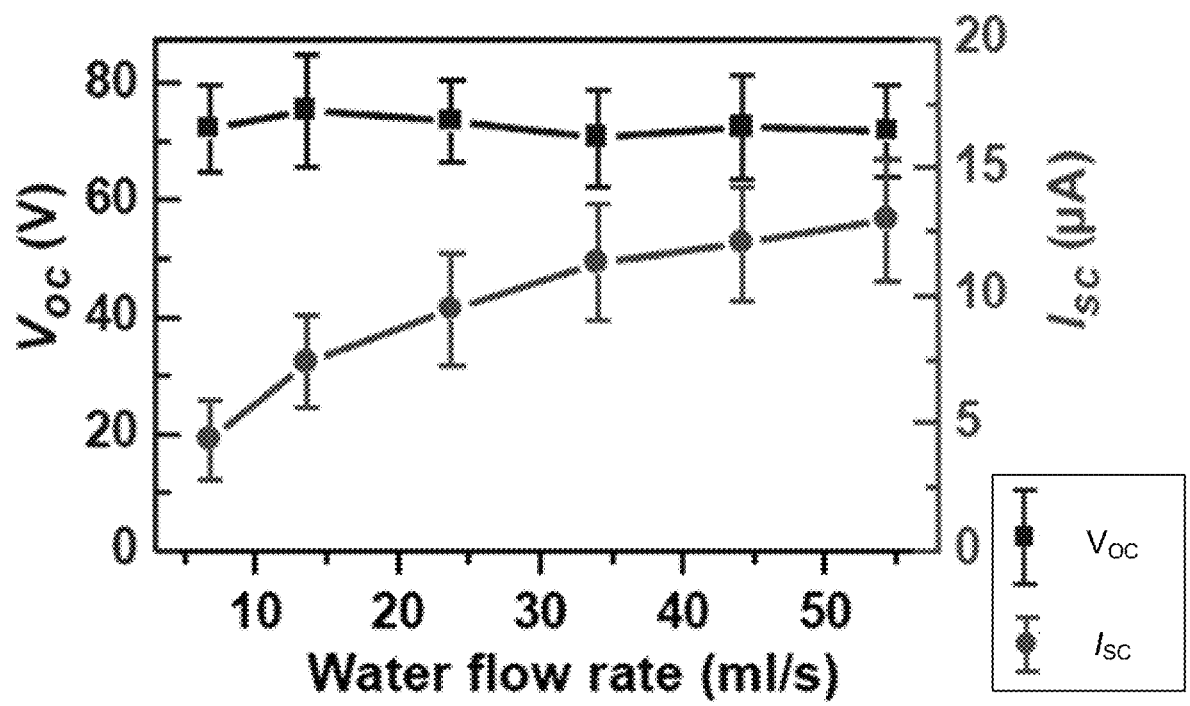
FIG. 18C illustrates dependences of the $V_{oc}$ and $I_{sc}$ values on the flowing water rate of the water-TENG of the generator of FIG. 12A according to one aspect of the disclosed technology.
Figure 18D:
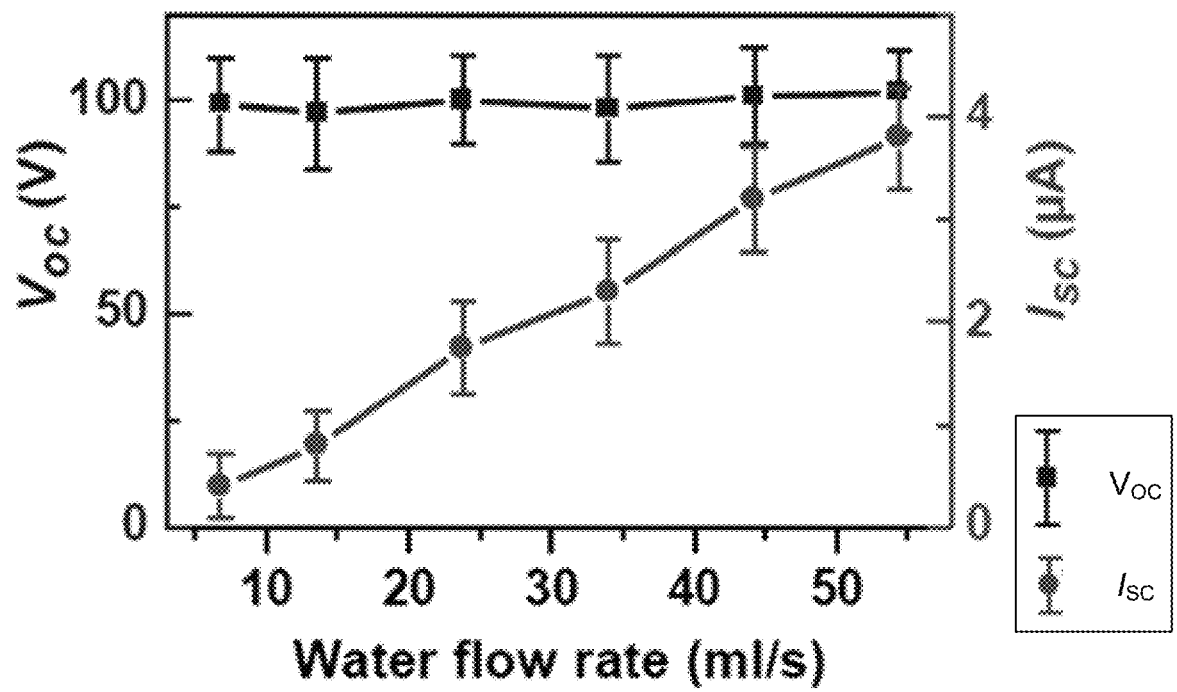
FIG. 18D illustrates dependences of the $V_{oc}$ and $I_{sc}$ values on the flowing water rate of the disk-TENG of the generator of FIG. 12A according to one aspect of the disclosed technology.
Figure 19:
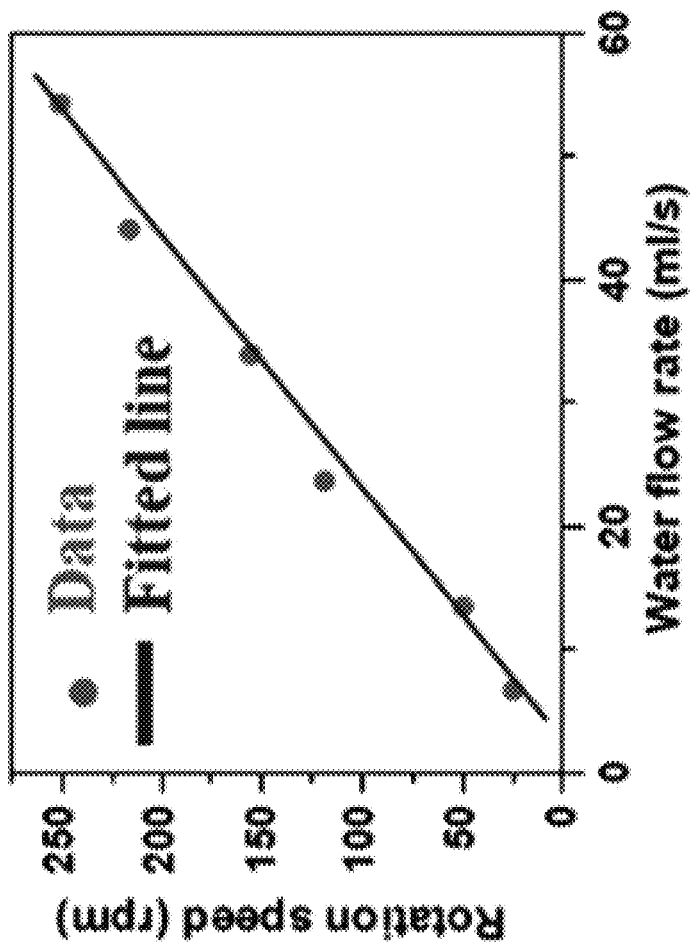
FIG. 19 illustrates dependence of the rotation speed of the disk-TENG of the generator of FIG. 12A on the flowing water rate according to one aspect of the disclosed technology.

In order to investigate the output power of the generator 1200 at an external load resistor, the output voltage and output current of the water-TENG and the disk-TENG at various load resistances ranging from 100Ω to 1 GΩ are measured, and the corresponding output power value at each resistance is calculated by using P=IV. FIGS. 17A-D illustrate dependences of the output voltage and output current of the water-TENG 1210 and the disk-TENG 1220 on the load resistance. FIGS. 18A and 18B show dependences of the instantaneously maximum output power and the corresponding power density (the output power per contact area of the generator) of the water-TENG 1210 and the disk-TENG 1220, respectively. For the water-TENG 1210, the instantaneously maximum power of 0.24 mW appears at a load of 88 MΩ, and the corresponding instantaneously maximum power density is 0.59 W/m². For the disk-TENG 1220, the instantaneously maximum power of 0.17 mW appears at a load of 88 MΩ, and the corresponding instantaneously maximum power density is 0.03 W/m². The $V_{oc}$ and $I_{sc}$ of the water-TENG 1210 and the disk-TENG 1220 at various flowing water rates ranging from 7 to 54 mL/s are measured. The dependences of $V_{oc}$ and $I_{sc}$ on the flowing water rate for the water-TENG 1210 are shown in FIG. 18C, in which $V_{oc}$ values stay almost constant at about 72 V for various flow rates, and the $I_{sc}$ value increases from 4.3 to 12.9 µA as the flowing water rate increases from 7 to 54 mL/s. The increase of the $I_{sc}$ is caused by more tribo-charges carried in the flowing water in a unit time at a higher flowing rate. The dependences of $V_{oc}$ and $I_{sc}$ on the flowing water rate for the disk-TENG 1220 are shown in FIG. 18D, in which $V_{oc}$ values stay almost constant at about 101 V for various flowing rates, and the $I_{sc}$ value increases almost in a linear fashion with respect to the flowing water rate. For the generator 1200 operating at the rotation disk mode, the $I_{sc}$ values can increase linearly with respect to the rotation speed of the disk. As shown in FIG. 19, the rotation speed of the generator 1200 increases linearly with the flowing water rate, which is the reason for the linear increase of the $I_{sc}$ values of the disk-TENG 1220. This linear dependence of the $I_{sc}$ value on the flowing water rate demonstrates its potential application as a self-powered sensor for detecting flowing water rate. In one example, the self-powered sensor can detect energy flow rate, including but not limited flowing water rate and wind speed, among other possibilities. The self-powered sensor can include a processor configured to detect the energy flow rate. In one embodiment, the processor can detect the energy flow rate based on a measurement of current generated by the flow of electrons. In addition, or as an alternative, the processor can detect the energy flow rate based on a rotation speed of the back disk 1224.

Figure 20A:
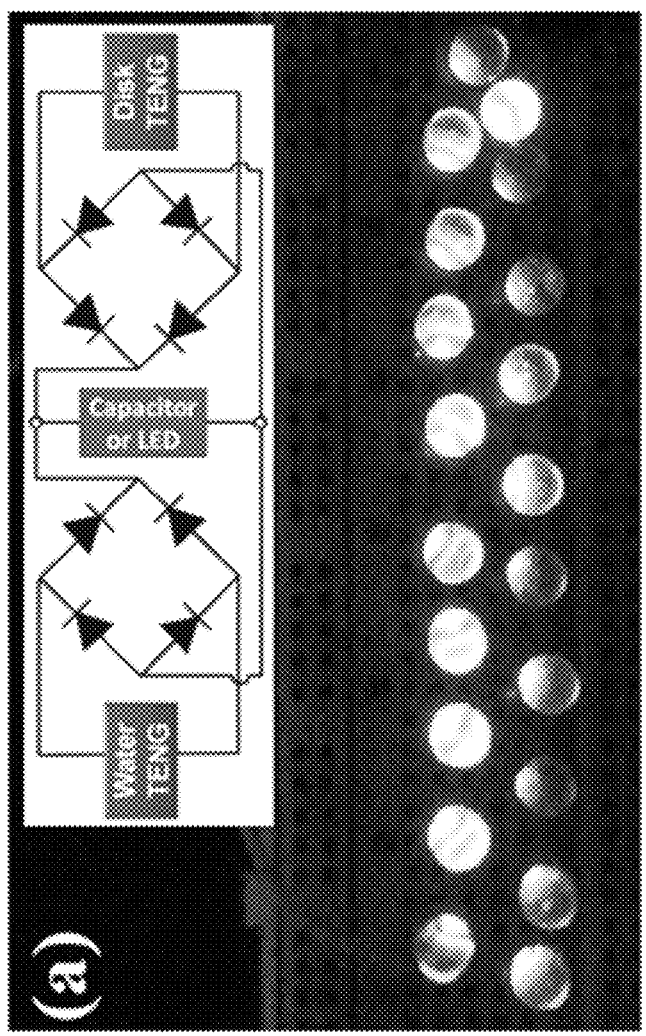
FIG. 20A is a photograph of 20 commercial LED bulbs driven by the generator of FIG. 12A at a flowing water rate of 54 mL/s according to one aspect of the disclosed technology.
Figure 20B:
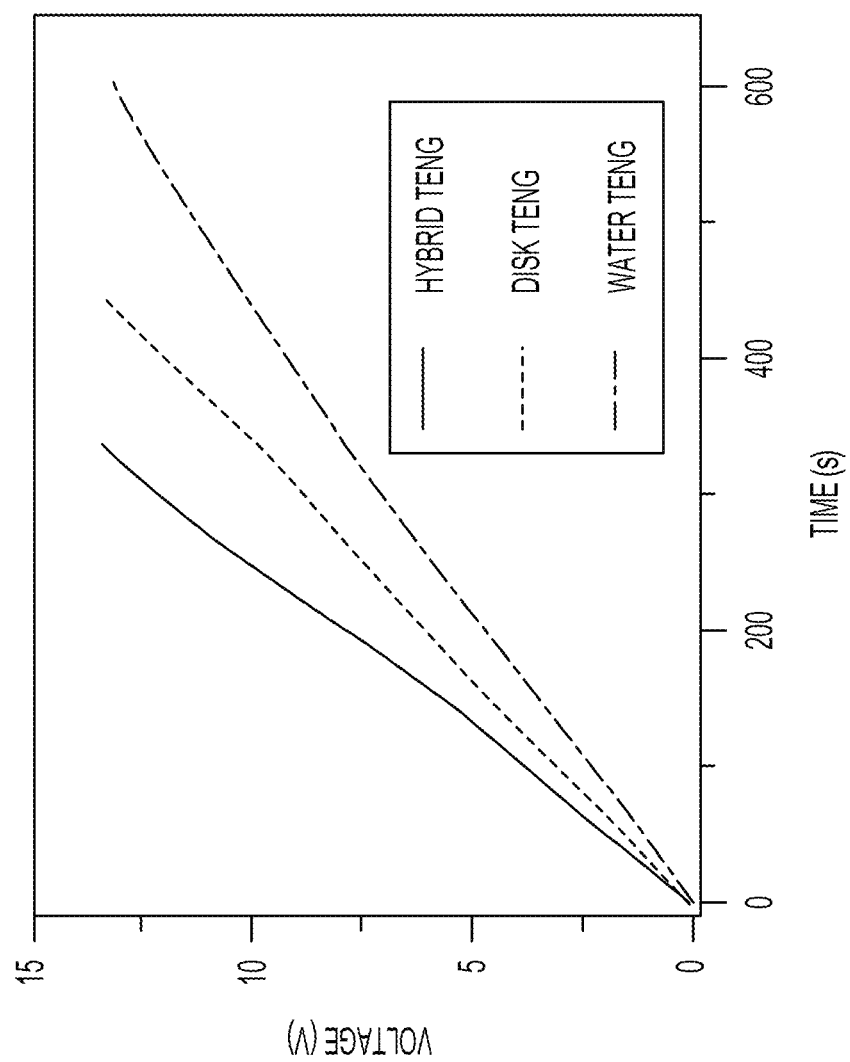
FIG. 20B illustrates measured voltage of a 4.7 g capacitor charged by the generator of FIG. 12A and each component thereof at a flowing water rate of 54 mL/s according to one aspect of the disclosed technology.

For practical applications in driving LEDs or charging a capacitor, the electrical output of the water-TENG 1210 and the disk-TENG 1220 can be connected in parallel after they are converted to pulse output in the same directions by using two full-wave rectifying bridges, as shown in the inset of FIG. 20A. As the generator 1200 is driven by water at a flow rate of 54 mL/s, 20 commercial green LEDs can light up, as shown in FIG. 20A. The generator 1200 can charge a capacitor of 4.7 µF at a flowing water rate of 54 mL/s. FIG. 20B illustrates the voltage curves of the capacitor. When the capacitor is charged by the rectified output of the water-TENG 1210 and the rectified output of the disk-TENG 1220, respectively, it takes about 596 seconds and 435 seconds to charge the capacitor to a voltage of 13 V, respectively. When using the generator 1200 as a whole, it takes 326 seconds to charge the capacitor to a voltage of 13 V.

The generator 1200 can harvest wind energy and act as a self-powered sensor to detect the flowing water rate and wind speed.

Since the rotation of the blades 1212 can be driven by wind, the generator 1200 can harvest the wind energy. The wind with various speeds can drive the rotation of the disk-TENG 1220. The back disk 1224 can rotate with respect to the rotation axis "A" under the influence of the wind. As a result, the triboelectric charges on the front and back electrodes 1402 and 1406 can change during this process, and affect a flow of electrons between the electrodes 1402 and 1406.

Figure 21A:
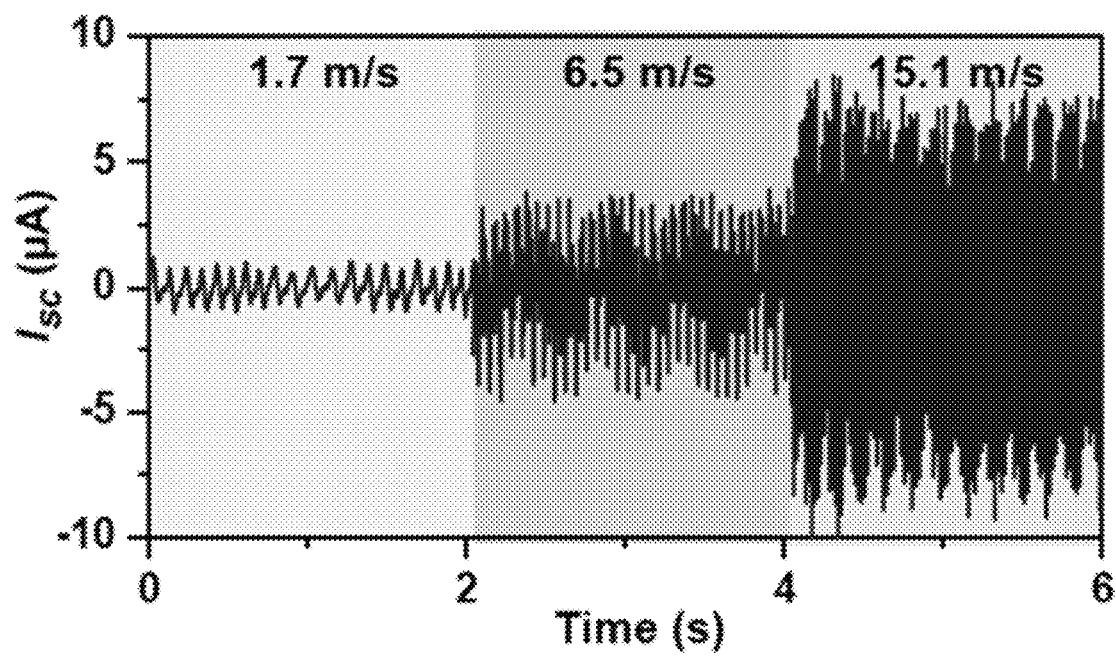
FIG. 21A illustrates $I_{sc}$ curve at various wind speeds of the disk-TENG of the generator of FIG. 12A when it is driven by wind according to one aspect of the disclosed technology.
Figure 21B:
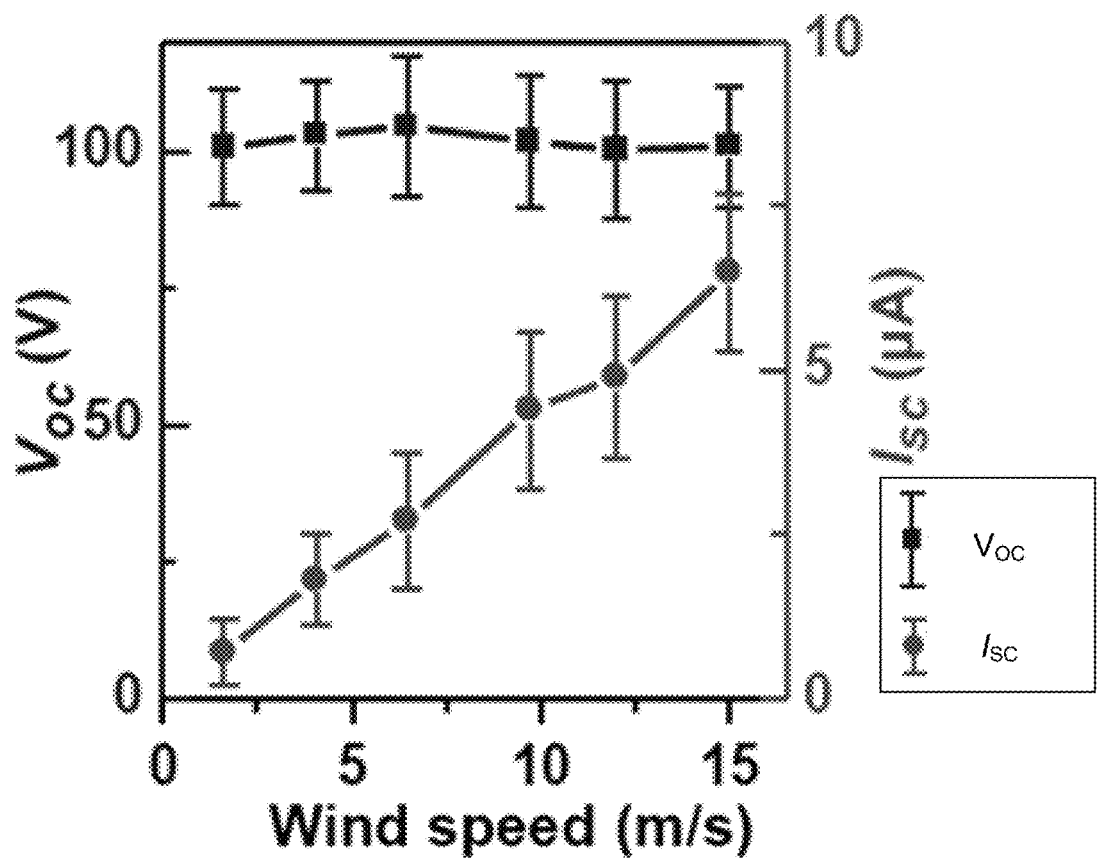
FIG. 21B illustrates dependences of $V_{oc}$ and $I_{sc}$ values on wind speed of the disk-TENG of the generator of FIG. 12A when it is driven by wind according to one aspect of the disclosed technology.
Figure 22:
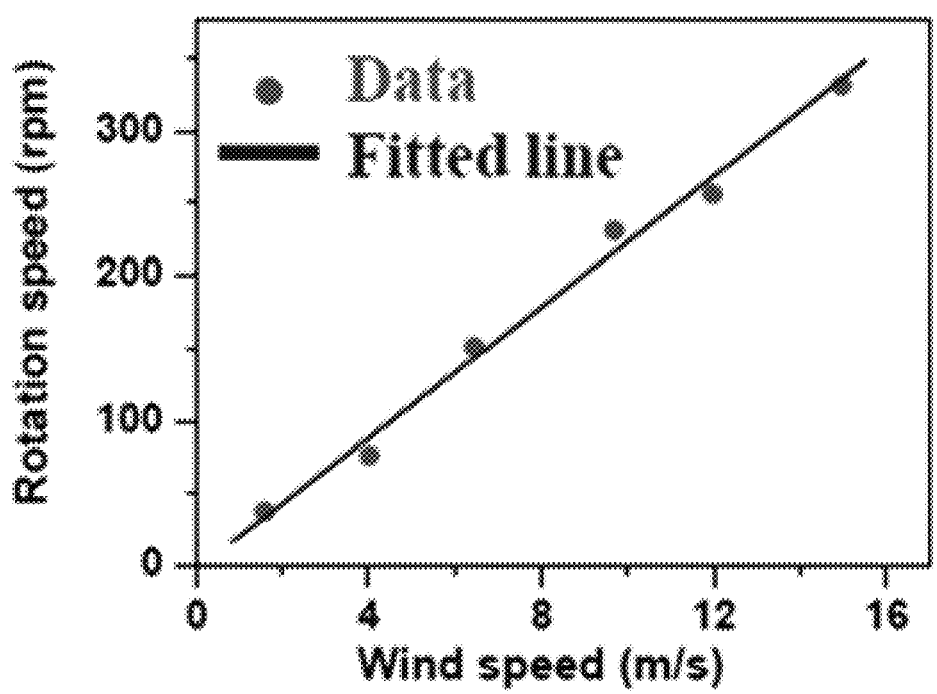
FIG. 22 illustrates dependence of the rotation speed of the disk-TENG of the generator of FIG. 12A on the wind speed according to one aspect of the disclosed technology.
Figure 23:
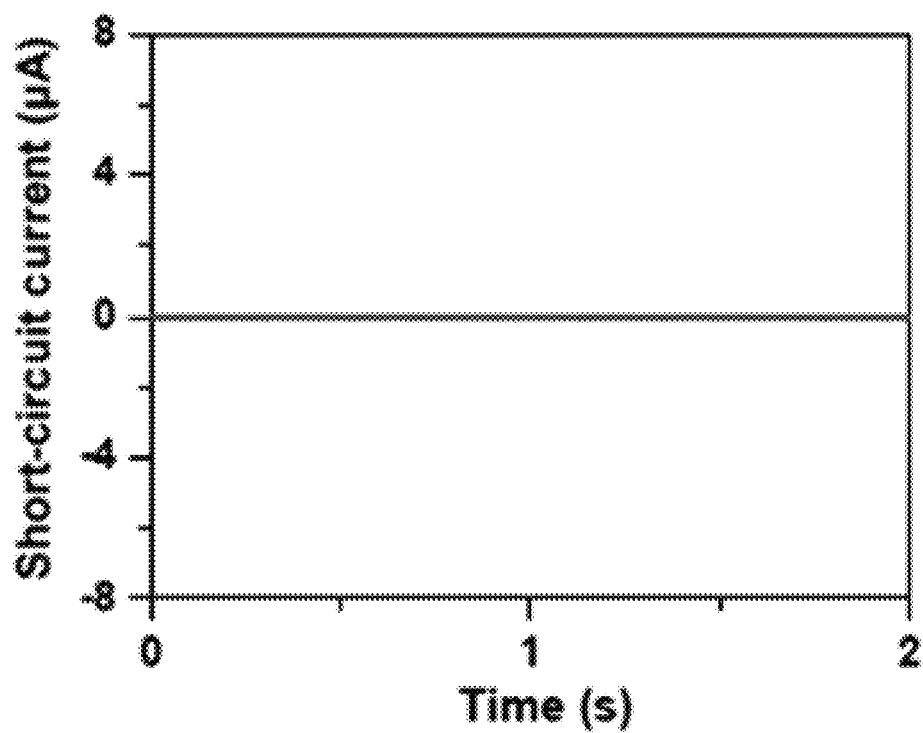
FIG. 23 illustrates short-circuit current curve of the water-TENG of the generator of FIG. 12A without flowing water as it is driven by wind at a wind speed of 15.1 m/s according to one aspect of the disclosed technology.

FIG. 21A illustrates the measured $I_{sc}$ curve of the disk-TENG 1220. With the increase of the wind speed, the output frequency and $I_{sc}$ value remarkably increase. FIG. 21B illustrates dependences of the $V_{oc}$ and $I_{sc}$ values of the disk-TENG 1220 on the wind speed ranging from 1.7 to 15.1 m/s, in which the $V_{oc}$ value stays almost constant at about 101 V for various wind speeds, and the $I_{sc}$ value increases almost in a linear fashion with respect to the wind speed. As shown in FIG. 22, the rotation speed of the disk-TENG 1220 increases linearly with the wind speed, and this causes the linear increase of the $I_{sc}$ value based on the similar reason discussed in FIG. 18D. The linear dependence of the $I_{sc}$ values on the wind speed demonstrates its potential application as a self-powered sensor for detecting wind speed. When the generator 1200 is used to harvest wind energy, only the disk-TENG 1220 can generate electric energy, and the function of the blades 1212 of the water-TENG 1210 is converting the wind energy to the mechanical rotation motion of the back disk 1224. In this case, there is no electrical output for the water-TENG 1210 as shown in FIG. 23, because the flowing water with tribo-charges is a necessary condition to generate electrical output for the water-TENG 1210.

Figure 24:
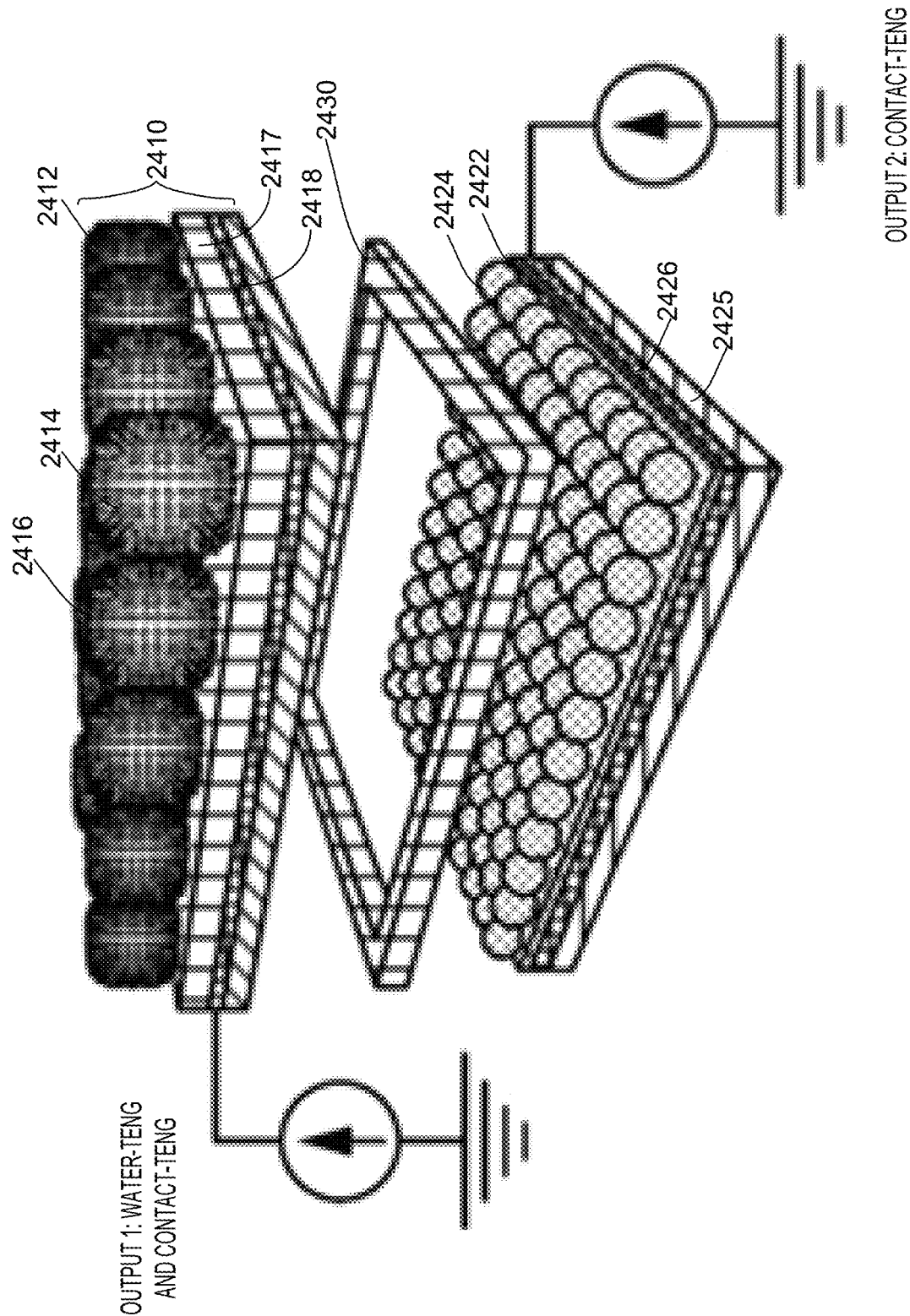
FIG. 24 provides a schematic illustration of a generator according to one aspect of the disclosed technology.

FIG. 24 illustrates a generator 2400 for harvesting energy from flowing water according to one aspect of the disclosed technology. The generator 2400 can include a water-TENG 2410 to collect the electrostatic energy of water and a contact-TENG 2420 to collect the mechanical/kinetic energy of water. Both the water-TENG 2410 and the contact-TENG 2420 can operate in a single-electrode mode.

Output 1 of the generator 2400 can include power generated from both the water-TENG 2410 and the contact-TENG 2420, whereas Output 2 of the generator 2400 can only include power generated from the contact-TENG 2420. Therefore, the power generated by the water-TENG 2410 is the difference between Output 1 and Output 2.

The water-TENG 2410 can include a surface layer 2412. The surface layer 2412 can be superhydrophobic to enhance the electrostatic induction effect. In one example, the surface layer 2412 can include a $TiO_2$ layer 2414 with hierarchical micro-/nanostructures 2416 thereon.

The water-TENG 2410 can include an electrode 2418. The electrode 2418 can include, but not limited to, anyone or a combination of the following materials: metal such as copper, gold, silver and aluminum, ITO and conductive polymer, among many other possibilities.

The surface layer 2412 can receive flowing water carrying triboelectric charges. The flowing water can affect a flow of electrons between the electrode and ground.

Figure 25A:
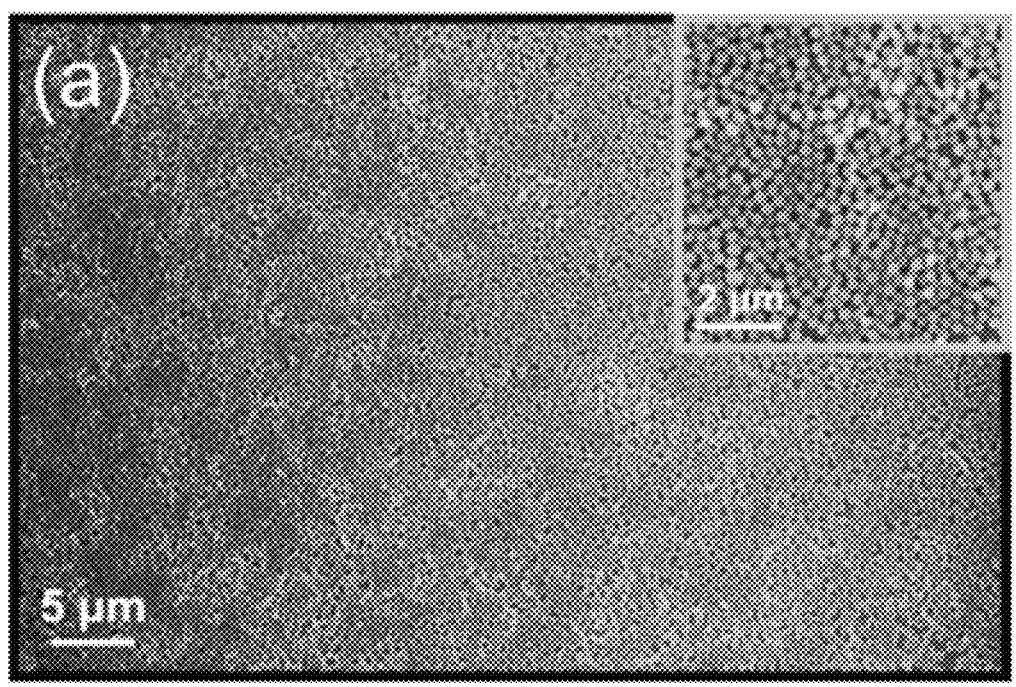
FIG. 25A provides a SEM image of assembled $SiO_2$ nanoparticles according to one aspect of the disclosed technology.
Figure 25B:
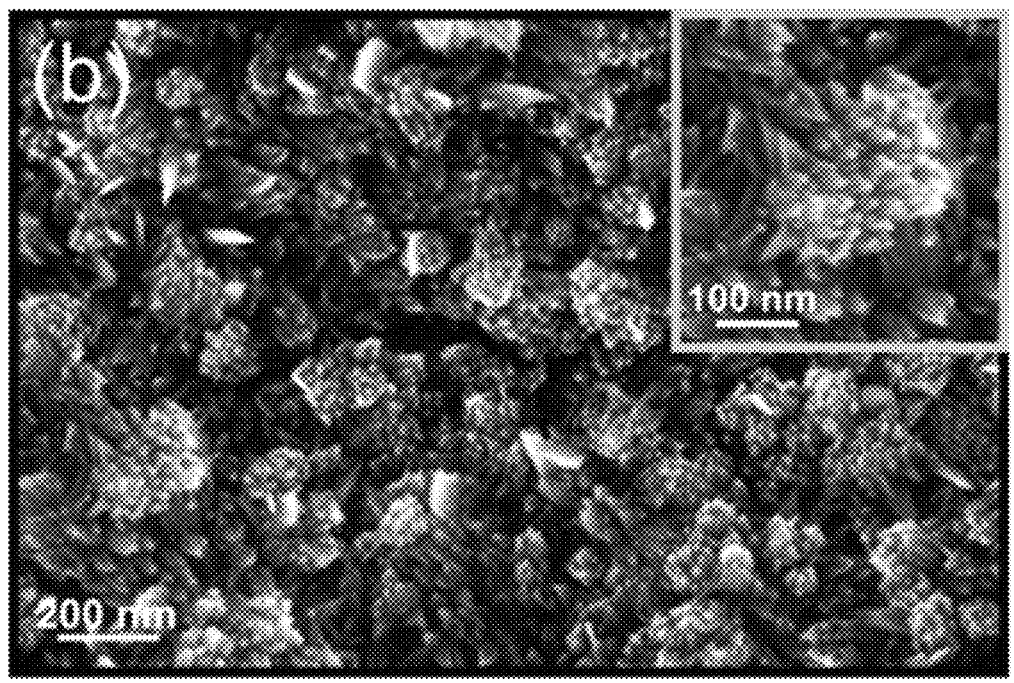
FIG. 25B provides a SEM image of a prepared $TiO_2$ layer with irregular structures according to one aspect of the disclosed technology.

FIG. 25A displays a SEM image of assembled $SiO_2$ nanoparticles on the $SiO_2$ thin film. The inset of FIG. 25A shows that the nanoparticles are uniformly distributed on the surface. By contrast, FIG. 25B illustrates a prepared $TiO_2$ layer on a PET film with irregular structures. As illustrated in the inset of FIG. 25B, the irregular structures can be dendrite-like particles made of nanoplatelets. In one embodiment, the particles can have an average size of 180 nm and composed by nanoplatelets with an average width of 5 nm and length of 70 nm, respectively.

Figure 26A:
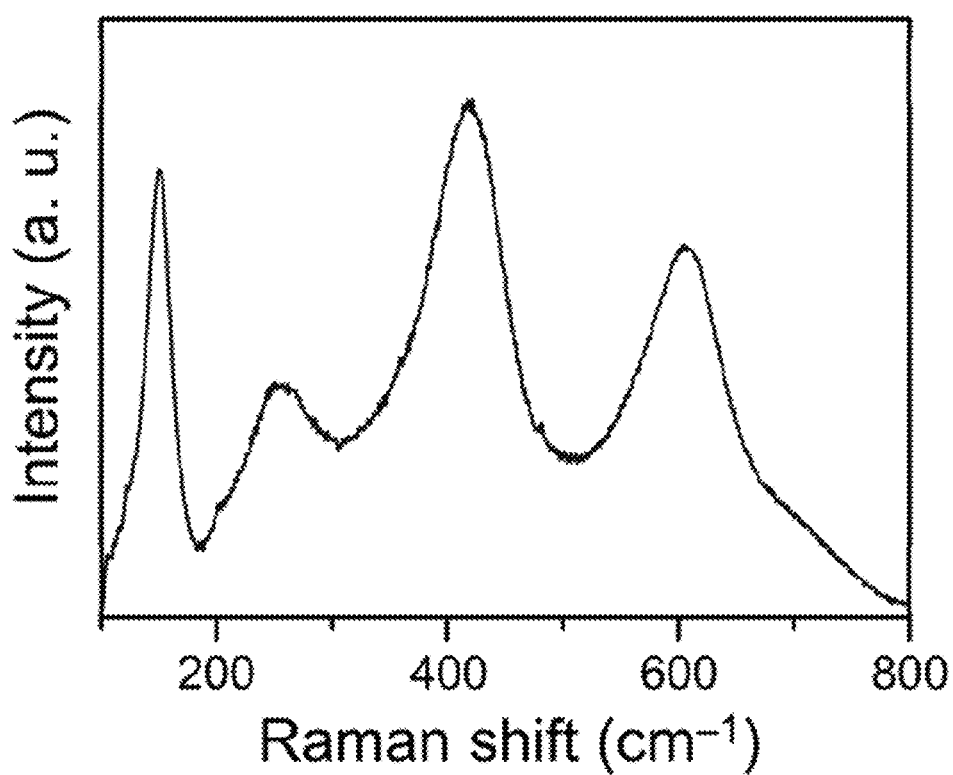
FIG. 26A illustrates a Raman spectrum of the prepared $TiO_2$ layer according to one aspect of the disclosed technology.
Figure 26B:
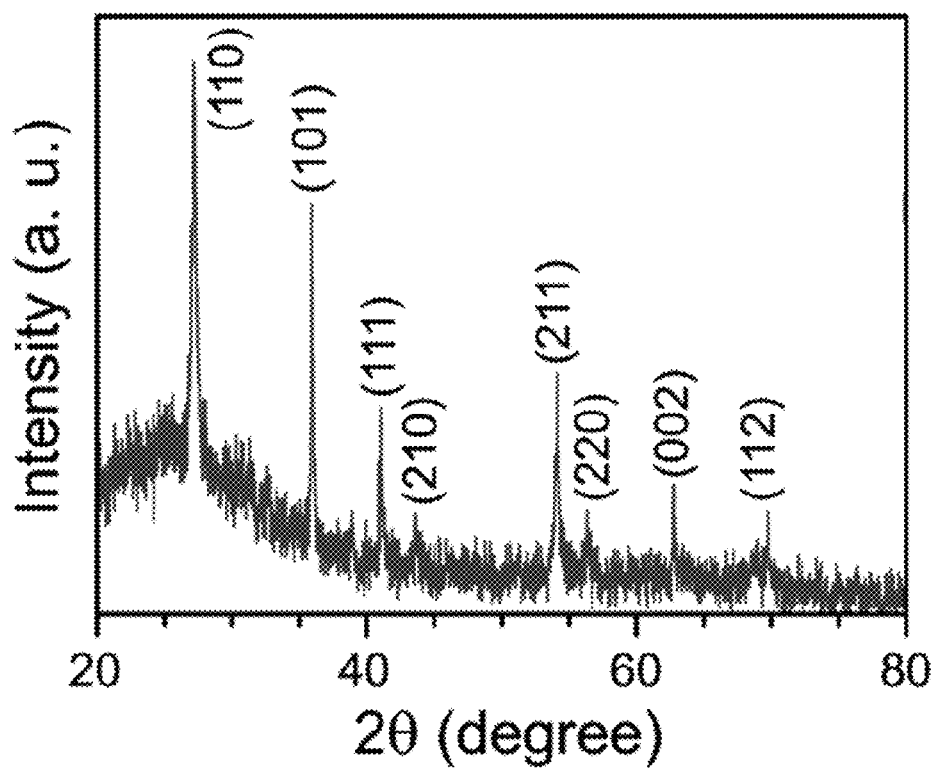
FIG. 26B illustrates an X-ray diffraction (XRD) pattern of the prepared $TiO_2$ layer according to one aspect of the disclosed technology.

FIG. 26A illustrates the crystal phase of $TiO_2$ layer as identified by Raman spectroscopy. The Raman bands appearing at 137, 254, 430, and 605 $cm^{-1}$ can be assigned to the $B_{1g}$, two-phonon scattering, $E_g$, and $A_{1g}$ modes of rutile phase, indicating that the dendrite-like particles are formed by rutile $TiO_2$ nanoplatelets. FIG. 26B illustrates the crystal phase of $TiO_2$ layer as identified by XRD. The XRD pattern shows the characteristic diffraction peaks of rutile phase, which also validates the Raman spectroscopy result.

Figure 27A:
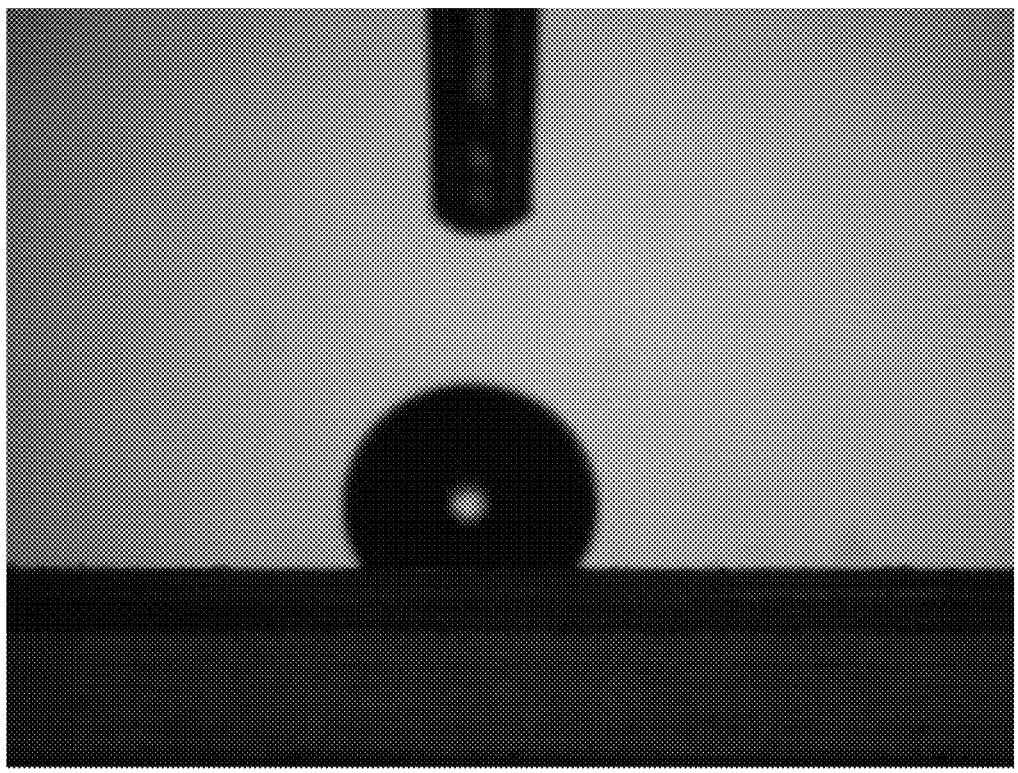
FIG. 27A illustrates an advancing contact angle of the prepared $TiO_2$ layer according to one aspect of the disclosed technology.
Figure 27B:
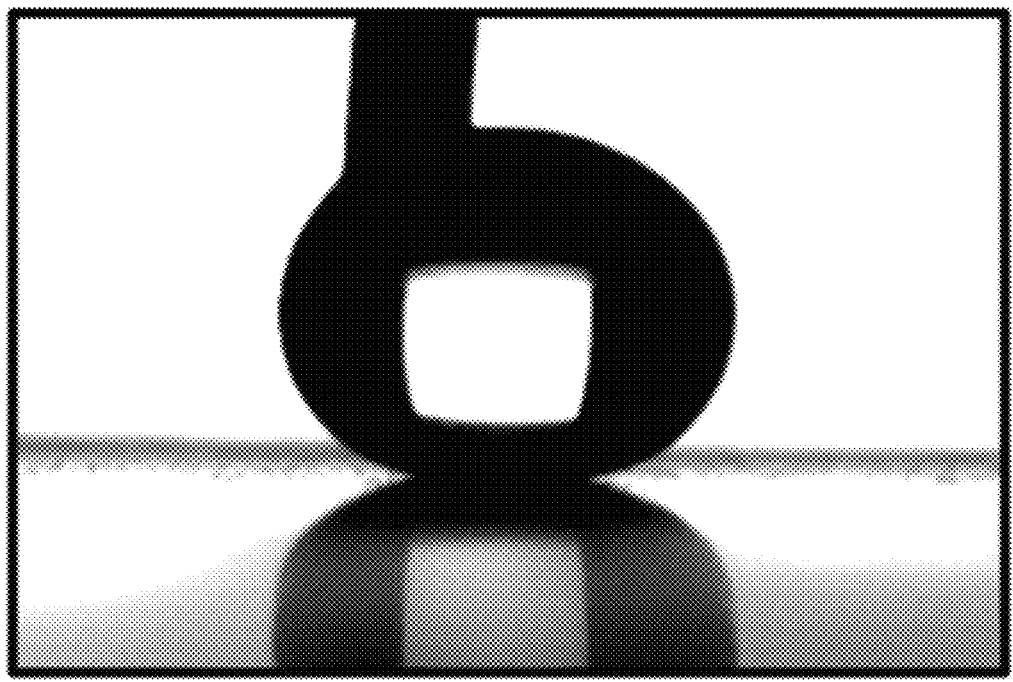
FIG. 27B illustrates an advancing contact angle of the prepared $TiO_2$ layer after coating with 1H,1H,2H,2H-perfluorooctyltrichlorosilane (PFTS) according to one aspect of the disclosed technology.

The $TiO_2$ layer with hierarchical micro-/nanostructures increases hydrophobicity of the water-TENG 2410. The hydrophobicity of the $TiO_2$ layer is assessed by measuring the contact angle of water drops. FIG. 27A illustrates that the measured contact angle of the $TiO_2$ layer is about 130°. Compared to the rutile form of smooth $TiO_2$ surface with a contact angle less than 80°, the increased contact angle in the $TiO_2$ layer is attributed to the hierarchical micro-/nanostructures that trap air, which, in turn, reduce the actual contact area between the surface and water drops. After a monolayer coating of PFTS on the $TiO_2$ layer, the measured contact angle of $TiO_2$ layer can be enhanced to 156° as illustrated in FIG. 27B, which can be referred to as superhydrophobic.

$TiO_2$ is selected due to its low cost, high chemical stability, excellent photocatalytic activity, and broad-spectrum antibacterial property. The use of $TiO_2$ nanomaterials in the water-TENG 2410 can not only harvest the electrostatic energy of water, but also provide the advantages of photocatalytic activity and antibacterial property for water purification.

Figure 28:
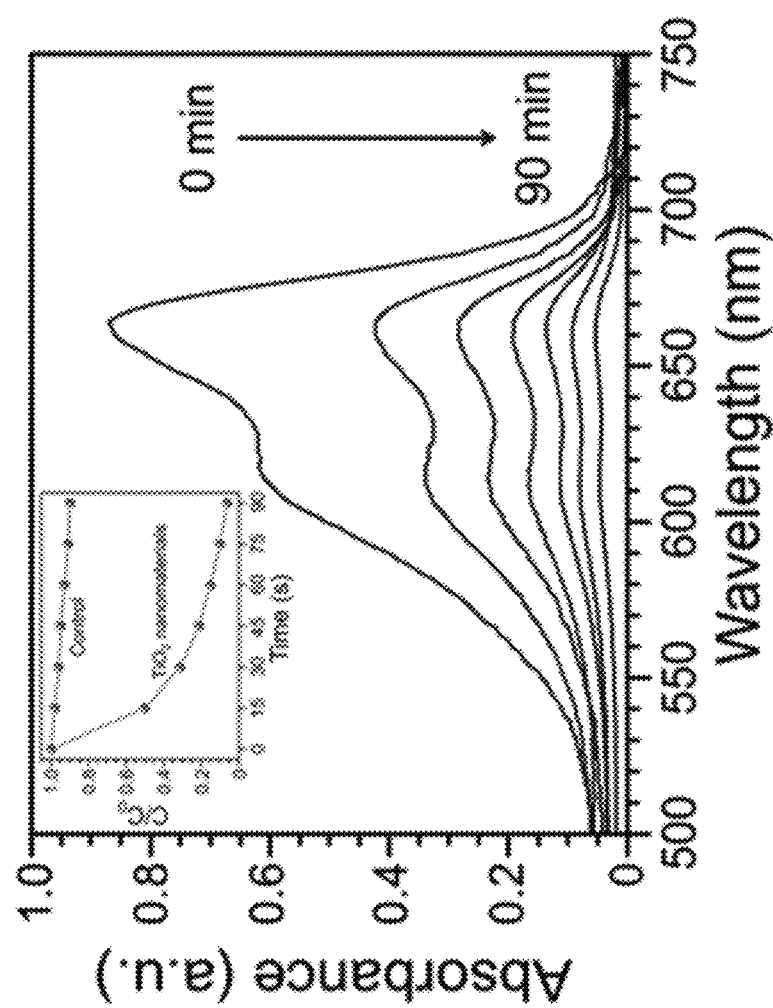
FIG. 28 illustrates UV-Vis absorption spectra of the MB solution under the solar light irradiation in the presence of the prepared $TiO_2$ layer according to one aspect of the disclosed technology.

In one experiment, the photocatalytic activity of the $TiO_2$ layer 2414 is evaluated by the photodegradation of methylene blue (MB) under the solar light irradiation (intensity 100 $mW/cm^2$), as illustrated in FIG. 28. The inset of FIG. 28 provides a comparison of photocatalytic activity without and with the prepared $TiO_2$ layer 2414.

In a typical experiment, the $TiO_2$ layer on PET film is dipped into a MB solution (10 mL, 20 μM). Prior to the irradiation, the solution is kept in the dark for 20 minutes to achieve the adsorption-desorption equilibrium between the $TiO_2$ nanomaterials and MB. Then, at certain time interval (every 15 minutes) during the irradiation process, the solution is analyzed with a UV-Vis spectrophotometer to measure the concentration change of MB. After the light irradiation for 90 minutes, almost all MB is photodegradated as compared to the control experiment in the absence of $TiO_2$ layer.

In the experiment, a 450 W xenon arc lamp (Oriel, Stratford, Conn.) equipped with an AM 1.5 filter is used as a solar irradiation source. A commercially available silicon-based reference cell is employed to examine the light intensity (100 mW/cm$^2$).

The antibacterial property of the $TiO_2$ layer 2414 against *E. coli* is also assessed. In one experiment, *E. coli* (DH5α) is grown in sterile LB medium. The medium is prepared by dissolving bacto-tryptone, bacto-yeast extract, and NaCl in deionized water. The solution is adjusted to pH 7.0 by adding NaOH. The *E. coli* is controlled to grow until the absorbance of the solution at wavelength 600 nm reached 1.0. A portion of the solution is centrifuged and washed with 0.85% NaCl to remove the matrix. Cells diluted to 4.0×10$^6$ CFU/mL are incubated in LB medium with and without the prepared $TiO_2$ layer under the solar light irradiation (intensity 100 mW/cm$^2$). The viability assay is calculated by using SYTO 9 and propidium iodide (PI) dyes. The *E. coli* treated with the prepared $TiO_2$ layer is subject to three centrifugation/wash cycles and washed with 0.85% NaCl to remove the matrix. Then the suspension is mixed with the dyes. The mixtures are incubated for 15 minutes at 25° C. Fluorescence intensities of SYTO 9 (excitation wavelength of 475 nm, emission wavelength of 530 nm, green) and PI (excitation wavelength of 475 nm, emission wavelength of 640 nm, red) are recorded. The fluorescence intensity ratio of 530 nm/640 nm is used to calculate the percentage of live/dead cell population.

Figure 30A:
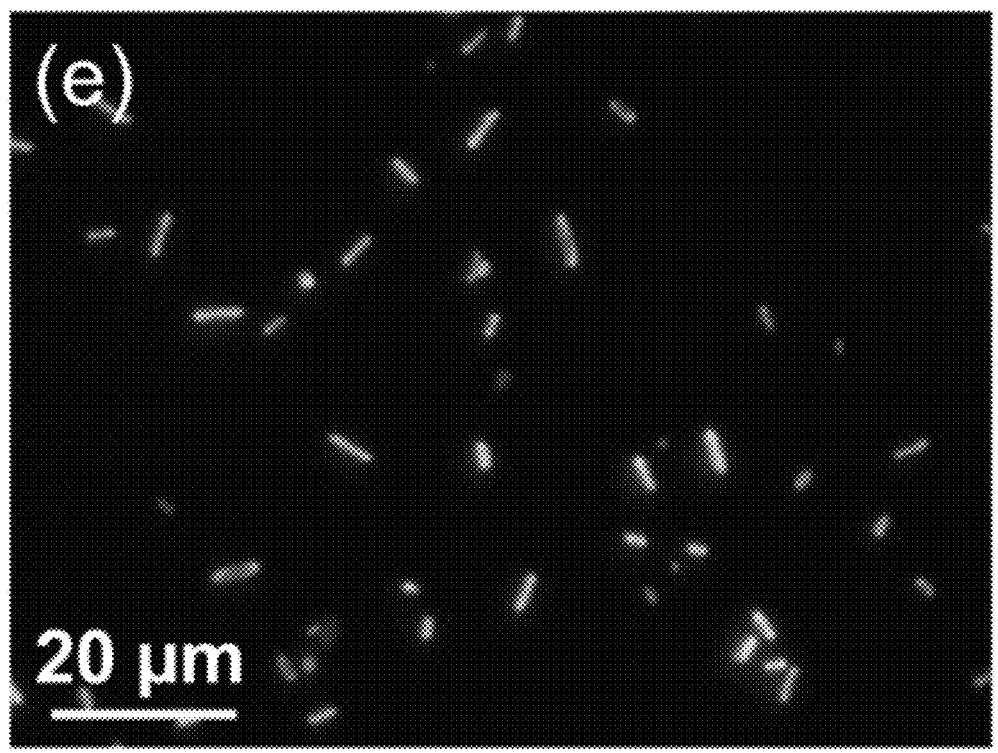
FIG. 30A provides a fluorescence image of *E. coli* in LB media under the solar light irradiation for 60 minutes without the prepared $TiO_2$ layer according to one aspect of the disclosed technology.
Figure 30B:
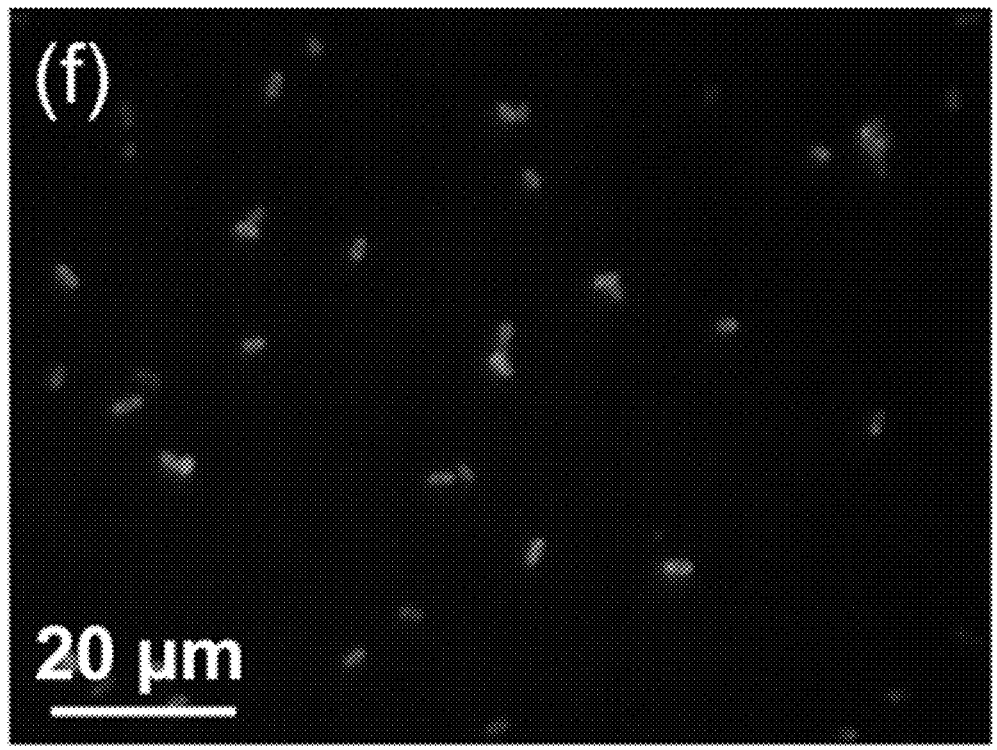
FIG. 30B provides a fluorescence image of *E. coli* in LB media under the solar light irradiation for 60 minutes with the prepared $TiO_2$ layer according to one aspect of the disclosed technology.

FIGS. 30A-B provide representative microscopic images of *E. coli* in LB media incubating without and with the $TiO_2$ layer under the light irradiation for 30 minutes. Fluorescent stains in FIG. 30A represent live cells, whereas fluorescent stains in FIG. 30B represent dead cells. The viability values of *E. coli* in the presence of the $TiO_2$ layer without and with the light irradiation are 84% and 17%, respectively.

The contact-TENG 2420 can be coupled to the water-TENG 2410. The contact-TENG 2420 can include a negative triboelectric charging material 2422 and a positive triboelectric charging material 2424. In one example, the negative triboelectric charging material 2422 can include but not limited to a PTFE layer. The positive triboelectric charging material 2424 can include but not limited to a layer of $SiO_2$ nanoparticles. $SiO_2$ nanoparticles 2424 can provide the advantage of larger contact surface area and enhance the electric output of the contact-TENG 2420.

When the water-TENG 2410 receives the flowing water, the water-TENG 2410 can contact the contact-TENG 2420 to affect a flow of electrons at the water-TENG 22410 and the contact-TENG 2420.

Figure 29:
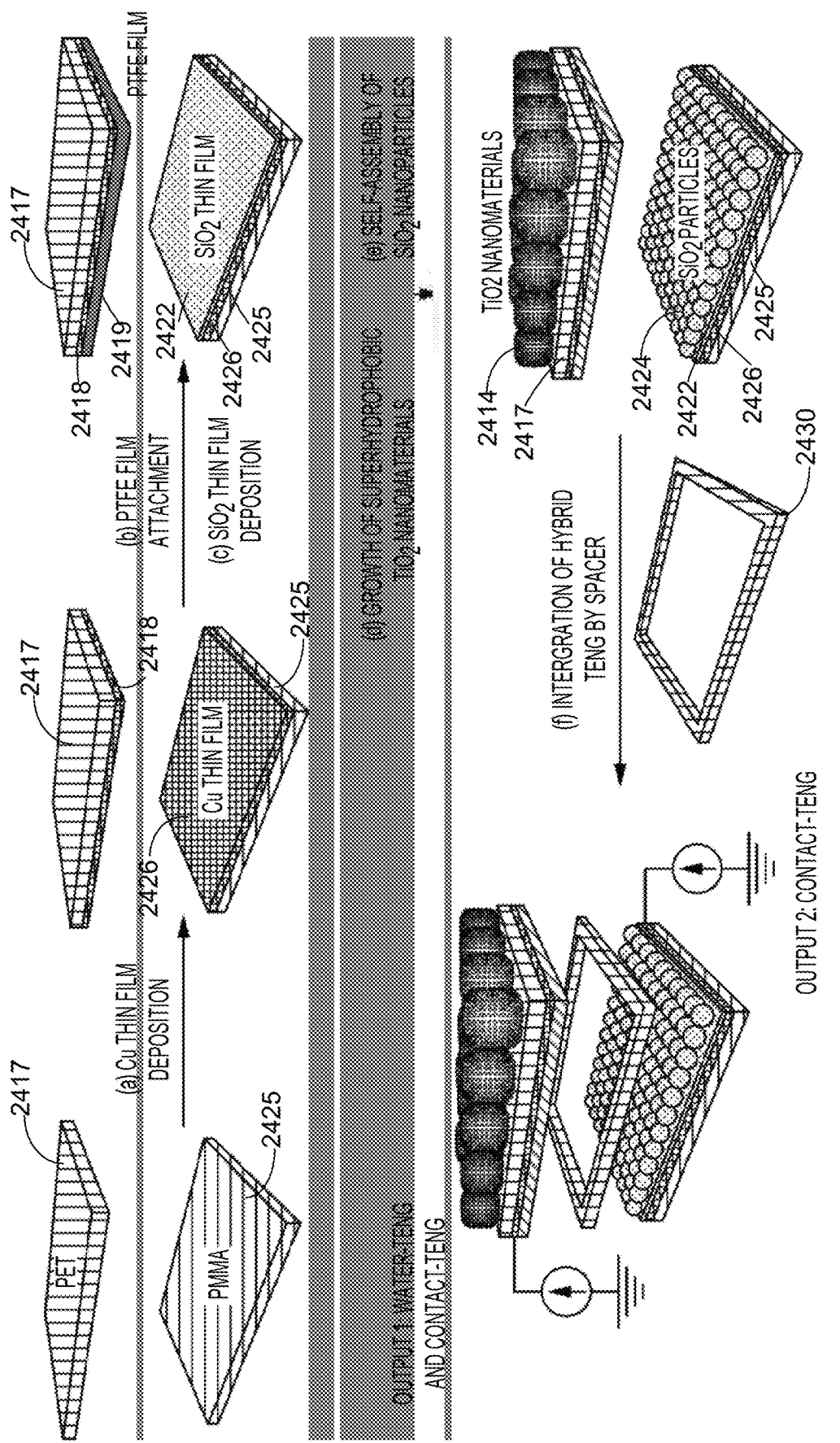
FIG. 29 illustrates a fabrication process of the generator of FIG. 24 according to one aspect of the disclosed technology.

FIG. 29 illustrates an exemplary fabrication process of the generator 2400.

The water-TENG 2410 can use a PET film 2417. The PET film 2417 can have a thickness of 0.1 mm.

Before the growth of $TiO_2$ layer with hierarchical micro-/nanostructures, the PET film can be ultrasonically cleaned in ethanol and water for 30 minutes, respectively. Then, the PET film can be placed in a glass bottle filled with $TiCl_3$ solutions (0.1 M). After 10 minutes, the glass bottle can be heated in an oven at 80° C. for six hours and cooled in air. The growth cycle need to repeat 2 times to make sure the PET film surface is coated with a uniform $TiO_2$ layer.

During the growth of $TiO_2$ crystal, Ti(III) species can be gradually oxidized to Ti(IV) species by the dissolved $O_2$ and then hydrolyzed to form $TiO_2$. By increasing the reaction time and growth cycle, a $TiO_2$ layer 2414 with hierarchical micro-/nanostructures 2416 instead of vertically aligned $TiO_2$ nanoplatelet arrays is formed.

The $TiO_2$ layer 2414 coated PET film can be rinsed with water to remove the non-adsorbed $TiO_2$ nanomaterials and dried at ambient temperature. After that, the $TiO_2$ layer 2414 can be further coated with PFTS to increase the hydrophobicity. Specifically, the $TiO_2$ layer coated PET film can be immersed in 0.5% PFTS in hexane for 10 minutes, and washed with hexane to remove residual PFTS. After further drying at ambient temperature, the $TiO_2$ layer coated PET film can be treated in a vacuum oven at 110° C. for one hour.

A Cu thin film 2418 (e.g., 100 nm) can be firstly deposited on the other side of the PET film 2417 as the electrodes for the water-TENG 2410. The Cu thin film 2418 can be connected with Output 1 of the generator 2400, including power generated from both the water-TENG 2410 and the contact-TENG 2420.

A commercial PTFE film 2419 (e.g., 25 μm) can cover the top of the deposited Cu thin film 2418. On the other side of PET film, a $TiO_2$ layer 2414 with hierarchical micro-/nanostructures 2416 can grow directly through a facile, scalable, and low-cost chemical bath method.

The contact-TENG 2420 can use a PMMA sheet 2425. A Cu thin film 2426 can be deposited on one side of the PMMA sheet 2425 as the electrodes for the contact-TENG 2420. The Cu thin film 2426 can have a thickness of approximately 100 nm. The Cu thin film 2426 is the Output 2 of the generator 2400, which can only include the power generated from the contact-TENG 2420.

For purposes of generating triboelectric charges with a high density on the surface, silica ($SiO_2$) can be selected because it is positioned extremely positive in the triboelectric series. A $SiO_2$ thin film 2422 (e.g., 20 nm) can be deposited on top of the Cu thin film 2426. Then, a layer of $SiO_2$ nanoparticles 2424 can be assembled on the deposited $SiO_2$ thin film 2422 to increase the contact area. $SiO_2$ nanoparticles 2424 with an average size of 250 nm can be synthesized according to the Stöber method. Typically, concentrated ammonia (28%, 3 mL) is added rapidly to the solution containing absolute ethanol (99.9%, 50 mL) and tetraethyl orthosilicate (99%, 1.5 mL). The mixture is reacted at ambient temperature for 24 hours.

A spacer 2430 can combine all parts of the generator 2400. For example, the spacer 2430 can be applied to maintain a gap distance between the PTFE film 2419 of the water-TENG 2410 and the $SiO_2$ nanoparticles 2424 of the contact-TENG 2420. The spacer 2430 can include a PET film. The spacer 2430 can have a thickness of about 0.5 mm.

Figure 31A:
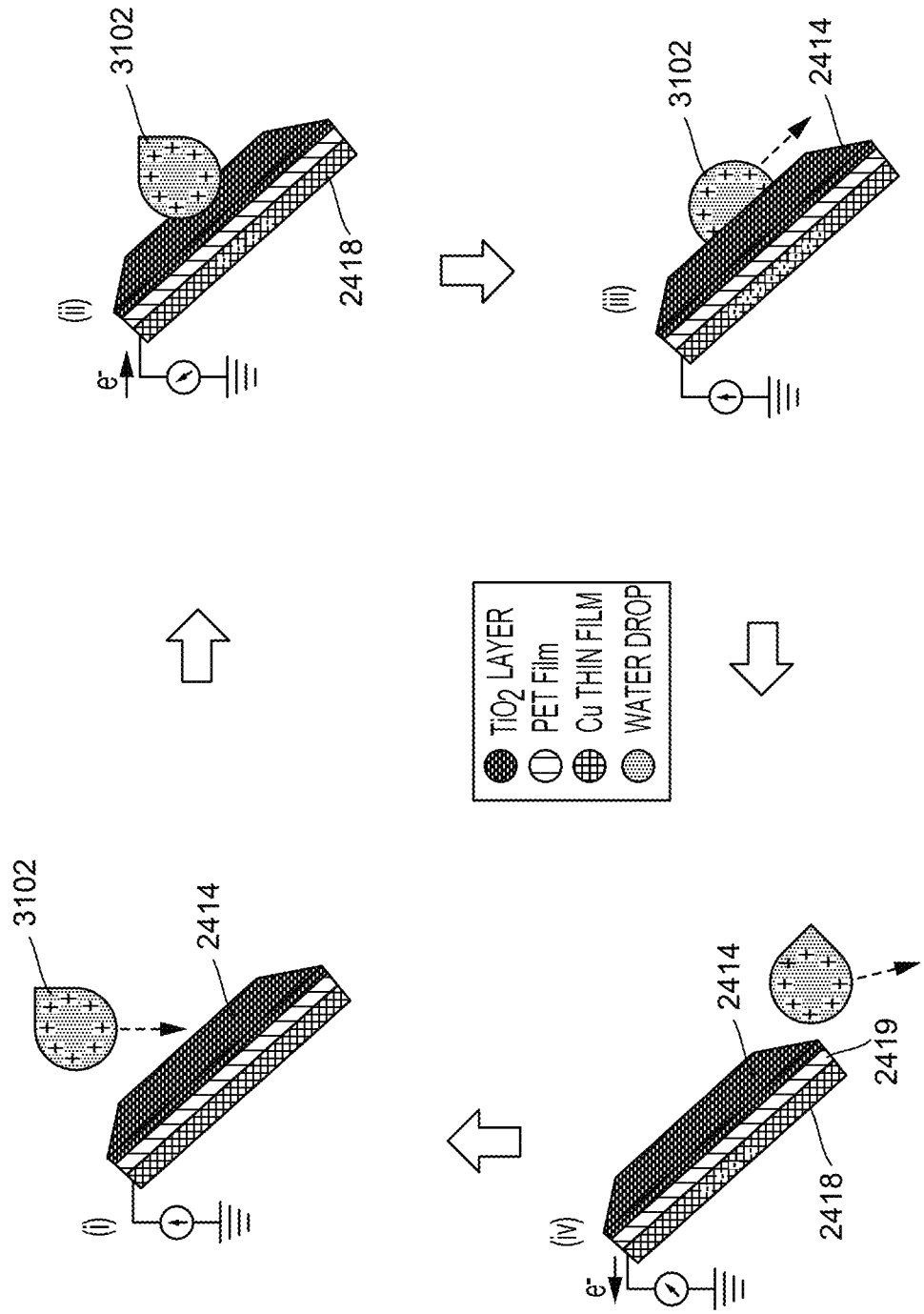
FIG. 31A illustrates working mechanism of the water-TENG of the generator illustrated in FIG. 24 according to one aspect of the disclosed technology.

Both the water-TENG 2410 and the contact-TENG 2420 can operate in a single-electrode mode. FIG. 31A illustrates the working mechanism of the water-TENG 2410 of the generator 2400. When a water drop 3102 carrying positive charges contacts the $TiO_2$ layer 2414 as shown in step (ii), a positive electric potential difference can occur between the charged water drop 3102 and ground. This can cause the electrons to flow from ground to the electrode 2418 and generate an instantaneously opposite potential to balance the electric field, finally reaching equilibrium at step (iii). Once the charged water drop 3102 leaves the $TiO_2$ layer 2414, a negative electric potential difference can occur, forcing the electrons to flow from the electrode 2418 to ground at step (iv), until achieving another equilibrium at step (i).

Figure 31B:
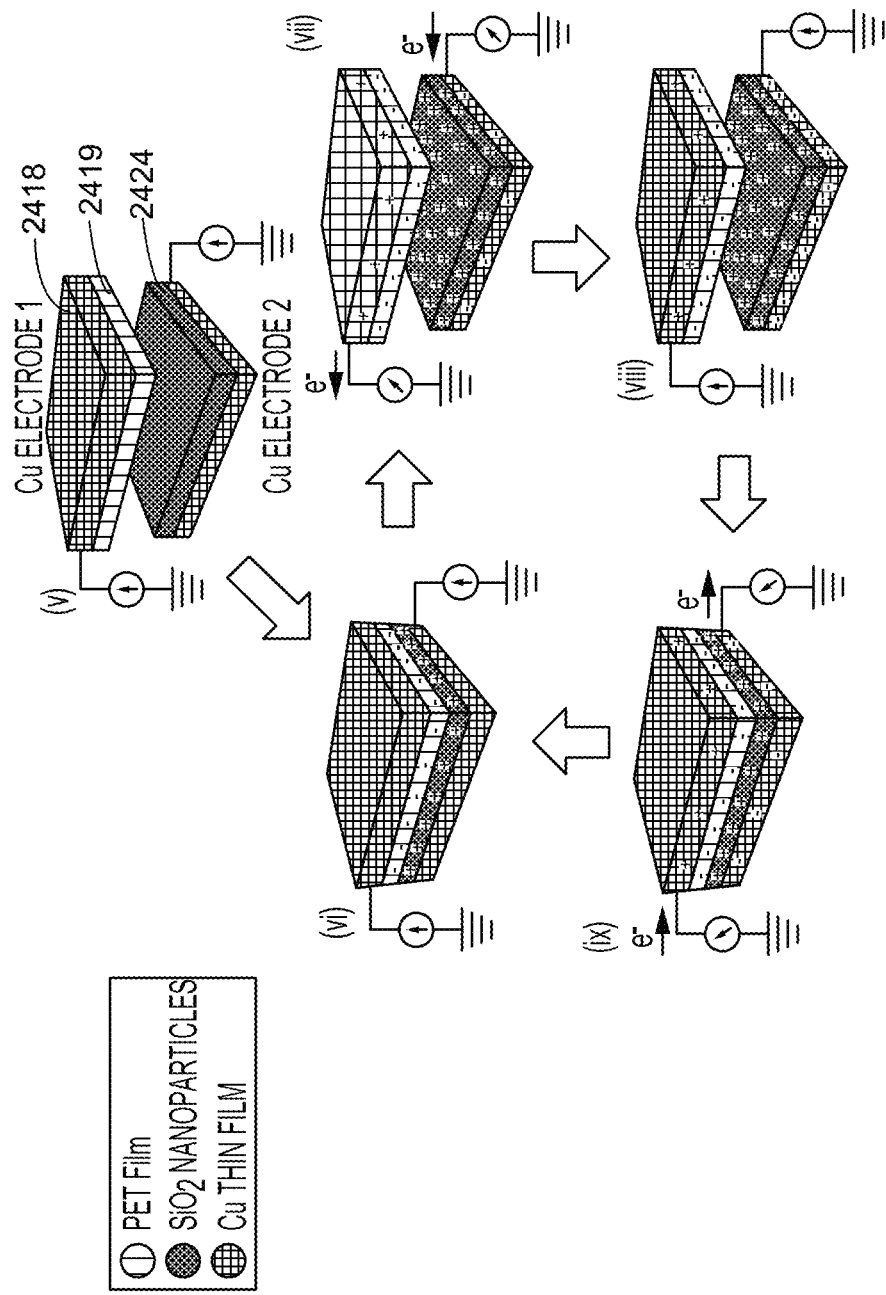
FIG. 31B illustrates working mechanism of the contact-TENG of the generator illustrated in FIG. 24 according to one aspect of the disclosed technology.

FIG. 31B illustrates the working mechanism of the contact-TENG 2420 of the generator 2400. The impact force from the water drop can also drive the contact-TENG 2420 to work. The impact force from the water drop can overcome the resistance from the spacer 2430 to make the PTFE film 2419 of the water TENG 2410 contact the $SiO2$ nanoparticles 2424 at step (vi), causing the electrons to transfer from the $SiO_2$ nanoparticles 2424 to the PTFE film surface 2419 and leaving the $SiO_2$ nanoparticles 2424 a positively charged surface. As the water drop leaves the $TiO_2$ layer 2414, the contacted surfaces are separated, then a positive electric potential difference between the $SiO_2$ nanoparticles 2424 and ground and a negative electric potential difference between ground and the PTFE film 2419 are established at step (vii). This causes the electrons flowing from ground to the electrode 2424 and from the electrode 2418 to ground, finally reaching equilibrium at step (viii). This contributes to instantaneously positive and negative currents from the Output 2 and Output 1 of the generator 2400. Once another charged water drop falls on the generator 2400, and makes the PTFE film 2419 contact the $SiO_2$ nanoparticles 2424 again, a negative electric potential difference between the $SiO_2$ nanoparticles and ground and a positive electric potential difference between ground and the PTFE film 2419 can occur. This causes the electrons to flow from the electrode 2424 to ground and from ground to the electrode 2418 at step (ix), until achieving equilibrium at step (vi). This process corresponds to instantaneously negative and positive currents from the Output 2 and Output 1 of the generator 2400. So, from the working mechanism of the generator 2400, when a charged water drop falls on the generator 2400, the generated outputs of the water-TENG 2410 and the contact-TENG 2420 can be simultaneous and in the same direction. If the charged water drop or flowing water contact and leave the generator 2400 periodically, both the outputs of the water-TENG 2410 and the contact-TENG 2420 can be continuously generated.

The measured signal of the Output 1 of the generator 2400 can contain the power generated from both the water-TENG 2410 and the contact-TENG 2420, while the measured signal of the Output 2 of the generator 2400 represents the power from the contact-TENG 2420.

In one experiment, the performance of the generator 2400 can be tested by using the flowing water from a household faucet. The flowing rate of water is controlled at 20 mL/s and the distance between the generator 2400 and the outlet of faucet is 25 cm. The impact angle is optimized at 30°. The effective dimensions of the generator 2400 are 1.2 cm×1.2 cm. The open-circuit voltage ($V_{oc}$) and $I_{sc}$ are measured to evaluate the performance of the generator 2400. FIGS. 32A-B illustrate typical $V_{oc}$ and $I_{sc}$ curves generated from the Output 1 and Output 2 of the generator 2400. FIG. 32A illustrates that the $V_{oc}$ values of the Output 1 achieve 52 V. FIG. 32B illustrates that the $V_{oc}$ values of the Output 2 achieve 35 V. FIG. 32C illustrates that the $I_{sc}$ values of the Output 1 exceed 14 µA. FIG. 32D illustrates that the $I_{sc}$ values of the Output 2 exceed 6.7 µA.

Figure 33A:
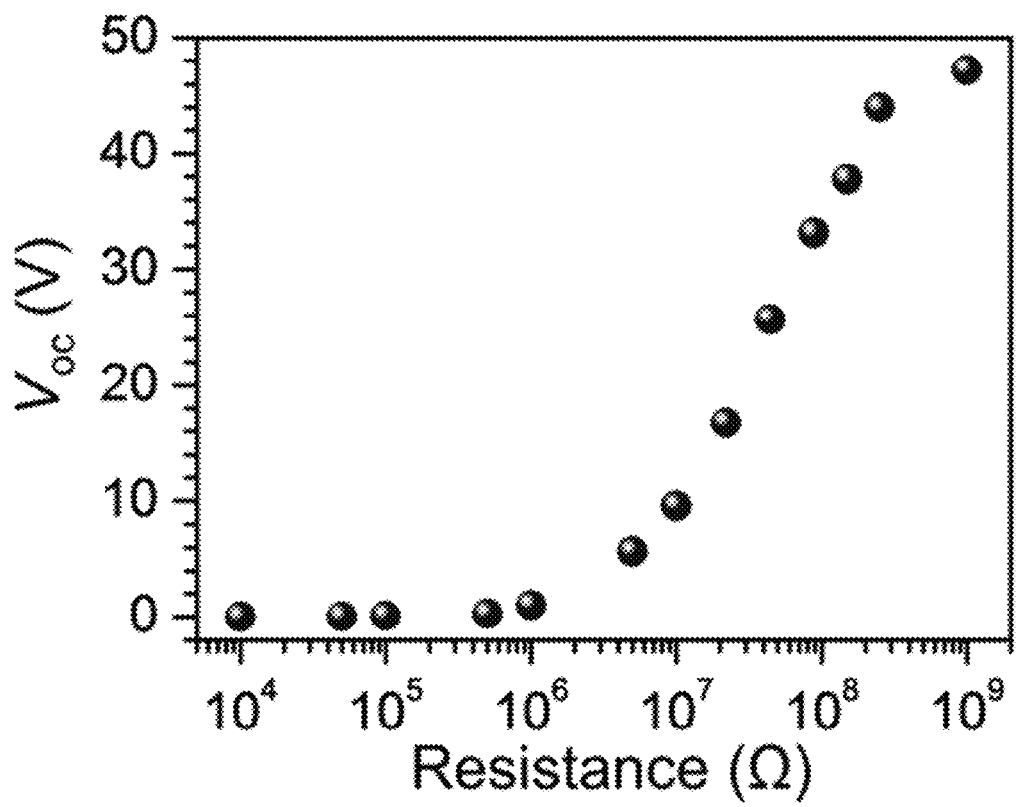
FIG. 33A illustrates dependence of generated $V_{oc}$ from Output 1 of the generator of FIG. 24 on the resistance of the external load according to one aspect of the disclosed technology.
Figure 33B:
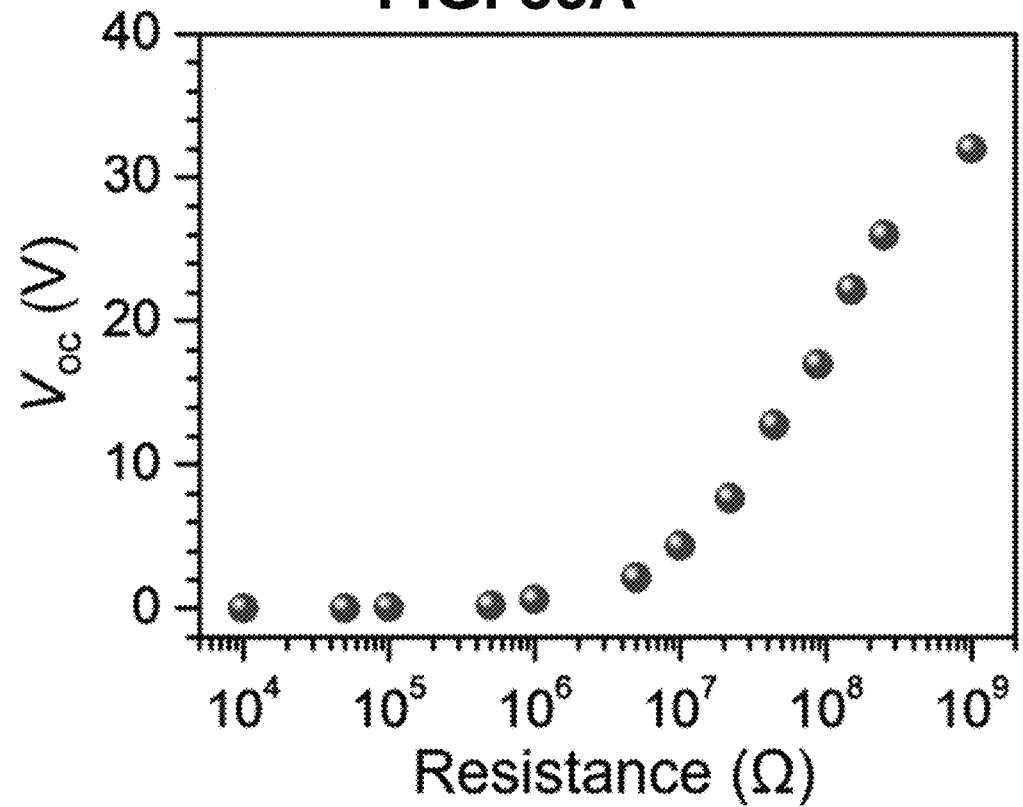
FIG. 33B illustrates dependence of generated $V_{oc}$ from Output 2 of the generator of FIG. 24 on the resistance of the external load according to one aspect of the disclosed technology.
Figure 33C:
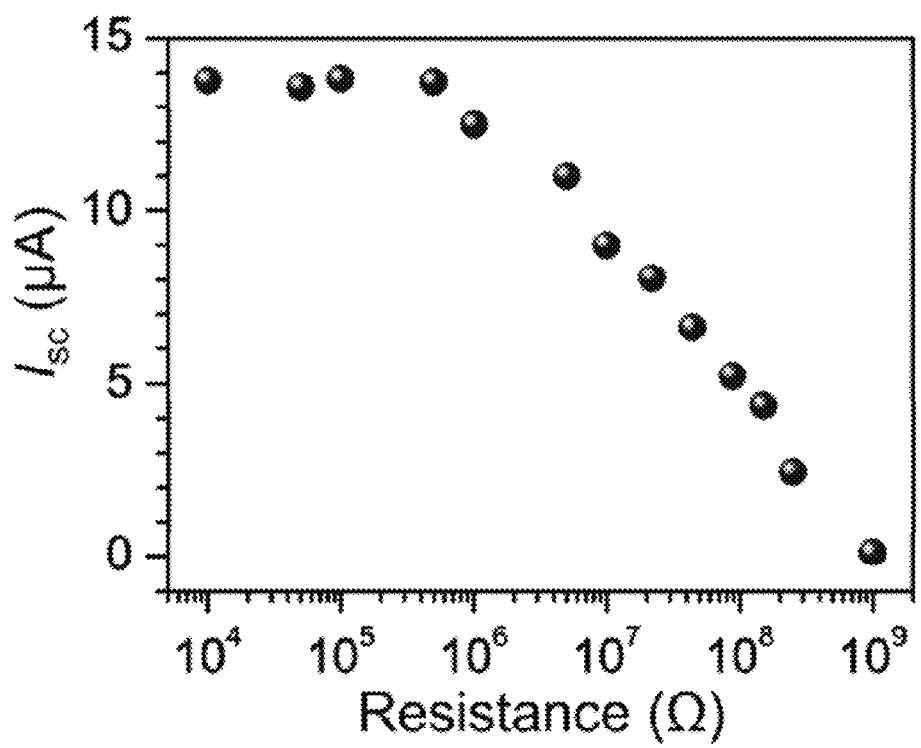
FIG. 33C illustrates dependence of generated $I_{sc}$ from Output 1 of the generator of FIG. 24 on the resistance of the external load according to one aspect of the disclosed technology.
Figure 33D:
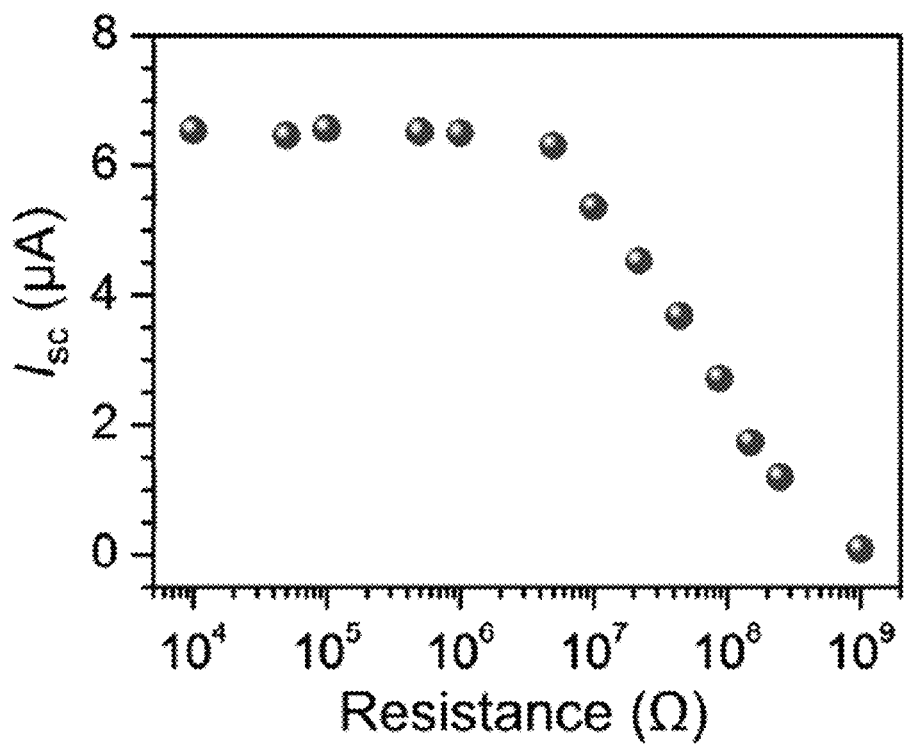
FIG. 33D illustrates dependence of generated $I_{sc}$ from Output 2 of the generator of FIG. 24 on the resistance of the external load according to one aspect of the disclosed technology.
Figure 33E:
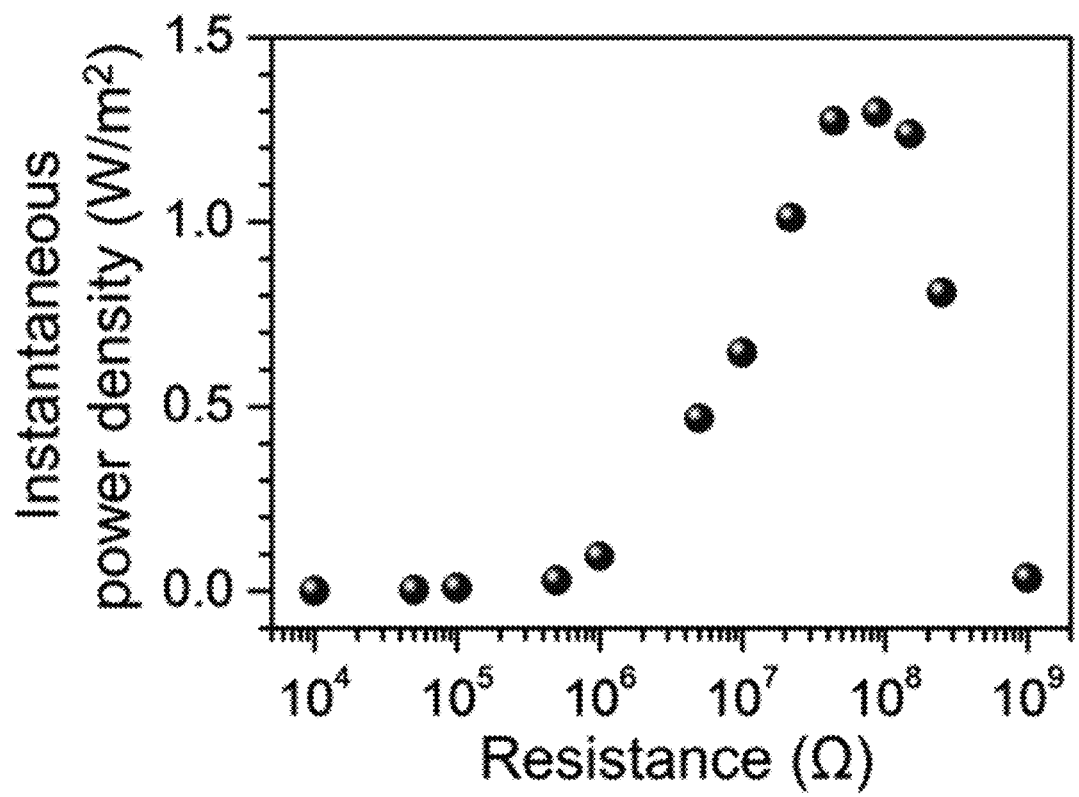
FIG. 33E illustrates dependence of instantaneous power density from Output 1 of the generator of FIG. 24 on the resistance of the external load according to one aspect of the disclosed technology.
Figure 33F:
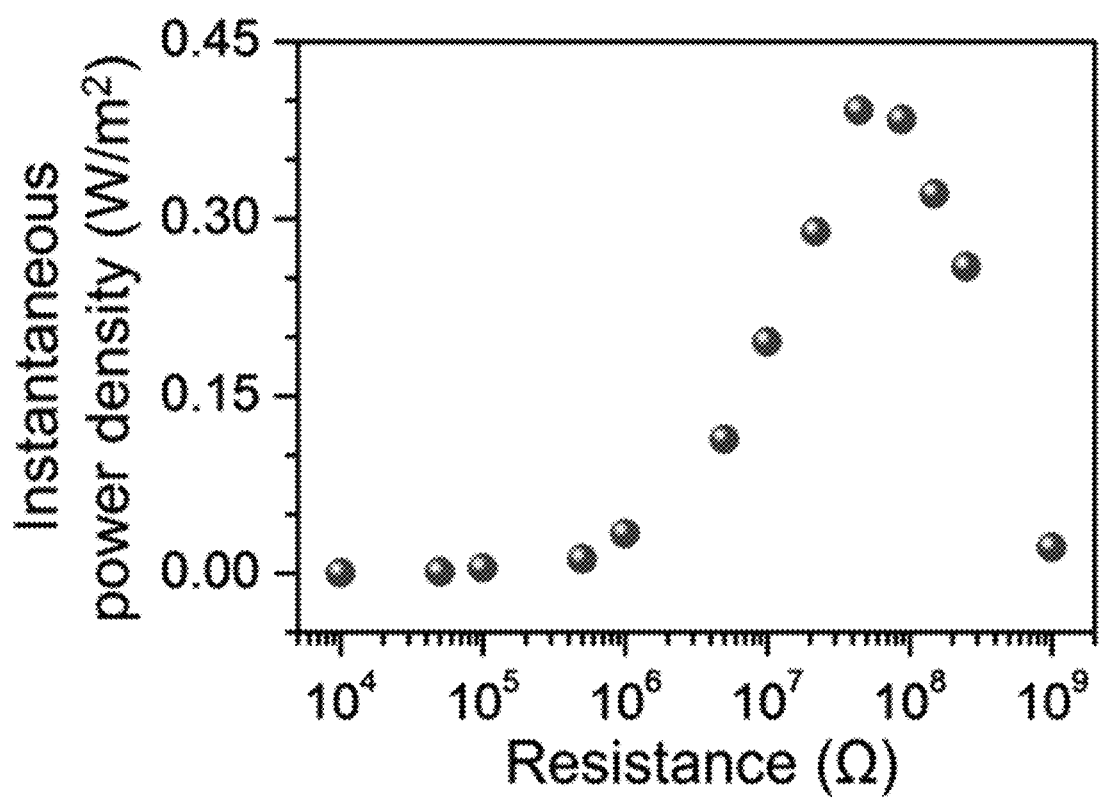
FIG. 33F illustrates dependence of instantaneous power density from Output 2 of the generator of FIG. 24 on the resistance of the external load according to one aspect of the disclosed technology.

To investigate the output power density of the generator 2400, the generated $V_{oc}$ and $I_{sc}$ from the Output 1 and Output 2 of the generator 2400 when connected to an external load resistor are also measured. The resistance varies from 0.01 MΩ to 1 GΩ. As illustrated in FIGS. 33A-B, when the resistance is below 0.1 MΩ, the generated $V_{oc}$ from the Output 1 (as illustrated in FIG. 33A) and Output 2 (as illustrated in FIG. 33B) of the generator 2400 is close to 0. Similarly, as illustrated in FIGS. 33C-D, when the resistance is below 0.1 MΩ, the generated $I_{sc}$ from the Output 1 (as illustrated in FIG. 33C) and Output 2 (as illustrated in FIG. 33D) of the generator 2400 has only little changes. However, when the resistance is raised from 0.1 MΩ to 1 GΩ, the generated $I_{sc}$ from the Output 1 and Output 2 of the generator 2400 through the load generally increases, but the generated $I_{sc}$ from the Output 1 and Output 2 of the generator 2400 across the load decreases. As a result, the instantaneous power density generated from the Output 1 of the generator 2400 as illustrated in FIG. 33E and the instantaneous power density generated from the Output 2 of the generator 2400 as illustrated in FIG. 33F remain small with the resistance below 0.1 MΩ and achieve the maximum values of 1.31 W/m$^2$ and 0.38 W/m$^2$ at a resistance of 44 MΩ, respectively.

For the measurement of electrical outputs of the generator 2400, a programmable electrometer (Keithley Model 6514) and a low-noise current preamplifier (Stanford Research System Model SR570) are used.

Figure 34:
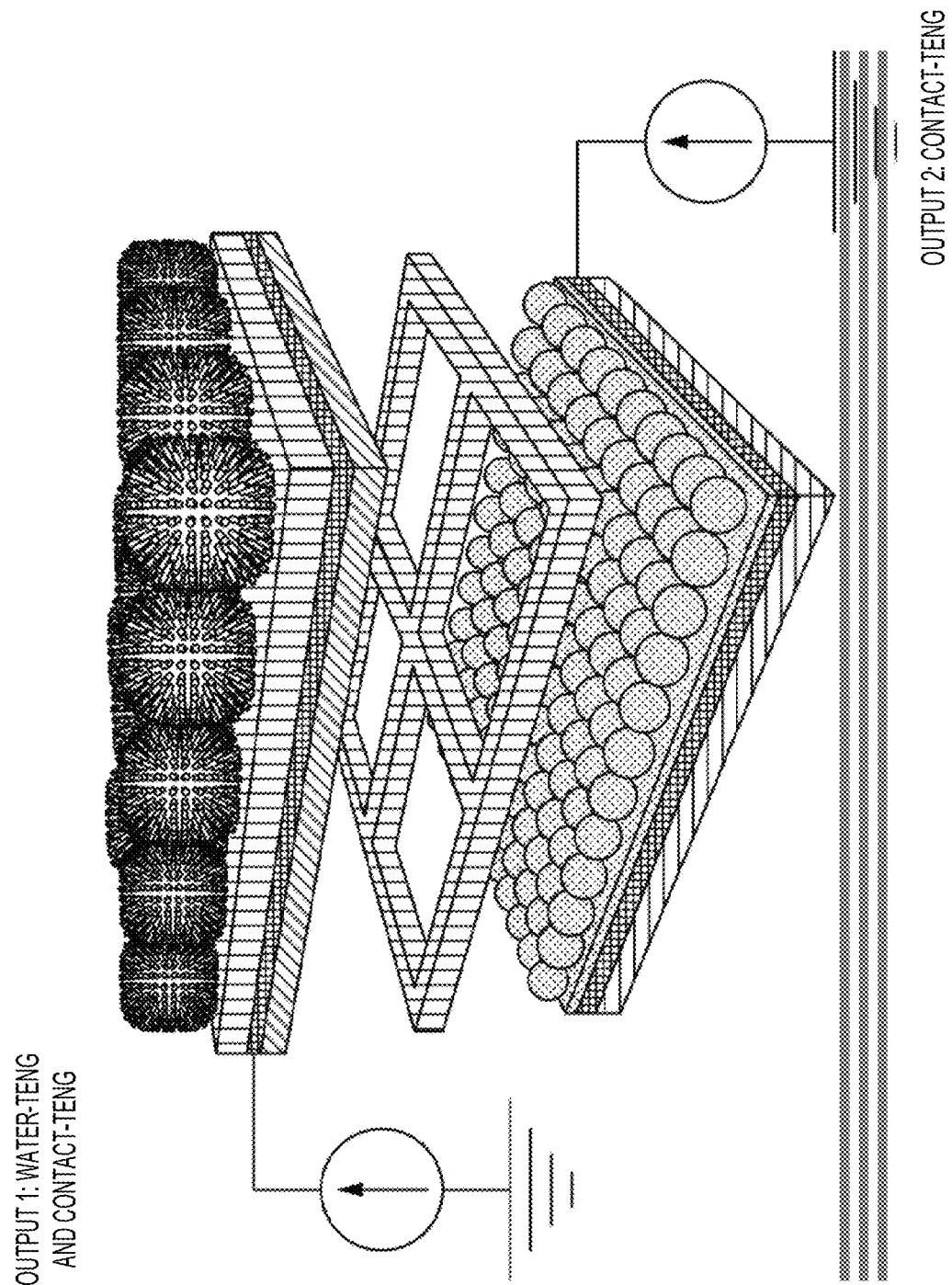
FIG. 34 provides a schematic illustration of a generator according to one aspect of the disclosed technology.
Figure 35A:
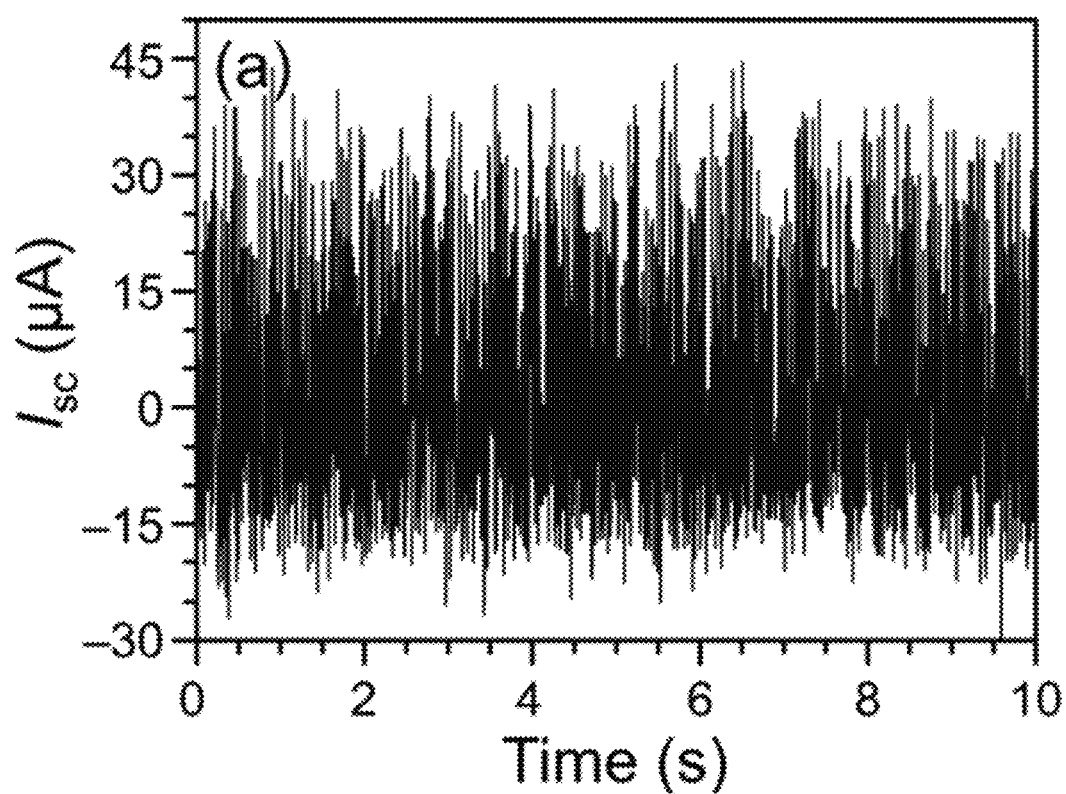
FIG. 35A illustrates generated $I_{sc}$ from Output 1 of the generator of FIG. 34 under the impact of the flowing water from a household faucet according to one aspect of the disclosed technology.
Figure 35B:
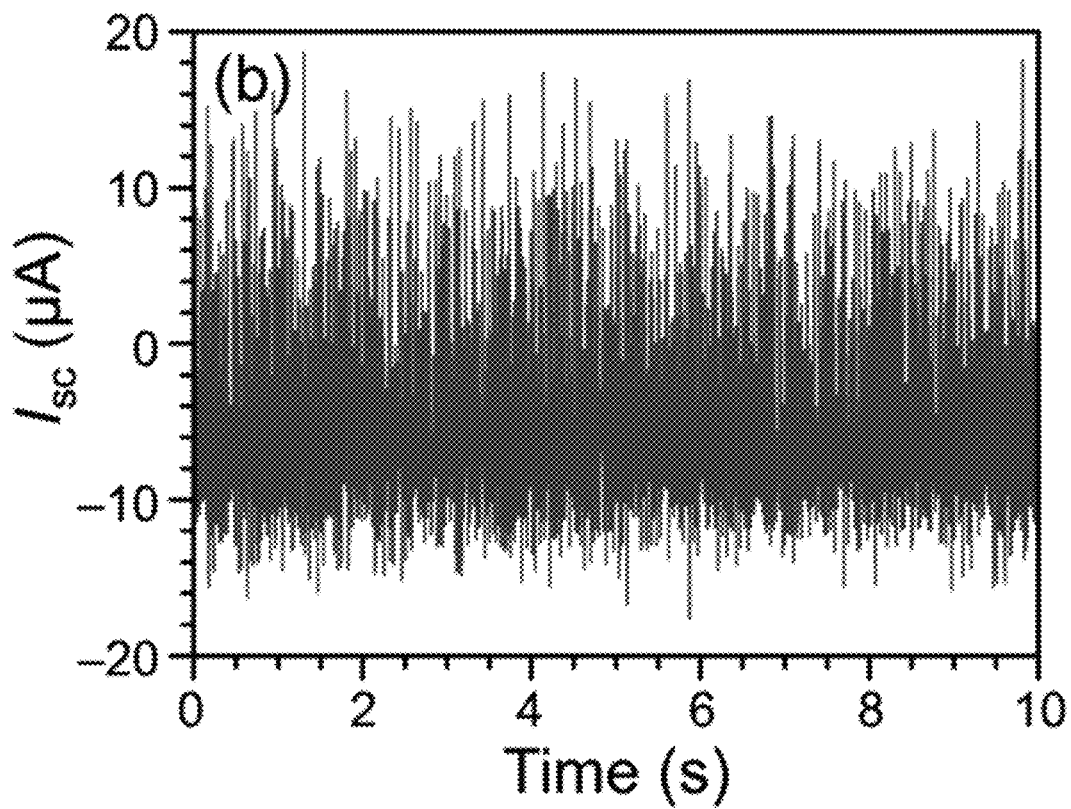
FIG. 35B illustrates generated $I_{sc}$ from Output 2 of the generator of FIG. 34 under the impact of the flowing water from a household faucet according to one aspect of the disclosed technology.

In one experiment, to address the potential applications of the generator 2400, the generator 2400 is configured to have an increased effective dimension of 3.3 cm×3.3 cm as illustrated in FIG. 34. The flowing rate of water is raised to 40 mL/s. The distance between the generator 2400 and the outlet of faucet is 25 cm. FIG. 35A illustrates that the generated $I_{sc}$ from the Output 1 of the generator 2400 can reach 43 µA. FIG. 35B illustrates that the generated $I_{sc}$ from the Output 2 of the generator 2400 can reach 18 µA.

Figure 36:
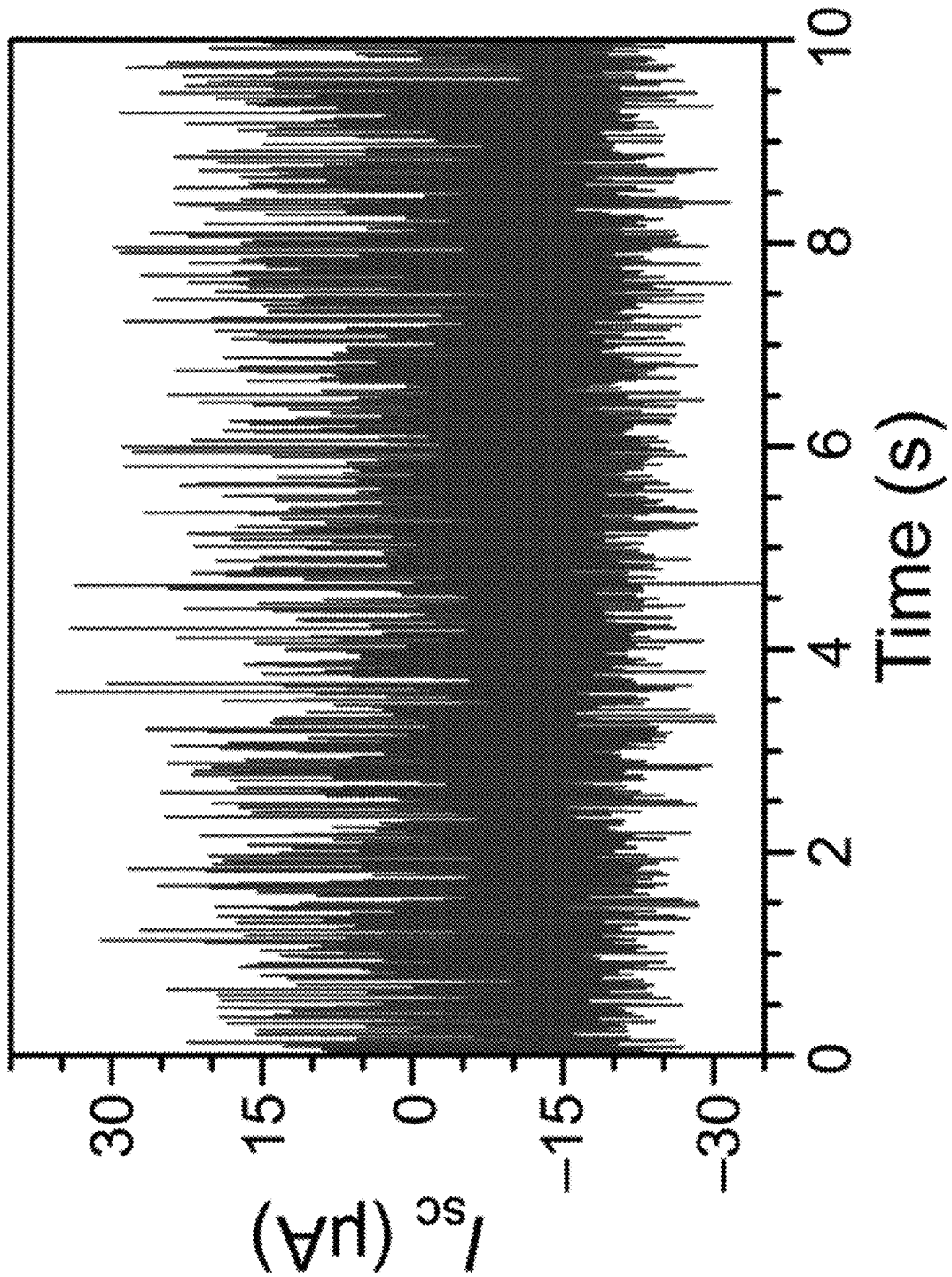
FIG. 36 illustrates generated $I_{sc}$ from a single water-TENG under the impact of the flowing water from a household faucet according to one aspect of the disclosed technology
Figure 37A:
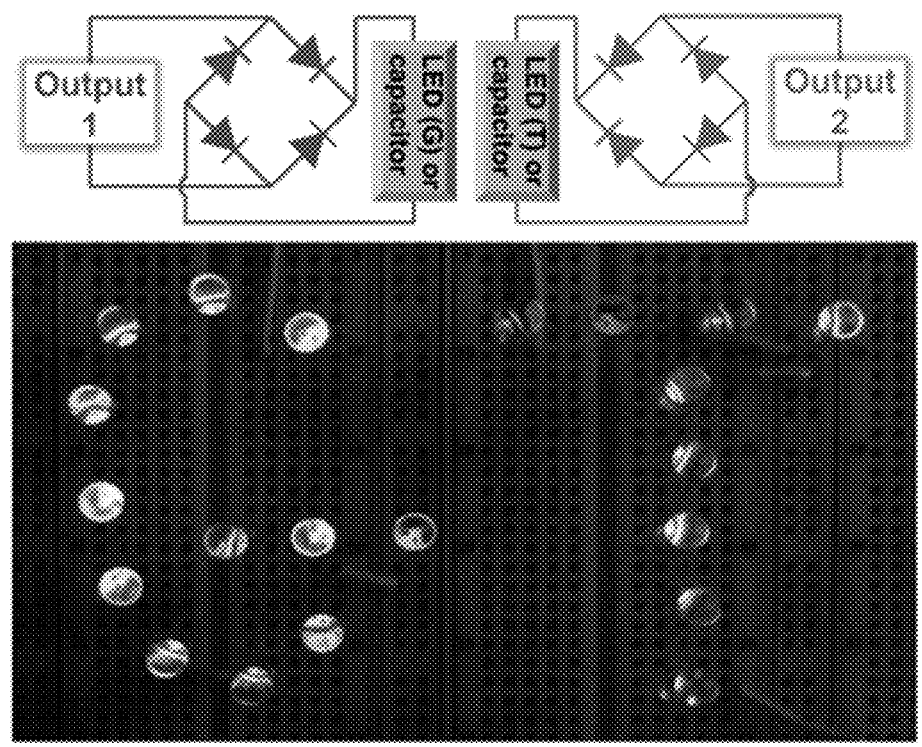
FIG. 37A illustrates a diagram of corresponding circuit connection polarities and a photograph of rectified outputs from Output 1 and Output 2 of the generator of FIG. 34 to drive commercial LEDs according to one aspect of the disclosed technology.
Figure 37B:
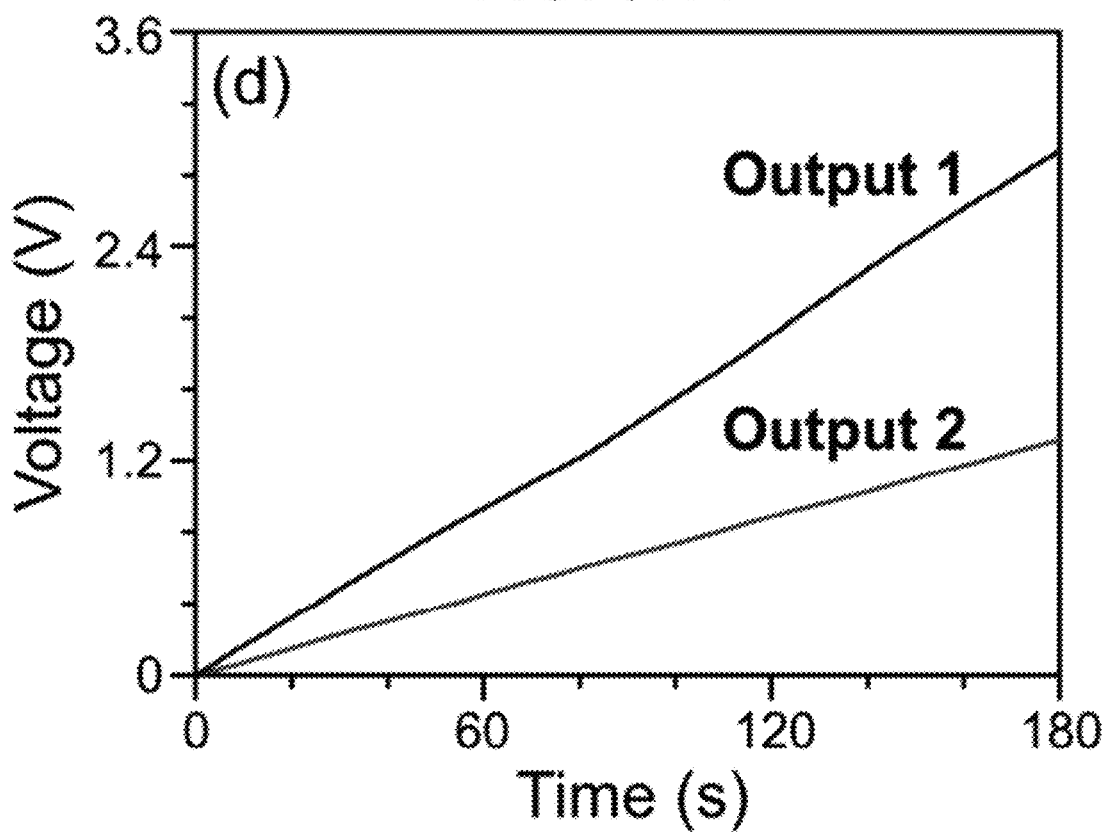
FIG. 37B illustrates charging curves of 33 μF capacitors by the rectified outputs from Output 1 and Output 2 of the generator of FIG. 34 according to one aspect of the disclosed technology.

FIG. 36 illustrates the generated $I_{sc}$ from a single water-TENG. As shown in FIG. 36, the value of the generated $I_{sc}$ is 30 µA, which is smaller than the Output 1 of the generator 2400. By integrating the $I_{sc}$ peak, collected charges from the Output 1 and Output 2 of the generator 2400 in a unit time can be determined as 3.3 µQ/s and 1.4 µQ/s, respectively. A full-wave rectifying bridge can be applied to further transform the AC outputs to pulse outputs in the same direction. The rectified outputs from the Output 1 and Output 2 of the generator 2400 can drive commercial LEDs as illustrated in FIG. 37A and charge 33 µF capacitors as illustrated in FIG. 37B. The effective dimensions of the generator can be 3.3 cm×3.3 cm.

Figure 38A:
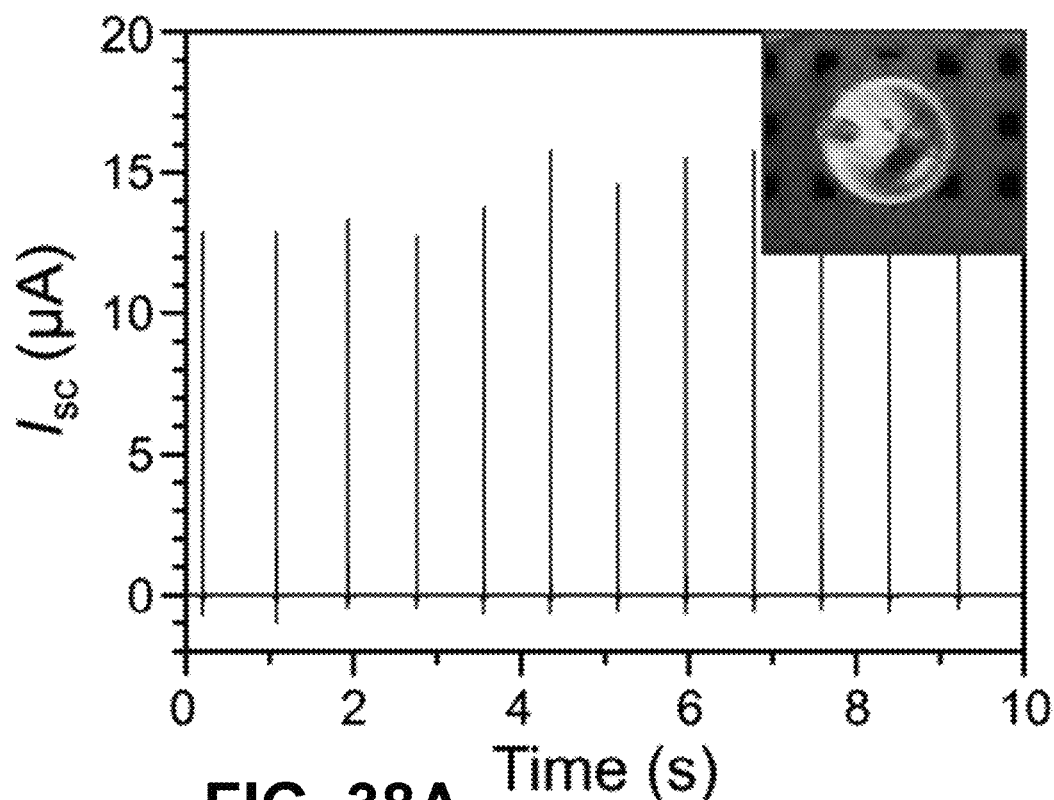
FIG. 38A illustrates output $I_{sc}$ of the water-TENG generated by deionized water drops according to one aspect of the disclosed technology.

The water-TENG can be used as a self-powered nanosensor for ethanol detection. In one experiment to realize the concept, a programmable syringe pump (PHD 2000, Harvard Apparatus) is applied to control the volume each sample drop (30 µL). The sample drop is set up to fall from a height of 50 cm. FIG. 38A displays the output $I_{sc}$ of the water-TENG generated by deionized water drops. As illustrated in FIG. 38A, the output $I_{sc}$ reaches a value of 14 µA. The inset of FIG. 38A shows that the generated output is capable of turning on a commercial LED as indicator.

Figure 38B:
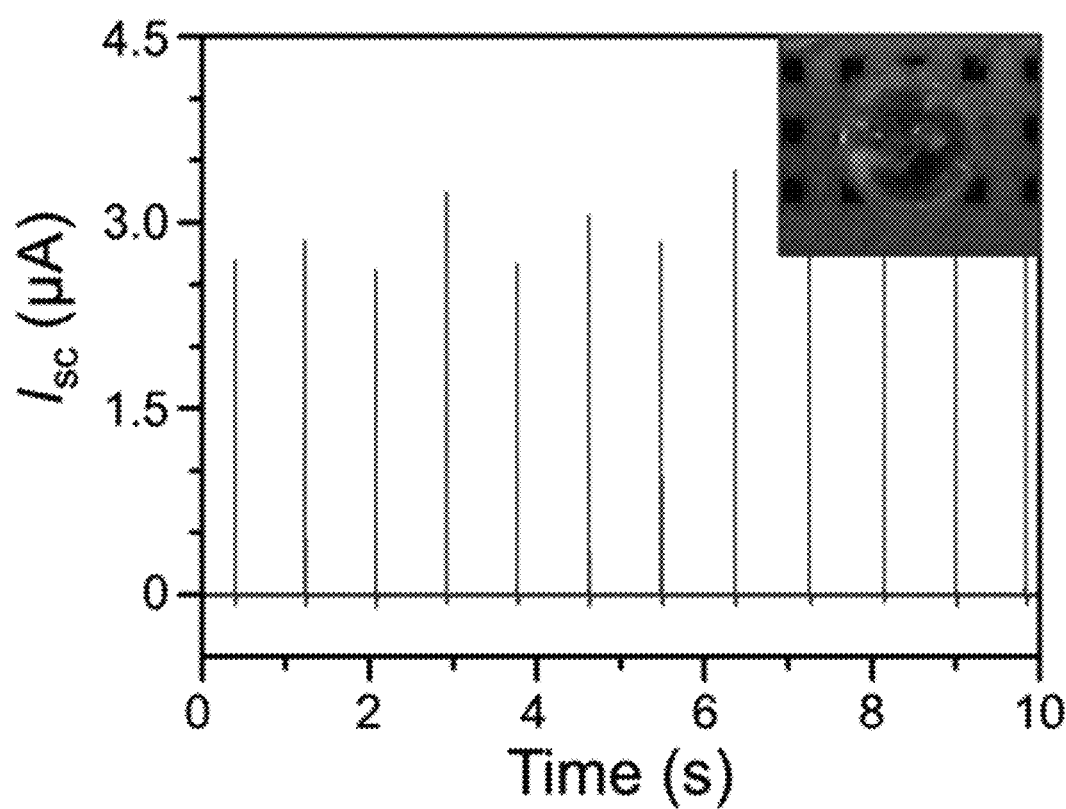
FIG. 38B illustrates output $I_{sc}$ of the water-TENG generated by a solution containing 20% ethanol (percentage by volume) according to one aspect of the disclosed technology.
Figure 38C:
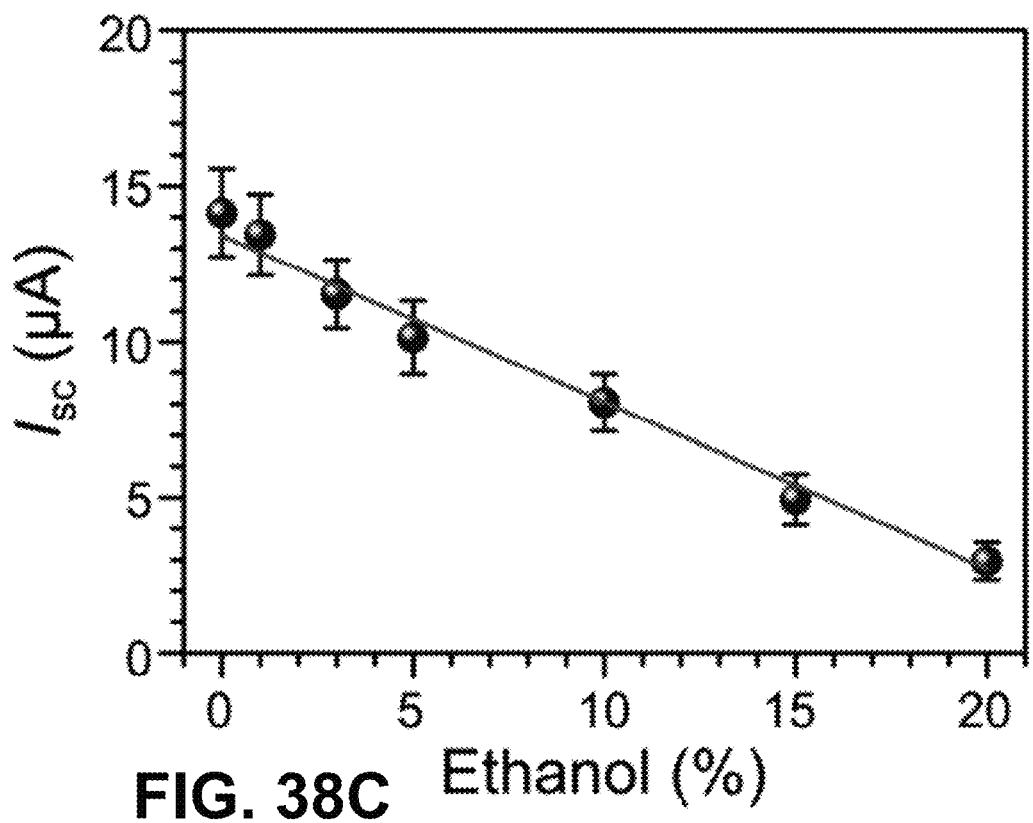
FIG. 38C illustrates output $I_{sc}$ value of the water-TENG generated by samples containing different concentration of ethanol according to one aspect of the disclosed technology.

However, as shown in FIG. 38B, when the sample is changed from deionized water to a solution containing 20% ethanol (percentage by volume), the generated $I_{sc}$ of the water-TENG is decreased to 3 µA. FIG. 38C illustrates the relationship between the generated $I_{sc}$ and ethanol concentration. By connecting the water-TENG with a LED (indicator), a stand-alone and self-powered ethanol nanosensor can be formed. The inset of FIG. 38B reveals that the LED powers off when detecting the 20% ethanol solution. In other words, the generated output in FIG. 38B cannot drive the LED.

Figure 38D:
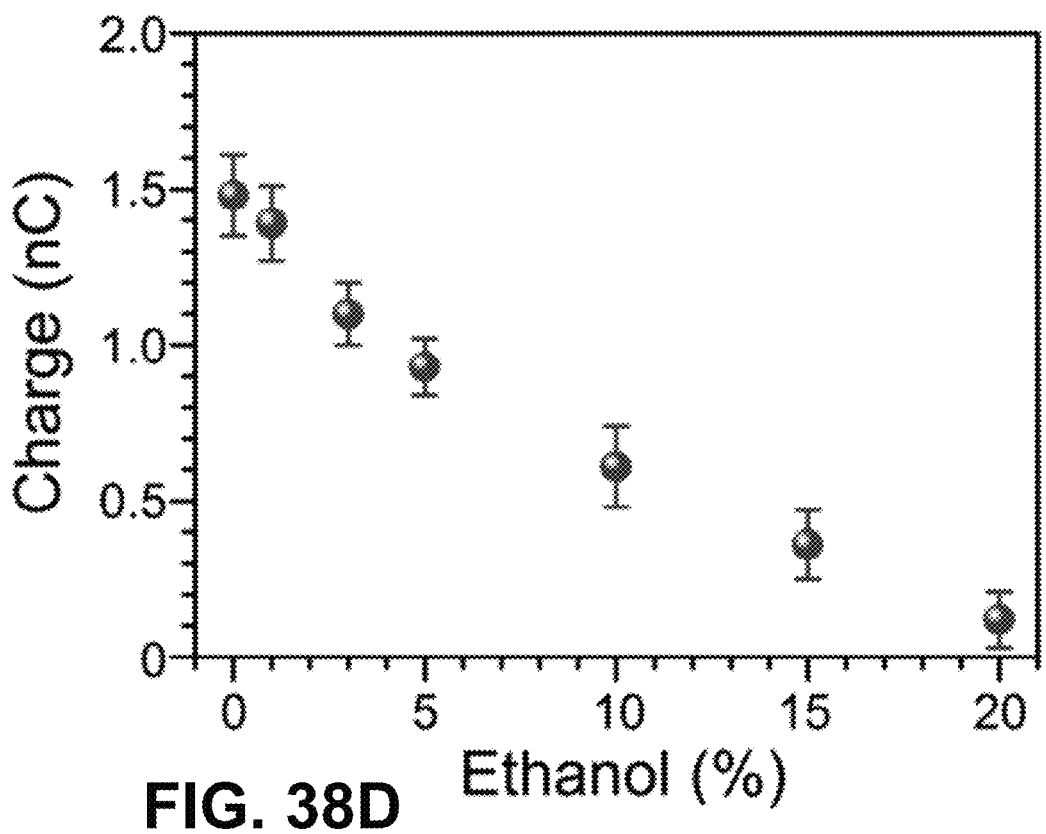
FIG. 38D illustrates inductively transferred charges of the water-TENG generated by samples containing different concentration of ethanol according to one aspect of the disclosed technology.

The decrease in the generated $I_{sc}$ can be caused by the reduced charges on the sample drop. By integrating the $I_{sc}$ peak of water-TENG generated at different ethanol concentration, the inductively transferred charges on the Cu electrode can be deduced, which can be proportional to the triboelectric charges on sample drop. FIG. 38D illustrates that the triboelectric charges on a sample drop decrease when raising ethanol concentration.

Ethanol is capable of removing the triboelectric charges. Hence, the presence of ethanol can reduce the triboelectric charges on sample drop surface and decrease the electrical output of water-TENG. Compared to another self-powered ethanol sensor based on the contact electrification of hydrophobic polymer film and sample, the as-developed water-TENG is not only a new design but also has the advantage of minimizing the sample volume.

The combination of a commercial LED with water-TENG indicates that the sensing system toward ethanol detection can be simplified by replacing the electrometer with an LED.

In one embodiment, the generator 2400 as shown in FIG. 24 can be coupled to a power indicator. The surface layer 2412 can receive a solution containing a chemical and water, where the chemical can remove at least one triboelectric charge from the water. The power indicator can indicate whether the chemical is present based on power output of the triboelectric generator. In one example, the chemical is ethanol. The power indicator can be an LED.

The disclosed technology provides a green and sustainable solution for harvesting multiple types of energies from the environment, including but not limited to, energies from water flow such as tap water flowing from a household faucet, raindrop, ocean wave and wind. Types of water which the energies can be harvested from include deionized, tap and salt water, among many other possibilities.

The disclosed technology can have many applications, including, but not limited to, powering low power applications including but not limited to light emitting diodes, sensors and portable electronics, and charging capacitors. The disclosed technology can be adapted to many applications, including but not limited to, self-powered sensors for detecting flowing water rate, wind speed, chemicals such as ethanol, temperature, and water/liquid leakage from a container/pipe.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as can be suggested by the teachings herein are particularly reserved as they fall within the breadth and scope of the claims here appended. The term "exemplary" used herein does not mean best mode, but rather, example.

Accordingly, those skilled in the art will appreciate that the conception upon which the application and claims are based can be readily utilized as a basis for the design of other structures, methods, and systems for carrying out the several purposes of the embodiments and claims disclosed in this application. It is important, therefore, that the claims be regarded as including such equivalent constructions.

Furthermore, the purpose of the foregoing Abstract is to enable the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way.

What is claimed is:

1. An apparatus comprising:
   a first component configured to:
      receive an energy flow carrying triboelectric charges; and
      harvest electrostatic energy from the energy flow;
   a second component coupled to the first component about an axis; and
   a processor configured to detect an energy flow rate based on at least a rotation speed of the second component;
   wherein one or both of the first component and the second component include a surface layer.

2. The apparatus of claim 1, wherein the energy flow is selected from the group consisting of water flow and air flow.

3. The apparatus of claim 1, wherein the surface layer includes at least one material selected from the group consisting of polyethylene terephthalate, poly(methyl methacrylate), polydimethylsiloxane, polytetrafluoroethylene, fluorinated ethylene propylene, poly(vinyl chloride), polyimide, metal and alloy.

4. The apparatus of claim 1, wherein the surface layer is superhydrophobic.

5. The apparatus of claim 1, wherein the surface layer includes nanostructures thereon.

6. The apparatus of claim 1, wherein the first component includes a first electrode;
   wherein the second component includes a second electrode;
   wherein the second component is configured to harvest mechanical kinetic energy from the energy flow; and
   wherein at least one of the electrodes includes at least one material selected from the group consisting of metal, indium tin oxide and conductive polymer.

7. The apparatus of claim 1, wherein each of the first component and the second component defines a segmented disk profile.

8. The apparatus of claim 1, wherein the energy flow comprises flowing water.

9. The apparatus of claim 1, wherein the second component is configured as a rotatable disk that rotates when the first component receives flowing water.

10. The apparatus of claim 1, wherein:
    the energy flow comprises flowing water;
    the second component is configured as a rotatable disk that rotates when the first component receives flowing water; and
    the rotatable disk is configured to harvest mechanical kinetic energy from flowing water during rotation.

11. The apparatus of claim 1, wherein the energy flow rate includes at least one of water flow rate and wind speed.

12. The apparatus of claim 1, wherein the first component includes the surface layer; and
    wherein the surface layer is a superhydrophobic surface layer.

13. The apparatus of claim 12, wherein the surface layer includes a $TiO_2$ layer with nanostructures thereon.

14. A self-powered sensor for detecting a chemical comprising:
    the apparatus of claim 1; and
    a power indicator;
    wherein:
       the first component includes a first electrode;
       the second component includes a second electrode;
       the surface layer is superhydrophobic;

the second component is configured to be rotatable with respect to the axis by the energy flow to change triboelectric charges on the electrodes;
the energy flow is a water flow;
the superhydrophobic surface layer is configured to receive a solution containing the chemical and the water; and
the chemical removes at least one triboelectric charge from the water; and
the power indicator is indicative of whether the chemical is present based on power output of the apparatus.

15. The self-powered sensor of claim 14, wherein the chemical is ethanol.

16. The self-powered sensor of claim 14, wherein the power indicator is an LED.

17. An apparatus comprising:
a first component configured to:
receive an energy flow carrying triboelectric charges; and
harvest electrostatic energy from the energy flow; and
a second component coupled to the first component about an axis;
wherein one or both of the first component and the second component include a surface layer; and
wherein one or more of:
(i) the first component includes a first electrode, the second component includes a second electrode, the second component is configured to harvest mechanical kinetic energy from the energy flow, and at least one of the electrodes includes at least one material selected from the group consisting of metal, indium tin oxide and conductive polymer;
(ii) each of the first component and the second component defines a segmented disk profile;
(iii) the second component is configured as a rotatable disk that rotates when the first component receives flowing water; and/or
(iv) the energy flow comprises flowing water, the second component is configured as a rotatable disk that rotates when the first component receives flowing water, and the rotatable disk is configured to harvest mechanical kinetic energy from flowing water during rotation.

18. The apparatus of claim 17 further comprising a processor configured to detect an energy flow rate based on at least a rotation speed of the second component.

19. The apparatus of claim 17, wherein the first component includes the surface layer; and
wherein the surface layer is a superhydrophobic surface layer.

20. The apparatus of claim 19, wherein the surface layer includes a $TiO_2$ layer with nanostructures thereon.

* * * * *